(12) United States Patent
Meyers et al.

(10) Patent No.: US 9,378,542 B2
(45) Date of Patent: Jun. 28, 2016

(54) SYSTEM AND PROCESSOR IMPLEMENTED METHOD FOR IMPROVED IMAGE QUALITY AND GENERATING AN IMAGE OF A TARGET ILLUMINATED BY QUANTUM PARTICLES

(71) Applicant: U.S. Army Research Laboratory, Washington, DC (US)

(72) Inventors: Ronald E. Meyers, Columbia, MD (US); Keith S. Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/800,755

(22) Filed: Jul. 16, 2015

(65) Prior Publication Data

US 2016/0005154 A1    Jan. 7, 2016

Related U.S. Application Data

(62) Division of application No. 14/303,078, filed on Jun. 12, 2014, now Pat. No. 9,131,128.

(51) Int. Cl.
   *G06T 5/00* (2006.01)
   *G06T 5/50* (2006.01)
   *G06T 7/00* (2006.01)

(52) U.S. Cl.
   CPC . *G06T 5/008* (2013.01); *G06T 5/50* (2013.01); *G06T 7/0081* (2013.01); *G06T 2207/10024* (2013.01); *G06T 2207/10032* (2013.01); *G06T 2207/20016* (2013.01); *G06T 2207/20024* (2013.01); *G06T 2207/20182* (2013.01); *G06T 2207/20208* (2013.01); *G06T 2207/20216* (2013.01); *G06T 2207/20224* (2013.01)

(58) Field of Classification Search
   None
   See application file for complete search history.

(56) References Cited

U.S. PATENT DOCUMENTS

| | | | |
|---|---|---|---|
| 6,226,350 B1 | 5/2001 | Hsieh | |
| 7,272,241 B2 | 9/2007 | Demi et al. | |
| 7,536,012 B1 | 5/2009 | Meyers et al. | |
| 7,812,303 B2 | 10/2010 | Meyers et al. | |
| 7,847,234 B2 | 12/2010 | Meyers et al. | |
| 8,053,715 B2 | 11/2011 | Meyers et al. | |
| 8,242,428 B2 | 8/2012 | Meyers et al. | |
| 8,373,107 B2 | 2/2013 | Meyers et al. | |
| 8,532,427 B2 | 9/2013 | Meyers et al. | |

(Continued)

OTHER PUBLICATIONS

R. Meyers, K. Deacon, and Y. Shih, "Ghost-imaging experiment by measuring reflected photons," Phys. Rev. A 77, 041801(R) (2008).

(Continued)

*Primary Examiner* — Michelle Entezari
(74) *Attorney, Agent, or Firm* — Lawrence E. Anderson

(57) ABSTRACT

According to some embodiments, system and methods for image improvement comprise: receiving a plurality of frames of a given region of interest, the frames comprised of a plurality of pixels; determining, based on a quantum property of the frames, a normalized pixel intensity value for each pixel of each of the plurality of frames; and generating an improved image of the given region of interest based on the plurality of frames and the corresponding normalized pixel intensity values for the frames, the order of the image being two. Also embodiments for generating an image of a target illuminated by quantum entangled particles, such as, photons, are disclosed.

23 Claims, 62 Drawing Sheets

(56) References Cited

U.S. PATENT DOCUMENTS

| | | | |
|---|---|---|---|
| 8,593,564 B2 | 11/2013 | Border | |
| 8,594,455 B2 | 11/2013 | Meyers et al. | |
| 8,811,485 B1 | 8/2014 | Jones | |
| 8,811,763 B2 | 8/2014 | Meyers et al. | |
| 8,811,768 B2 | 8/2014 | Meyers et al. | |
| 2003/0085905 A1* | 5/2003 | Mori | G09G 3/22 345/589 |
| 2005/0069207 A1* | 3/2005 | Zakrzewski | B64D 45/0015 382/190 |
| 2007/0262985 A1* | 11/2007 | Watanabe | H04N 13/0018 345/420 |
| 2008/0317131 A1* | 12/2008 | Lee | H04N 19/176 375/240.16 |
| 2009/0194702 A1 | 8/2009 | Meyers et al. | |
| 2010/0140458 A1 | 6/2010 | Meyers et al. | |
| 2010/0189367 A1* | 7/2010 | van der Merwe | G06K 9/183 382/217 |
| 2010/0258708 A1 | 10/2010 | Meyers et al. | |
| 2010/0294916 A1 | 11/2010 | Meyers et al. | |
| 2011/0081053 A1* | 4/2011 | Zheng | G06K 9/6247 382/118 |
| 2011/0284724 A1 | 11/2011 | Meyers et al. | |
| 2012/0093407 A1* | 4/2012 | Mei | G06K 9/72 382/170 |
| 2012/0194677 A1* | 8/2012 | Suzuki | G06K 9/00798 348/148 |
| 2012/0328161 A1* | 12/2012 | Palenychka | G06K 9/00771 382/107 |
| 2013/0121568 A1* | 5/2013 | Krishnan | G06T 3/4053 382/162 |
| 2013/0243334 A1 | 9/2013 | Meyers et al. | |
| 2013/0343627 A1 | 12/2013 | Zwirn | |

OTHER PUBLICATIONS

D. L. Donoho, "Compressed sensing," IEEE Transactions on Information Theory, vol. 52, pp. 1289-1306, (2006).

E. Candes, J. Romberg, and T. Tao, "Robust uncertainty principles: Exact signal Reconstruction from Highly Incomplete Frequency Information," IEEE Trans. Inf. Theory, 52, 489 (2006).

Scarcelli, G., et al. "Can Two-Photon Correlation of Chaotic Light Be Considered as Correlation of Intensity Fluctuations?" Physics Review Letters 96, 063602 (2006).

O. Katz, Y. Bromberg, Y. Silberberg, "Compressive Ghost Imaging," Appl Phys. Lett., 95, 131110 (2009).

J. Shapiro, "Computational ghost imaging," Phys. Rev. A vol. 78 061802(R) (Dec. 18, 2008).

R. Meyers and K. Deacon,"Quantum Ghost Imaging Experiments At ARL", Proc. SPIE vol. 7815, 78150I, (2010).

M. Figueiredo, R. Nowak, and S. Wright, "Gradient projection for sparse reconstruction: Application to compressed sensing and other inverse problems (2007)," IEEE J. Sel. Topics on Signal Processing, 1, 586 (2007).

R. Meyers, K. Deacon, and Y.Shih, "A new Two-photon Ghost Imaging Experiment with Distortion Study," J. Mod. Opt., 54, 2381-2392 (2007).

R. Meyers, K. Deacon, and Y. Shite, "Quantum imaging of an obscured object by measurement of reflected photons," Proc. SPIE vol. 7092, 70920E (2008) doi:10.1117/12.797926.

R. Meyers, K. Deacon, and Y. Shite, "Turbulence-free ghost imaging," Appl. Phys. Lett. 98, 111115 (Mar. 18, 2011); doi:10.1063/1.3567931.

R. Glauber, "The Quantum Theory of Optical Coherence," Phys. Rev. 130, 2529 (1963) 131, 2766 (Jun. 1963).

T. B. Pittman, et al., "Optical imaging by means of two-photon quantum entanglement," Phys. Rev. A 52, R3429-R3432 (1995).

D. Strekalov, et al. "Observation of Two-Photon 'Ghost' Interference and Diffraction," Phys. Rev. Lett. 74, 3600-3603 (1995).

R. Meyers, K. Deacon, Y. Shih, "Positive-negative turbulence-free ghost imaging," Appl. Phys. Lett. 100, 131114 (2012) (Mar. 29, 2012).

Wang, Y. Cai, and O. Korotkova, "Ghost imaging with partially coherent light in turbulent atmosphere," Proc. SPIE 7588, 75880F (2010).

J. Cheng,"Ghost imaging through turbulent atmosphere," Opt. Express 17, Issue 10, pp. 7916-7921 (2009) . . . .

R. Meyers, et al. "Turbulence-Free Space-Time Quantum Imaging," Proc. SPIE 8875, 88750X-1 (2013).

Brown, R. Hanbury, "The Question of Correlation Between Photons in Coherent Light Rays", Nature, No. 4548, Dec. 29, 1956, pp. 1447-1450.

Klyshko, D.N., "Combined EPR and Two-Slit Experiments: Interference of Advanced Waves", Physics Letters A, vol. 132, No. 6.7, pp. 299-304 (1988).

Zhang, Da, et al., "Correlated two-photon imaging with true thermal light", Optics Letters, vol. 30, No. 18, Sep. 15, 2005, pp. 2354-2356.

Meyers, Ron, et al., "A new two-photon ghost imaging experiment with distortion study", Journal of Modern Optics, vol. 54, Nos. 16-17, Nov. 10-20, 2007, 2381-2392.

A.V. Sergienko, et al., "Two-photon geometric optical imaging and quantum 'cryptoFAX'" Proc. SPIE Int. Soc. Opt. Eng.(2799), p. 164-171, 1996.

Spiller, "Quantum Information Processing: Cryptography, Computation, and Teleportation," Proceedings of the IEEE Dec. 1996 vol. 84 Issue: 12, pp. 1719-1746 ISSN: 0018-9219.

Jennewein, Thomas, et al. "Experimental Nonlocality Proof of Quantum Teleportation and Entanglement Swapping," Physical Review Letters vol. 88, No. 1, (Jan. 2002) 124-141.

Jennewein, Thomas, et al., "Quantum Communication and Teleportation Experiments Using Entangled Photon Pairs (Dissertation zur Erlangung des Grades)" Doktor der Naturwissenschafen Jun. 2002.

Roisse, et al. "Walk-off and Phase-compensated Resonantly Enhanced Frequency-doubling of Picosecond Pulses Using Type II Nonlinear Crystal," Applied Physics B: Lasers and Optics, vol. 69, No. 1, 25-27, DOI: 10.1007/s003400050764 (1999).

B.C. Jacobs, "Quantum Cryptography in Free Space," Nov. 15, 1996, Optics Letters, vol. 21, No. 22, p. 1854-1856.

R. Ng, et al. "Light Field Photography with a Hand-held Plenoptic Camera," Stanford Tech Report CTSR 2005-02 (2005).

Meyers, R, et al., "Space-time quantum imaging," Proc. SPIE 8875, Quantum Communications and Quantum Imaging XI, 887502 (Sep. 26, 2013); doi:10.1117/12.2028190.

Shapiro, J.H., "Computational Ghost Imaging," Massachusetts Institute of Technology, Research Laboratory of Electronics, Cambridge, Massachusetts 02139 USA, arXiv:0807.2614v1 [quant-ph] Jul. 16, 2008.

Lorenzo Basano and Pasquale Ottonello, "Use of an Intensity Threshold to Improve the visibility of Ghost Images Produces by Incoherent Light," Dipartmento de. Fisica, University of Genova, published Aug. 2007.

J-W. Pan, D. Bouwmeester, et al. "Experimental Entanglement Swapping: Entangling Photons That Never Interacted" Physical Review Letters 80, 3891-3894 May 1998.

J. Yin et al. "Lower Bound on the Speed of Nonlocal Correlations without Locality and Measurement Choice Loopholes," Physical Review Letters 110, 260407 Jun. 2013.

E. Lopaeva, I. R. Berchera, I.P. Degiovanni, S. Olivares, G. Brida, M. Genovese, "Experimental Relization of Quantum Illumination," Physical Review Letters, 110, 153603 (2013).

Ferri et al., "Differential Ghost Imaging," Physical Review Letters, PRL 104, 253603 (2010) week ending Jun. 25, 2010.

Search notes, Google scholar [cited in U.S. Appl. No. 14/303,078 by the Examiner on PTO-892 mailed Nov. 26, 2014].

Bennink, Ryan S., Sean J. Bentley, and Robert W. Boyd., "Two photon coincidence imaging with a classical source." Physical Review Letters 89, No. 11 (2002): 113601.

\* cited by examiner

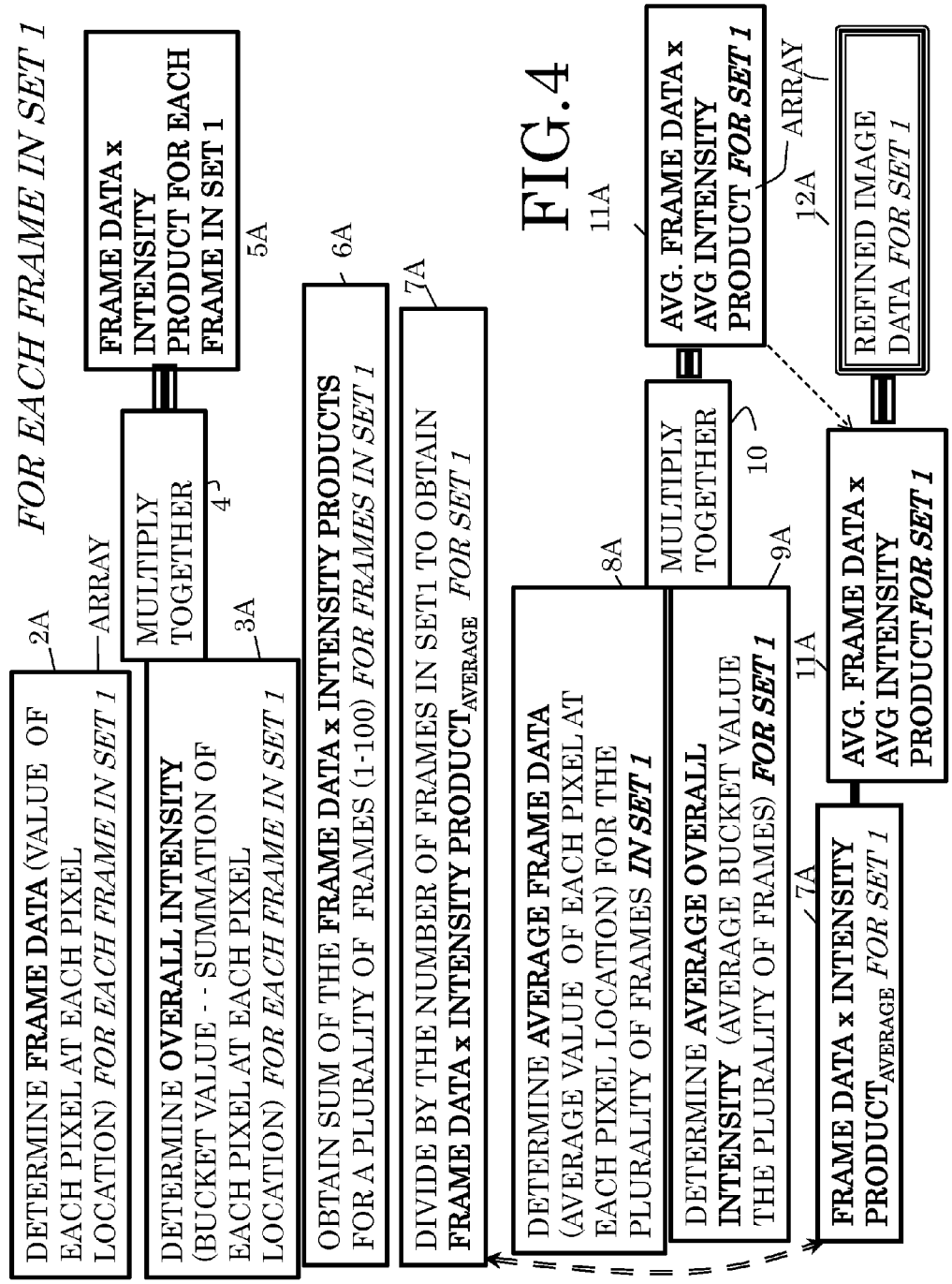

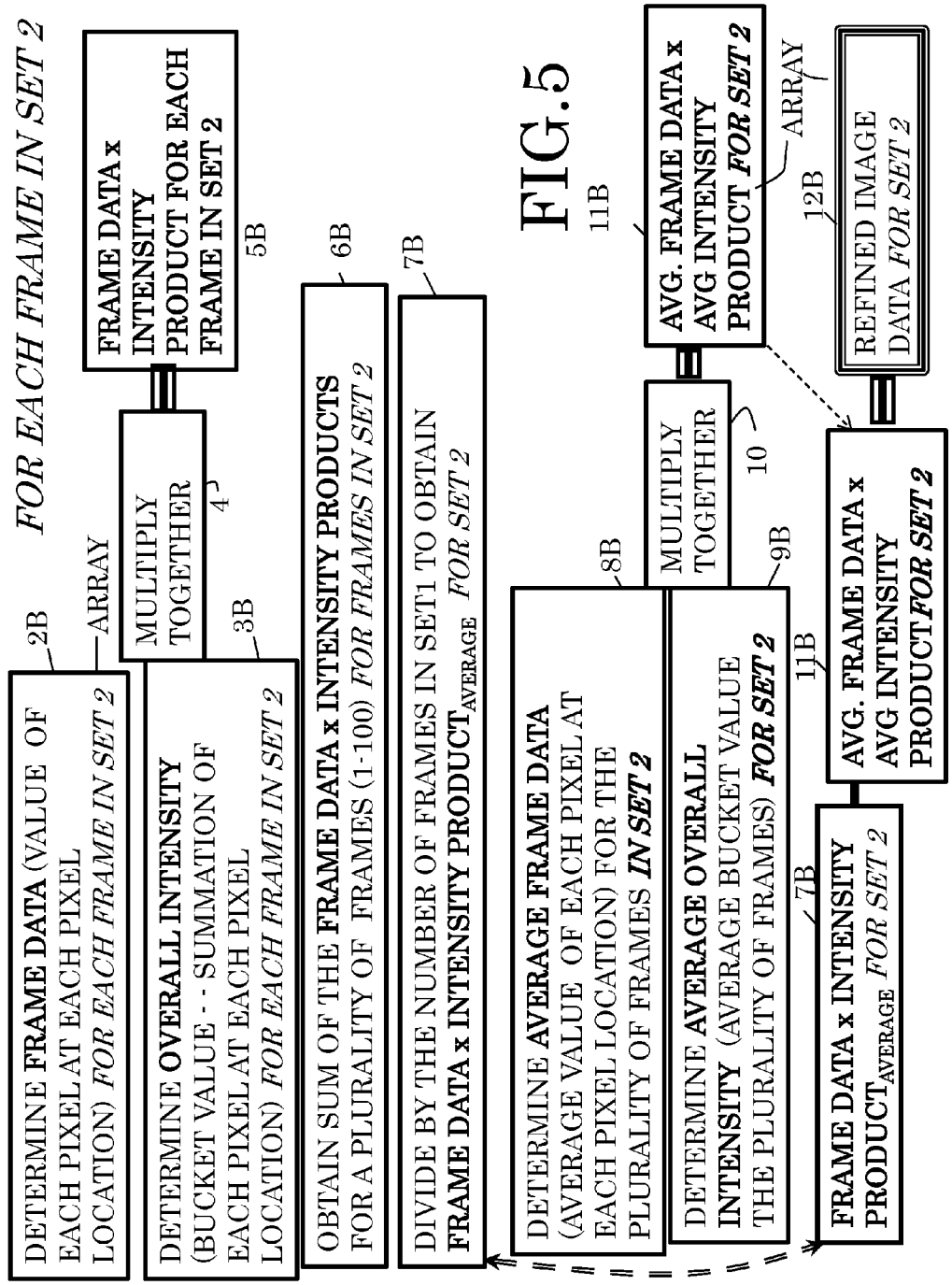

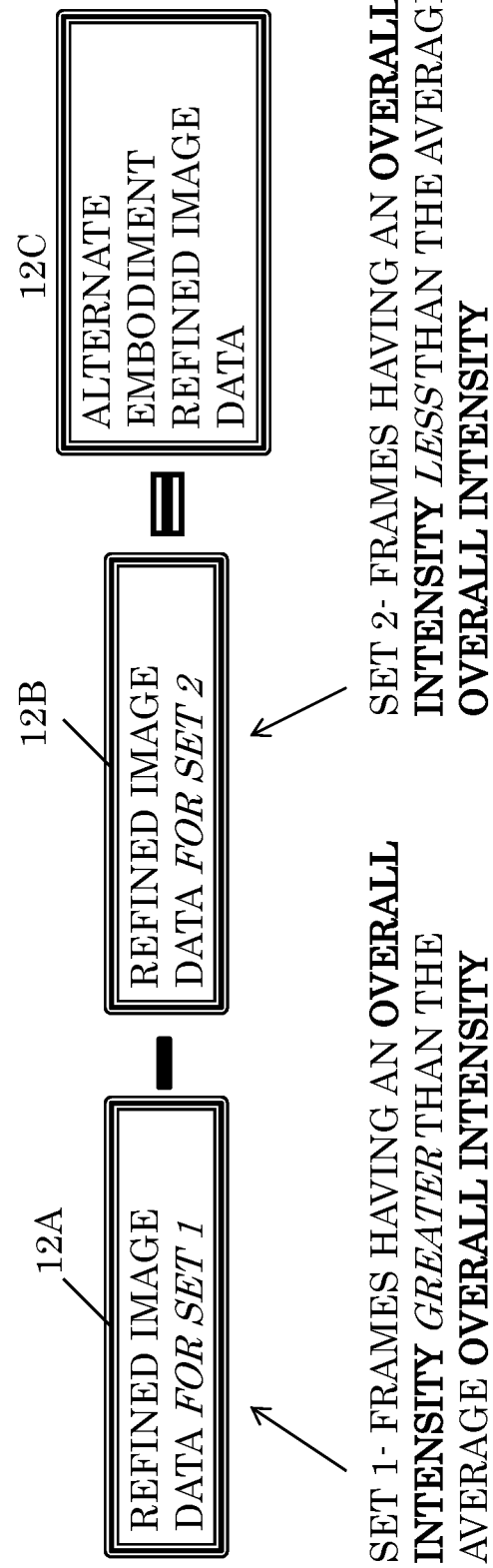

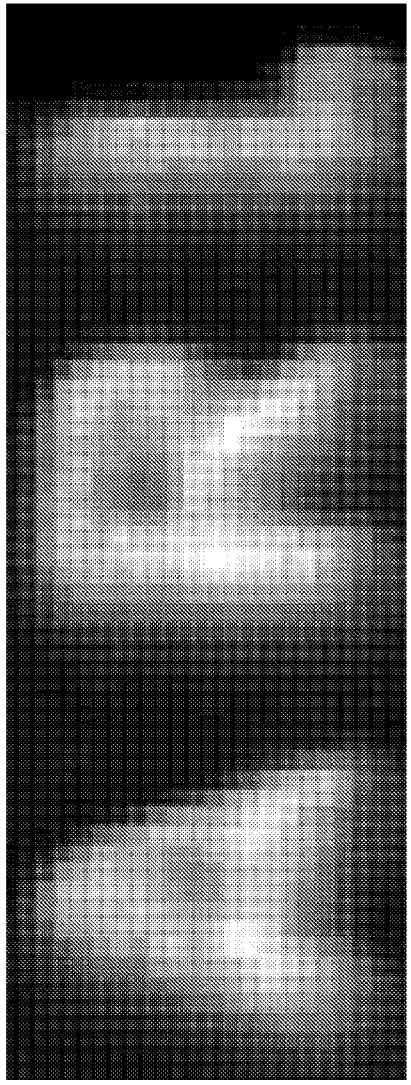
FIG. 7 Self Bucket G⁽²⁾ Virtual Ghost Image with turbulence10k Frames.
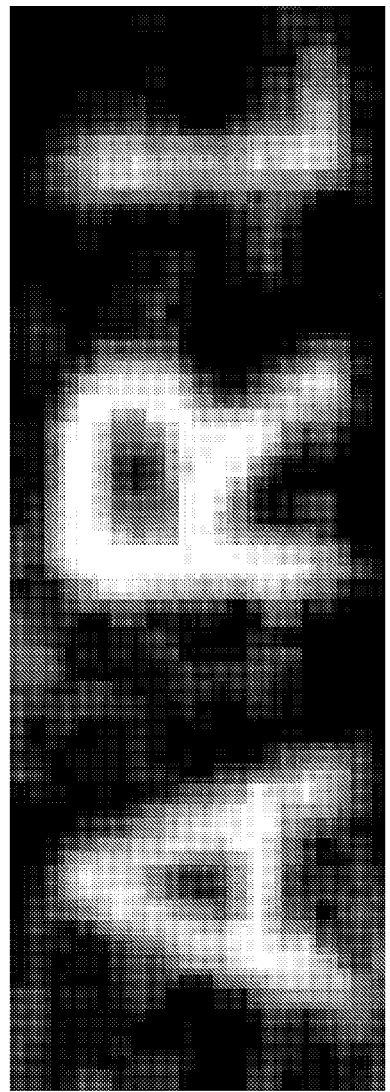
FIG. 8 G⁽²⁾ Ghost image computed using the 2 path configuration.

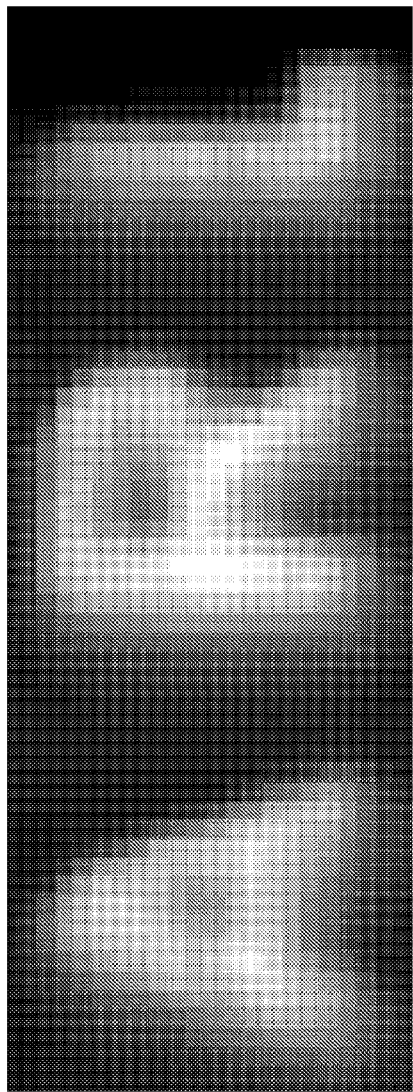
FIG.9 Mean Bucket/Target Image 10k Frames.
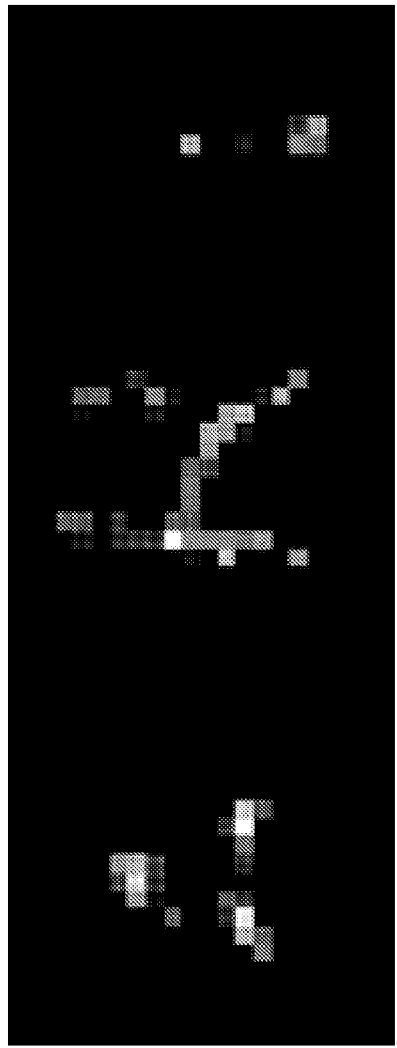
FIG.10 Self Bucket G(2) GPSR with turbulence 10k Frames; Data normalized globally 0-1; $\tau$=1e8; Tol=1e-6; Non Zero=67

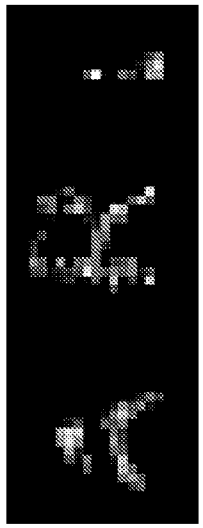
FIG.11 Self Bucket G(2) GPSR with turbulence 10k Frames; Data normalized globally
0-1; tau=5e7; Tol=1e-6; Non Zero=131
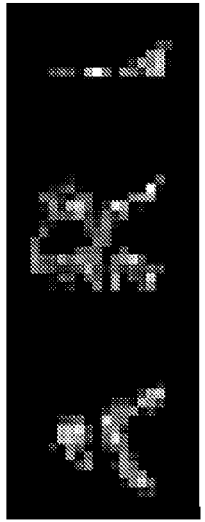
FIG.12 Self Bucket G(2) GPSR with turbulence 10k Frames;Data normalized globally
0-1; tau=2.5e7; Tol=1e-6; NonZero=183
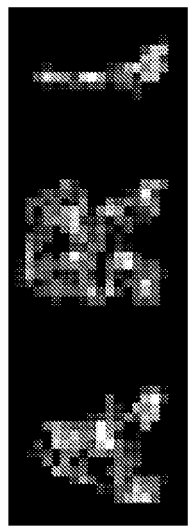
FIG.13 Self Bucket G(2) GPSR with turbulence 10k Frames; Data normalized globally
0-1; tau=1e7; Tol=1e-6; Non Zero=304

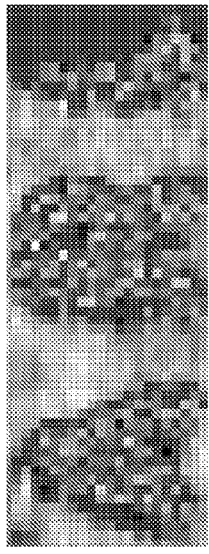
FIG. 14 Self Bucket $G^{(2)}$ GPSR with turbulence 10k Frames; Data normalized globally 0-1; tau =1e6; Tol=1e-6; Non Zero=1310
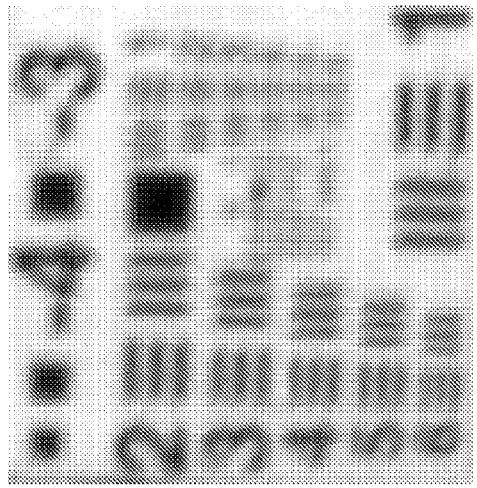
FIG. 15 Sample instantaneous data image. Frame = 137

Frame Self Bucket G(2) frames, 100m distance through turbulence.

Frame Self Bucket G(2), 100m distance through turbulence.

Average of 335 frames

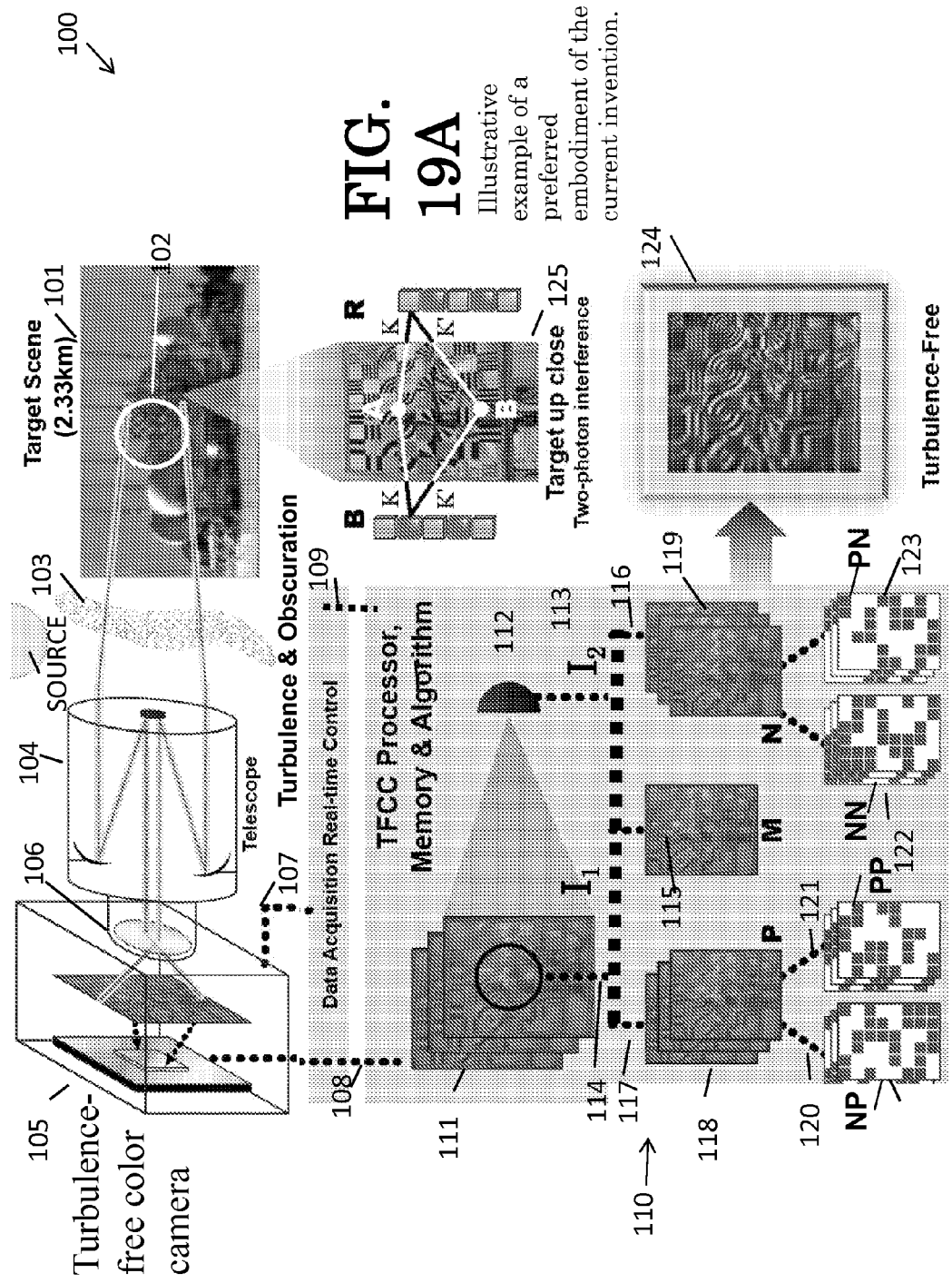
FIG. 19A Illustrative example of a preferred embodiment of the current invention.

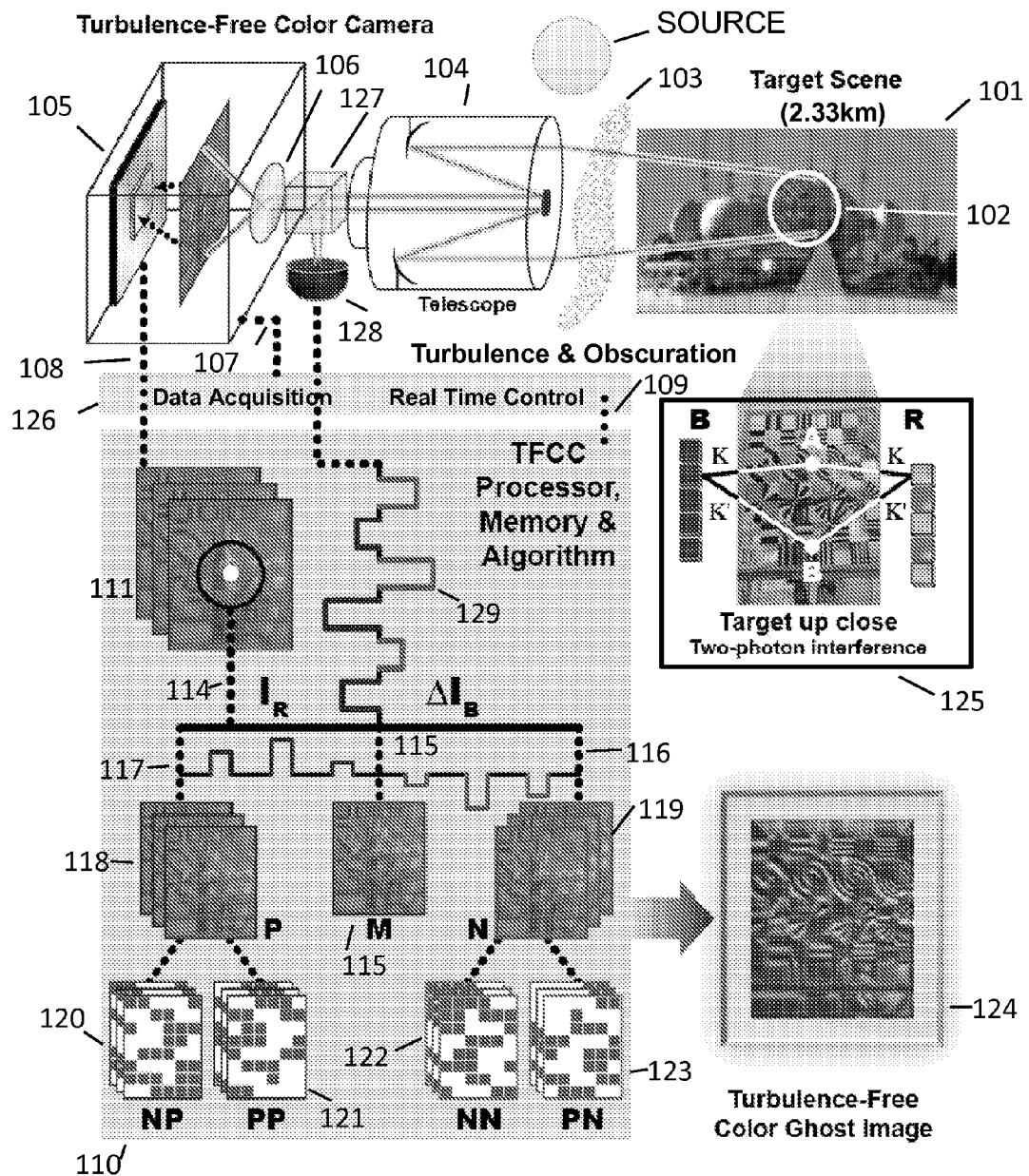
FIG. 19B Illustrative example of an alternate preferred embodiment of the current invention utilizing a spatial information resolving sensor, a single pixel sensor and a beam splitter

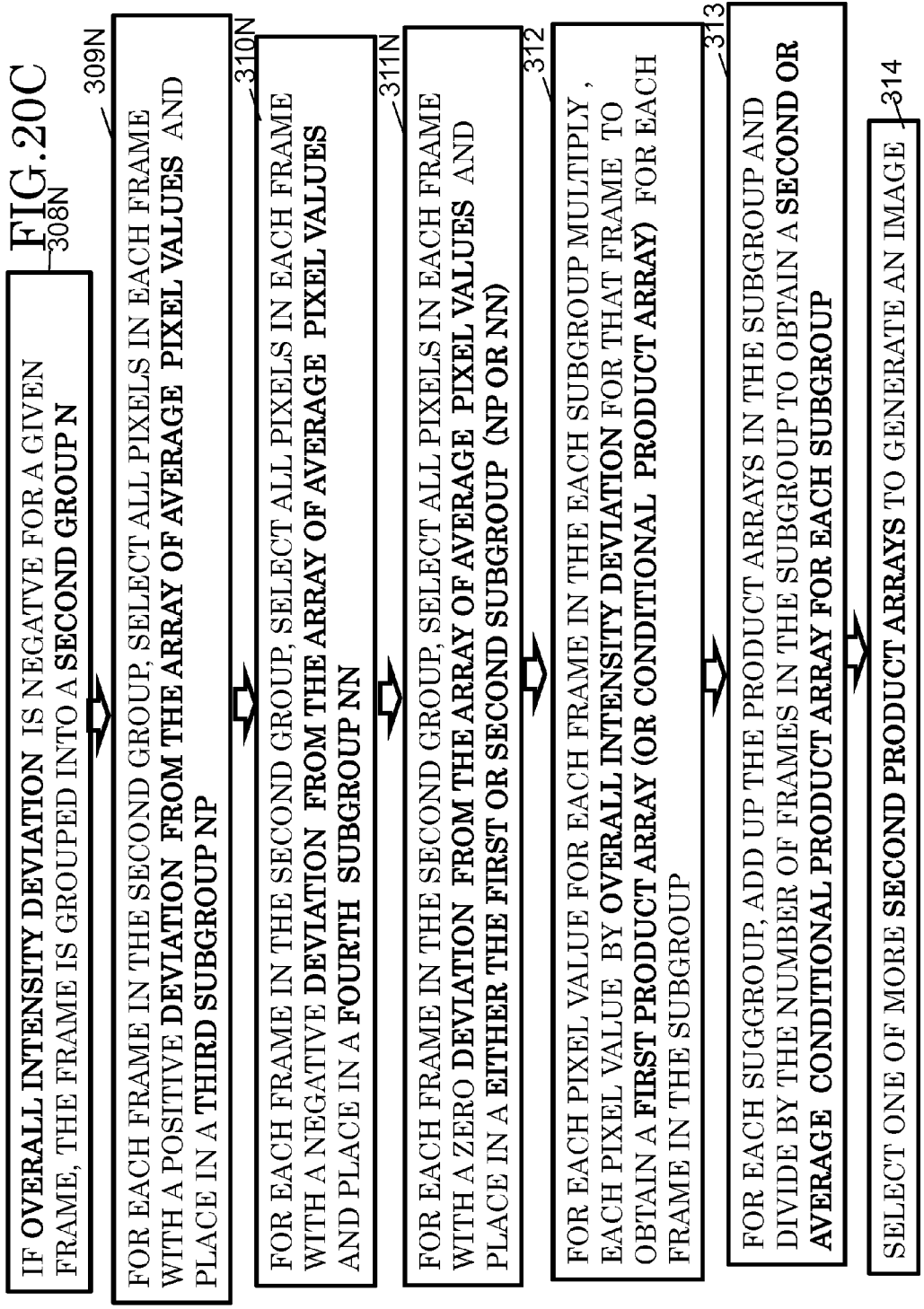

FIG. 22

Continued from FIG. 21 (800)

SET 3 — 318

FOR EACH FRAME WITH A POSITIVE OVERALL INTENSITY DEVIATION MULTIPLY THE POSITIVE OVERALL INTENSITY DEVIATION BY THE POSITIVE DEVIATION FRAME DATA PIXELS WITHIN THAT SET OF FRAMES

RECORD AND ACCUMULATE PIXEL LOCATIONS(a), THE SQUARE OF THE POSITIVE OVERALL INTENSITY DEVIATION VALUES(b), THE PRODUCT OF THE POSITIVE OVERALL INTENSITY DEVIATION x POSITIVE DEVIAITON FRAME DATA PIXELS (c) AND THE SQUARE OF THE POSITIVE DEVIATION FRAME DATA PIXELS (d) VALUES THAT WERE USED AT A PIXEL LOCATION.

320 — / 319

DETERMINE THE PRE-NORMALIZED POSITIVE-POSITIVE PRODUCT PIXEL VALUES BY DIVIDING THE PRODUCT OF THE POSITIVE OVERALL INTENSITY DEVIATION x POSITIVE DEVIATION FRAME DATA PIXELS BY THE ACCUMULATED PIXEL LOCATIONS (a)
DETERMINE THE AVERAGE THE SQUARES OF THE POSITIVE OVERALL INTENSITY DEVIATION VALUES BY DIVIDING THE ACCUMULATED SQUARES OF THE POSITIVE OVERALL INTENSITY DEVIATION VALUES BY THE ACCUMULATED PIXEL LOCATIONS (b)
DETERMINE THE AVERAGE THE SQUARES OF THE POSITIVE DEVIATION FRAME DATA PIXELS BY DIVIDING THE ACCUMULATED SQUARES OF THE POSITIVE DEVIATION FRAME DATA PIXEL VALUES BY THE ACCUMULATED PIXEL LOCATIONS (c)

Continued to FIG. 23 and may proceed concurrently to FIGS. 26 and 28 (900)

FIG. 24 Continued from FIG. 23  SET 4

400 — FOR EACH FRAME WITH A NEGATIVE OVERALL INTENSITY DEVIATION MULTIPLY THE NEGATIVE OVERALL INTENSITY DEVIATION BY THE NEGATIVE DEVIATION FRAME DATA PIXELS WITHIN THAT SET OF FRAMES

401 — RECORD AND ACCUMULATE PIXEL LOCATIONS(a), THE SQUARE OF THE NEGATIVE OVERALL INTENSITY DEVIATION VALUES(b), THE PRODUCT OF THE NEGATIVE OVERALL INTENSITY DEVIATION x NEGATIVE DEVIATION FRAME DATA PIXELS(c) AND THE SQUARE OF THE NEGATIVE DEVIATION FRAME DATA PIXELS (d) VALUES THAT WERE USED AT A PIXEL LOCATION.

402 — DETERMINE THE PRE-NORMALIZED NEGATIVE-NEGATIVE PRODUCT PIXEL VALUES BY DIVIDING THE PRODUCT OF THE NEGATIVE OVERALL INTENSITY DEVIATION x NEGATIVE DEVIATION FRAME DATA PIXELS BY THE ACCUMULATED PIXEL LOCATIONS (a)
DETERMINE THE AVERAGE THE SQUARES OF THE NEGATIVE OVERALL INTENSITY DEVIATION VALUES BY DIVIDING THE ACCUMULATED SQUARES OF THE NEGATIVE OVERALL INTENSITY DEVIATION VALUES BY THE ACCUMULATED PIXEL LOCATIONS (b)
DETERMINE THE AVERAGE THE SQUARES OF THE NEGATIVE FRAME DATA DEVIATION PIXELS BY DIVIDING THE ACCUMULATED SQUARES OF THE NEGATIVE DEVIATION FRAME DATA PIXELS VALUES BY THE ACCUMULATED PIXEL LOCATIONS (c)

Continued to FIG. 25 

FIG. 25

Continued from FIG. 24 (901)

SET 4

403 — DETERMINE THE STANDARD DEVIATION OF THE NEGATIVE OVERALL INTENSITY DEVIATION VALUES BY TAKING SQUARE ROOT OF THE AVERAGE THE SQUARES OF THE NEGATIVE OVERALL INTENSITY DEVIATION VALUES

404 — DETERMINE THE STANDARD DEVIATION OF THE NEGATIVE DEVIATION FRAME DATA PIXELS BY TAKING SQUARE ROOT OF THE AVERAGE THE SQUARES OF THE NEGATIVE DEVIATION FRAME DATA PIXEL VALUES

405 — DETERMINE THE NORMALIZED NEGATIVE-NEGATIVE PRODUCT PIXEL VALUES BY DIVIDING THE PRE-NORMALIZED NEGATIVE-NEGATIVE CORRELATION BY THE PRODUCT OF THE STANDARD DEVIATION OF THE NEGATIVE OVERALL INTENSITY DEVIATION VALUES x THE STANDARD DEVIATION OF THE NEGATIVE DEVIATION FRAME DATA PIXELS

Continued to FIG. 30 or 31 (700 or 701)

FIG. 26 Continued from FIG. 22 (800)

SET 5  800

801 — FOR EACH FRAME WITH A NEGATIVE OVERALL INTENSITY DEVIATION MULTIPLY THE NEGATIVE OVERALL INTENSITY DEVIATION BY THE POSITIVE DEVIATION FRAME DATA PIXELS WITHIN THAT SET OF FRAMES

802 — RECORD AND ACCUMULATE PIXEL LOCATIONS(a), THE SQUARE OF THE NEGATIVE OVERALL INTENSITY DEVIATION VALUES(b), THE PRODUCT OF THE NEGATIVE OVERALL INTENSITY DEVIATION x POSITIVE DEVIATION FRAME DATA PIXELS(c) AND THE SQUARE OF THE POSITIVE DEVIATION FRAME DATA PIXELS (d) VALUES THAT WERE USED AT A PIXEL LOCATION.

DETERMINE THE PRE-NORMALIZED POSITIVE-NEGATIVE PRODUCT PIXEL VALUES BY DIVIDING THE PRODUCT OF THE NEGATIVE OVERALL INTENSITY DEVIATION x POSITIVE FRAME DATA DEVIATION PIXELS BY THE ACCUMULATED PIXEL LOCATIONS (a)

DETERMINE THE AVERAGE THE SQUARES OF THE NEGATIVE OVERALL INTENSITY DEVIATION VALUES BY DIVIDING THE ACCUMULATED SQUARES OF THE POSITIVE OVERALL INTENSITY DEVIATION VALUES BY THE ACCUMULATED PIXEL LOCATIONS (b)

DETERMINE THE AVERAGE THE SQUARES OF THE NEGATIVE DEVIATION FRAME DATA PIXELS BY DIVIDING THE ACCUMULATED SQUARES OF THE POSITIVE DEVIATION FRAME DATA PIXELS VALUES BY THE ACCUMULATED PIXEL LOCATIONS (c)

SET 5

Continued from FIG. 26 (902)

803 — DETERMINE THE STANDARD DEVIATION OF THE NEGATIVE OVERALL INTENSITY DEVIATION VALUES BY TAKING SQUARE ROOT OF THE AVERAGE THE SQUARES OF THE NEGATIVE OVERALL INTENSITY DEVIATION VALUES

804 — DETERMINE THE STANDARD DEVIATION OF THE POSITIVE DEVIATION FRAME DATA PIXELS BY TAKING SQUARE ROOT OF THE AVERAGE THE SQUARES OF THE POSITIVE DEVIATION FRAME DEVIATION PIXEL VALUE

805 — DETERMINE THE NORMALIZED POSITIVE-NEGATIVE PRODUCT PIXEL VALUES BY DIVIDING THE PRE-NORMALIZED POSITIVE-NEGATIVE CORRELATION BY THE PRODUCT OF THE STANDARD DEVIATION OF THE NEGATIVE OVERALL INTENSITY DEVIATION VALUES x THE STANDARD DEVIATION OF THE POSITIVE DEVIATION FRAME DATA PIXELS

Continued to FIG. 30 or 31  (700 or 701)

FIG. 28

Continued from FIG. 22 (800) SET 6

601 → FOR EACH FRAME WITH A POSITIVE OVERALL INTENSITY DEVIATION MULTIPLY THE POSITIVE OVERALL INTENSITY DEVIATION BY THE NEGATIVE DEVIATION FRAME DATA PIXELS WITHIN THAT SET OF FRAMES

600 → RECORD AND ACCUMULATE PIXEL LOCATIONS (a), THE SQUARE OF THE POSITIVE OVERALL INTENSITY DEVIATION VALUES(b), THE PRODUCT OF THE POSITIVE OVERALL INTENSITY DEVIATION x NEGATIVE DEVIATION FRAME DATA PIXELS(c) AND THE SQUARE OF THE NEGATIVE DEVIATION FRAME DATA PIXELS(d) VALUES THAT WERE USED AT A PIXEL LOCATION.

602 → DETERMINE THE PRE-NORMALIZED NEGATIVE-POSITIVE PRODUCT PIXEL VALUES BY DIVIDING THE PRODUCT OF THE POSITIVE OVERALL INTENSITY DEVIATION x NEGATIVE DEVIATION FRAME DATA PIXELS BY THE ACCUMULATED PIXEL LOCATIONS (a)

DETERMINE THE AVERAGE THE SQUARES OF THE POSITIVE OVERALL INTENSITY DEVIATION VALUES BY DIVIDING THE ACCUMULATED SQUARES OF THE POSITIVE OVERALL INTENSITY DEVIATION VALUES BY THE ACCUMULATED PIXEL LOCATIONS(b)

DETERMINE THE AVERAGE THE SQUARES OF THE NEGATIVE FRAME DATA DEVIATION PIXELS BY DIVIDING THE ACCUMULATED SQUARES OF THE NEGATIVE DEVIATION FRAME DATA PIXELS VALUES BY THE ACCUMULATED PIXEL LOCATIONS(c)

*SET 6*

Continued from FIG. 28 (903)

DETERMINE THE STANDARD DEVIATION OF THE POSITIVE OVERALL INTENSITY DEVIATION VALUES BY TAKING SQUARE ROOT OF THE AVERAGE THE SQUARES OF THE POSITIVE OVERALL INTENSITY DEVIATION VALUES — 603

DETERMINE THE STANDARD DEVIATION OF THE NEGATIVE DEVIATION FRAME DATA PIXELS BY TAKING SQUARE ROOT OF THE AVERAGE THE SQUARES OF THE NEGATIVE DEVIATION FRAME DATA PIXEL VALUES — 604

DETERMINE THE NORMALIZED NEGATIVE-POSITIVE PRODUCT PIXEL VALUES BY DIVIDING THE PRE-NORMALIZED NEGATIVE-POSITIVE PRODUCT PIXEL VALUES BY THE PRODUCT OF THE STANDARD DEVIATION OF THE POSITIVE OVERALL INTENSITY DEVIATION VALUES x THE STANDARD DEVIATION OF THE NEGATIVE DEVIATION FRAME DATA PIXELS — 605

Continued to FIGS. 30 or 31 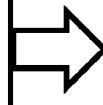

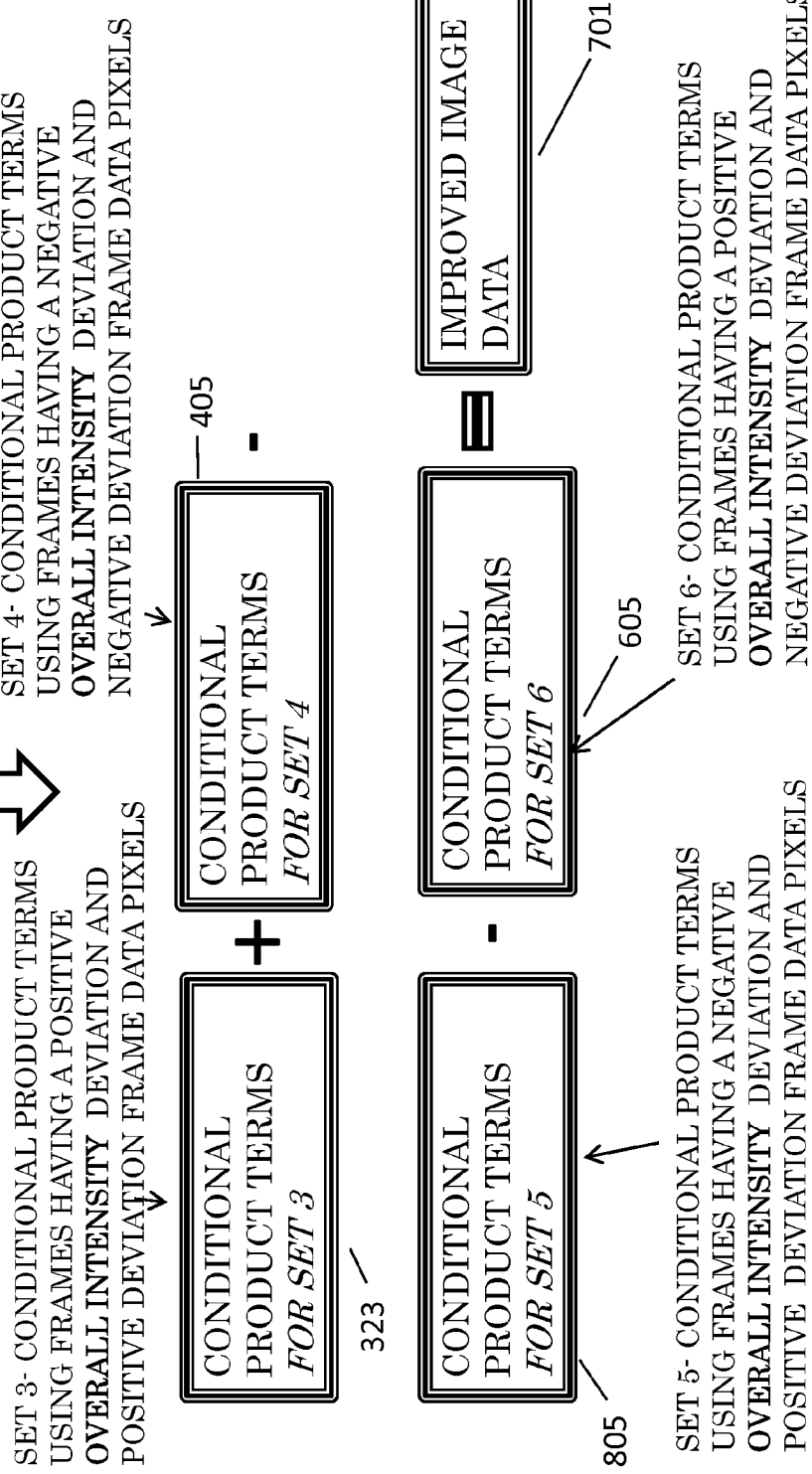

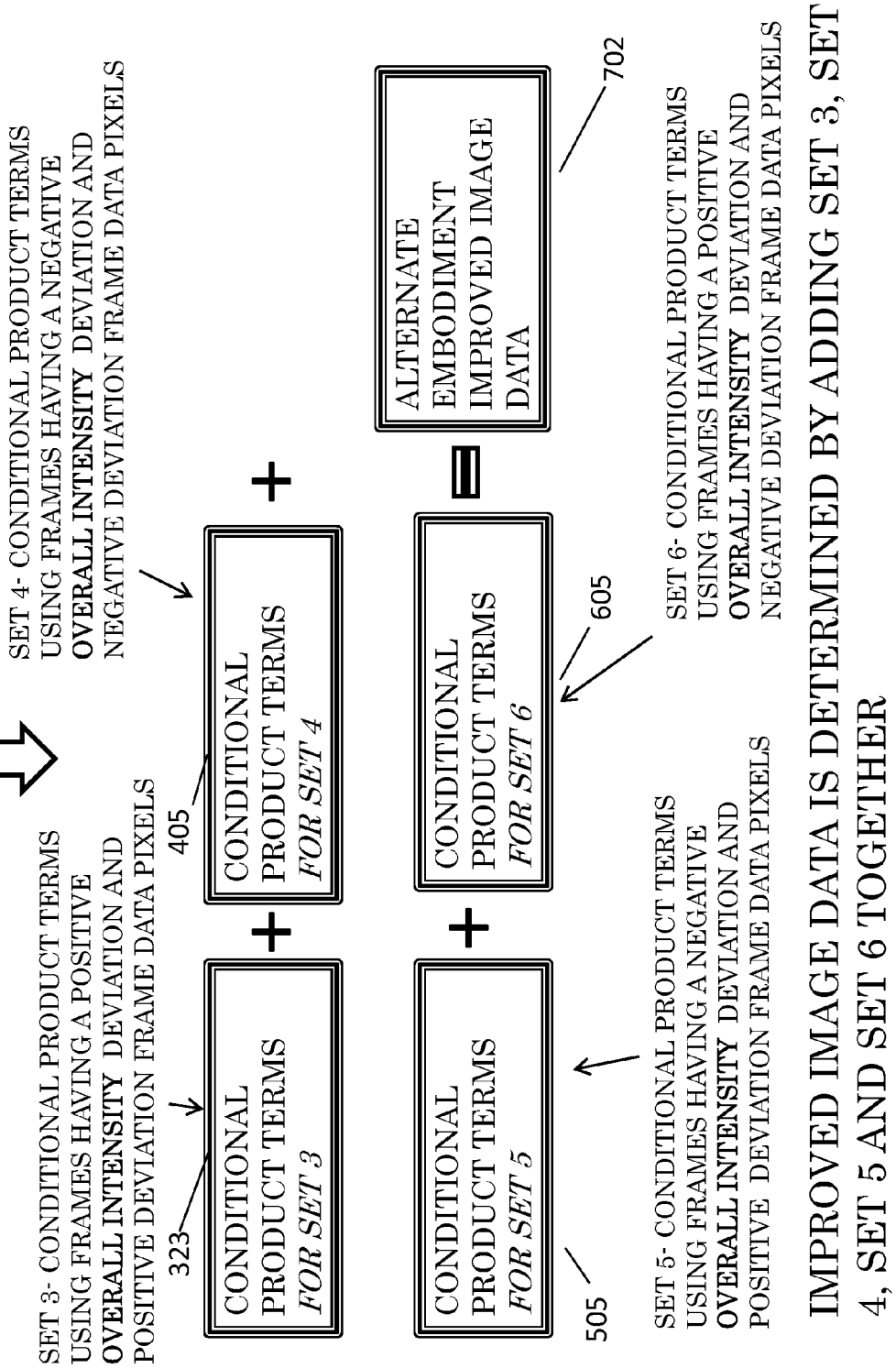

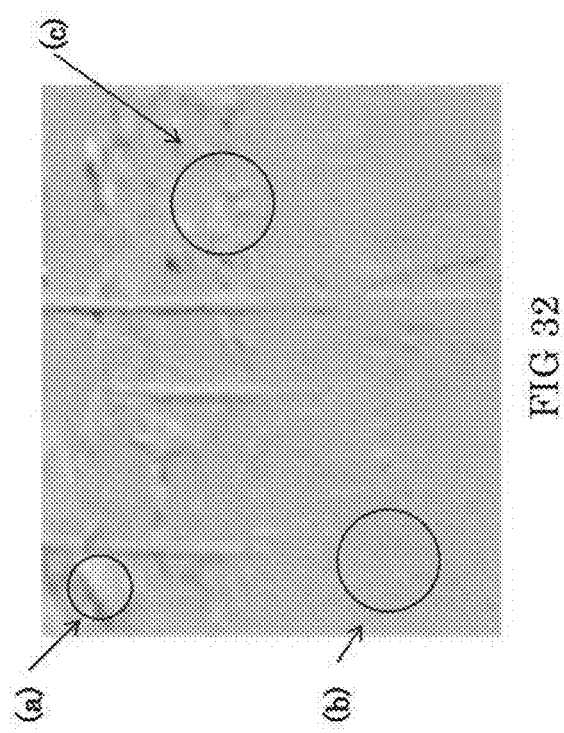

FIG 36: RESULTS OF A IMPROVED LOG IMAGE GENERATED USING INFRA RED

US 9,378,542 B2

SYSTEM AND PROCESSOR IMPLEMENTED METHOD FOR IMPROVED IMAGE QUALITY AND GENERATING AN IMAGE OF A TARGET ILLUMINATED BY QUANTUM PARTICLES

CROSS REFERENCE TO RELATED APPLICATIONS

This application is a divisional application of U.S. patent application Ser. No. 14/303,078 filed Jun. 12, 2014, which in turn is a continuation-in-part (CIP) application of and claims priority to U.S. patent application Ser. Nos. 14/086,463 and 14/022,148, filed Nov. 21, 2013 and Sep. 9, 2013, respectively, both herein incorporated by reference in their entirety. Those applications, in turn, are a continuation-in-part (CIP) application of and claim priority to U.S. patent application Ser. No. 13/838,249, filed Mar. 15, 2013, now U.S. Pat. No. 8,594,455 and U.S. patent application Ser. No. 13/247,470 filed Sep. 28, 2011, now U.S. Pat. No. 8,532,427, herein incorporated by reference in their entirety. This application also claims priority to U.S. Provisional Application No. 61/834,497, titled "System and Method for Image Enhancement and Improvement," filed on Jun. 13, 2013, herein incorporated by reference.

GOVERNMENT INTEREST

The invention described herein may be manufactured, used, and/or licensed by or for the United States Government without the payment of royalties.

BACKGROUND OF THE INVENTION

Image processing is a form of signal processing for which the input is an image, such as a photograph or video frame, and the output is either image or a set of characteristics or parameters related to the image. Forms of image processing include, for example, but are not limited to, face detection, feature detection, medical image processing, computer vision (extraction of information from an image by a computer), microscope image processing, etc.

Image resolution relates at least in part to the detail that an image possesses. For satellite images, generally speaking, an image is considered to be more detailed as the area represented by each pixel is decreased. As used herein, the term images include digital images, electronic images, film images, and/or other types of images. Cameras taking pictures from great distances, such as aerial photos, may not obtain detailed information about the subject matter. Consequently, subtle or detail information may not present in the images.

An image may be captured by, for example, a monochrome camera, a single charge-coupled device (CCD) or complementary metal-oxide semiconductor (CMOS) sensor and the image is formed via the light intensity projected onto the sensor therein.

In U.S. Pat. No. 7,536,012, to Meyers et al., hereby incorporated by reference, entitled "Entangled Quantum Communications and Quantum Imaging," there is disclosed, inter alia, a quantum imaging system (see Col. 8, line 50, et seq.) in which the sender sends an image of an image mask using entangled photons and coincidence measurements to a receiver. The system differs from the conventional quantum imaging set-up in that polarization beam splitters are placed in the path of the photons to provide two channels for each of the sender and the receiver, as shown in FIG. 4 of the '012 patent. On the sender's side, a photon beam is split by a beam splitter into first and second sub-beams. The first sub-beam is passed through a mask 164 which creates the image which is directed through a beam splitter 166 to bucket detectors 168, 170, which are operatively connected to a coincidence circuit. The second sub-beam is transmitted to the receiver without ever passing through the mask 164. In the embodiment of FIG. 4 of the '012 patent, the receiver receives the second sub-beam and an image of the mask is constructed based upon photon coincident measurements composited from two photon detectors 168 and 170, also referred to a bucket detectors. The image of a mask is transmitted via coincidences and the photons transmitting the image have never encountered the image mask. Because of the somewhat puzzling nature or circumstances of the transmission, the process has been dubbed by some as "Ghost Imaging," while others have explained the effects as resulting from the quantum properties of light.

SUMMARY OF THE INVENTION

According to embodiments, a processor implemented method for image improvement comprising: receiving a plurality of frames of a given region of interest, the frames comprised of a plurality of pixels; determining, based on a quantum property of the frames, a normalized pixel intensity value for each pixel of each of the plurality of frames; and generating an improved image of the given region of interest based on the plurality of frames and the corresponding normalized pixel intensity values for the frames, the order of the image being two.

The frames of a region of interest are readily influenced by the effects of turbulence, obscuration, low signal to noise ratio, bad or changing weather and/or low-lighting conditions. This leads to a poor image. Yet, by employing the novel image improvement method of the present invention, the image can be significantly improved ameliorating these negative effects. Unlike classical image improvement techniques conventionally-employed, the novel processing relies upon quantum properties.

The received frames may be generated by the detector—directly or indirectly. For instance, the frames could be output straight from the detector for processing, or the frame may be generated by the detector, stored in a memory, and retrieved from the memory for processing at some later time. Not all frames need to be used for processing for all applications. Indeed, in some implementations, fewer than the total number of frames can be used to determine an improved image of the region of interest.

The normalized pixel intensity value may be determined based on a quantum property of the same frame data which comes from the detector. As such, only one detector or measuring device may be needed in some embodiments. In general terms, the normalized pixel intensity values may be thought as of averaged intensity values. For instance, determining the normalized pixel intensity value of a frame may comprise: determining pixel values within a frame; summing pixel intensity values for determined pixel values within a frame; and dividing each summed pixel value by the number of determined pixel values to form a normalized pixel intensity value for each pixel in the frame.

Generating the improved image of the region of interest can then comprise: calculating (i) the average of the product of determined pixel values and the corresponding normalized pixel intensity values for the plurality of frames, and (ii) the product of the average of the determined pixels values for each frame and the average of normalized pixel intensity values for the plurality of frames. And, in some embodiments, generating the improved image of the region of interest comprises may include further comprising: taking the difference of (i) and (ii).

Calculating (i) the average of the product of determined pixel values and the corresponding normalized pixel intensity values for the plurality of frames, in some instances, may comprise: multiplying pixel values for determined pixels within each frame by the corresponding normalized pixel intensity values for that frame to produce a product for each frame; summing the products of all the frames; and determining the average of first product arrays by dividing the sum of product by the number of frames. And, calculating (ii) the product of the average of the determined pixels values for each frame and the average of normalized pixel intensity values for the plurality of frames, in some instances, may comprise: determining the average value of each pixel for each frame for the plurality of frames; determining the average normalized pixel intensity value for each pixel for the plurality of frames; and multiplying the average pixel values and the average of the normalized pixel intensity value for each pixel.

Determining pixels values within a frame for processing may be achieved by various methodologies, including one or more of: selecting all pixels within each frame; selecting pixel based upon at least one predetermined criterion; selecting pixels which are shifted a pre-determined distance away from select pixels; and/or determining an average value of adjacent pixels for select pixels. Practicing the image improvement method may further includes selecting at least one measurable property for determining a normalized pixel intensity value for each pixel of each of the plurality of frames; and using at least one different measurable property of the plurality of frames for generating the improved image. A measurable property may include: wavelength or wavelength band, color, polarity, polarization, orbital angular momentum, spin, a quantum particle; or any combination thereof.

Depending on the desired application, the frames can comprise regions of interest that are radiation emitting. Or the frames of a region of interest comprise sparse image data, and the improved image is generated using the sparse image data.

Select processing in generating the improvement image may be further employed, in some embodiments, based on differences among the frames. For instance, the image improvement method can further include: determining a frame intensity deviation value for each frame by subtracting the average frame intensity for the plurality of first frames from the frame intensity for each frame; and classifying the frame intensity deviation values for each frame based on whether the frame intensity deviation values is positive or negative. Then selecting processing for generating an improved image may be carried out based on the aforementioned classification. In addition, select processing may be carried out based on conditional product values for pixels. For example, the method can further comprise: calculating one or more conditional product values of the classified frame intensity deviation values for each frame; and selecting one or more of the conditional product values to generate the improved image. More, in some embodiments, at least two calculated conditional product values are treated differently based upon their classification. Or, all calculated conditional product values might be used to generate the improved image without any change thereto.

Additional refinements of the image improvement method may further be employed in many embodiments. These may comprise interpolating the pixel values for each frame to a finer resolution. Also, filtering of the frame data, the normalized pixel intensity value, and/or any data used in one or more calculations thereof, can be utilized to additional improve the generation of the image.

Iterating or repeating certain processing may also be employed in embodiments. For instance, providing an iterated improved image of the region of interest may comprises: specifying one or more pixel locations to be normalized to form the normalized pixel intensity value for each pixel; selecting new pixel locations based on a pre-determined pixel selection criteria from the values of the improved image of the region of interest; reviewing the new determined pixels to determine if the new determined pixel locations are substantially the same as the pixel locations previously determined pixel locations; and repeating the aforementioned steps until a specified iteration criteria is met.

According to embodiments, a system for image improvement comprises: at least one processor; and at least one input for receiving or inputting frames of data; and at least one memory operatively associated with the at least one processor adapted to store frames of data taken of a region of interest, each frame of data comprises an array of pixels, with each pixel having a pixel value. The at least one processor is configured to process a plurality of frames of a given region of interest according to one or more or the aforementioned image improvement method embodiments. The input may be operably connectable to an input device, such as, a scanner, a DVD player, CMOS camera, SPAD array, video camera, smart phone, plenoptic camera, cell phone, lidar, ladar, television, CCD or analog and/or digital camera.

According to other embodiments, a processor implemented method for image improvement comprises: receiving a plurality of frames of a given region of interest, the frames comprised of a plurality of pixels, each pixel including a value of at least one measurable property of quantum particles; specifying the order of the improved image to be generated, the order being greater than or equal to two; selecting at least one measurable quantum property for pixel values of the frames corresponding to the specified order; determining, based on the at least one measurable quantum property, normalized pixel intensity values for each pixel of each of the plurality of frames up to the specified order, to generate the improved image; and generating an improved image of the given region of interest based on the plurality of frames and the corresponding normalized pixel intensity values for the frames. The at least measurable quantum property can comprise, for example: wavelength or wavelength band, color, polarity, polarization, orbital angular momentum, spin, quantum phase, a quantum particle; or any combination thereof.

Additionally, according to embodiments, a system for generating an image of a target illuminated by quantum entangled particles. The system includes: an illumination system comprising: at least one source of quantum entangled particle pairs; and a beamsplitter receiving the quantum entangled particle pairs, such that one particle from each pair of particle generated by each source interfere on the beamsplitter causing the interfered particles to be directed towards a target and the remaining particle pairs are not directed towards the target, wherein the illumination system is configured so that the interfered particles interact with the target; a measuring system comprising a first detector and a second detector that are configured to perform at least one spatially resolved measurement of particles, where the first detector measures one of the remaining particle pairs and the second detector measures the other of the remaining particle pairs; and a processor configured to generate an image of the target based upon the correlated measured values and spatial information from the first detector and the second detector.

In some implementations, the system can further include: electronics configured to determine coincidences based on measurements of the first and second detectors which occur within a predetermined time interval. The processor can further be configured to generate at least a second order image using the coincidences. Also, the processor may be configured to apply an image improvement method for generating at least a second order image using at least one measurable quantum property.

In other implementations, the system may further include an optical delay element configured to introduce a time delay for particles reaching the measuring system. This optical delay element may, in some embodiment, be further configured to be operated so as to generate an absorption image of the target, a reflection image of the target, or both.

Additionally, the system may optionally include is some embodiment an optical delay line configured to ensure particle interference at the beamsplitter, and/or a phase modulator configured to modify the phase relationship between the particle pairs generated by the two sources of quantum entangled particle pairs, respectively.

In one particular embodiment, the illumination system comprises: a single source of entangled particle pairs; and a pair of beamsplitters receiving the entangled particles pairs, such that one particle from each pair of particles generated by each source interfere on the beamsplitter causing the interfered particles to be directed towards a target and the remaining particle pairs to be retained; wherein the illumination system is configured so that the interfered particles interact with the target causing absorption at the target entangling the retained particle pair.

In some embodiments, the system may be configured so that the interfered particles interact with the target causing absorption at the target entangling the retained particle pairs. And, it yet other embodiments, the system may be configured so that the interfered particles interact with the target causing reflection at the target and further comprises optics or focusing components and measurement electronics wherein the measurement of the reflected entangled particles entangled the retained particle pairs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 4 is a partial schematic block diagram illustration of the steps for performing an alternate preferred method of the present invention in which steps performed on the first set of frames are illustrated.

FIG. 5 is a partial schematic block diagram illustration of the steps for performing an alternate preferred method of the present invention in which steps performed on the second set of frames are illustrated.

FIG. 6 is a partial schematic block diagram illustration of the steps for performing an alternate preferred method of the present invention in which the refined image data for the second set is subtracted from the refined image data for the first set.

FIG. 7 is an illustration of a $G^{(2)}$ Virtual Ghost Image with turbulence using 10 k frames.

FIG. 8 is an illustration of a $G^{(2)}$ Ghost image computed using the 2 path configuration.

FIG. 9 is an illustration of the "Mean Bucket/Target Image" using 10 k frames.

FIG. 10 is an illustration of a "Self Bucket $G^{(2)}$ GPSR with turbulence" using 10 k Frames; data normalized globally 0-1; $\tau=1\times10^8$; Tol=$1\times10^{-6}$; Non Zero=67 (number of pixels not zero).

FIG. 11 is an illustration of a "Self Bucket G(2) GPSR" with turbulence 10 k Frames; Data normalized globally 0-1; $\tau=5\times10^7$; Tol=$1\times10^{-6}$; Non Zero=131.

FIG. 12 is an illustration of a "Self Bucket G(2) GPSR" with turbulence 10 k Frames; Data normalized globally 0-1; $\tau=2.5\times10^7$; Tol=$1\times10^{-6}$; NonZero=183.

FIG. 13 is an illustration of a "Self Bucket G(2) GPSR" with turbulence 10 k Frames; Data normalized globally 0-1; $\tau=1\times10^7$; Tol=$1\times10^{-6}$; Non Zero=304.

FIG. 14 is an illustration of a "Self Bucket $G^{(2)}$ GPSR" with turbulence 10 k Frames; Data normalized globally 0-1; $\tau=1\times10^6$; Tol=$1\times10^{-6}$; Non Zero=1310.

FIG. 15 is an illustration of a sample instantaneous data image.

FIG. 19A is a schematic block diagram of an alternate preferred embodiment.

FIG. 19B is a schematic block diagram of an alternate preferred embodiment similar to FIG. 19A but further including, inter alia, a channel 129 for transferring the measured bucket values to the processor.

FIG. 20C is a continuation of the schematic block diagram illustration of FIG. 20A.

FIGS. 21-31 are schematic block diagram illustrations of the steps for an alternate preferred embodiment to compute the fluctuation, or deviation from the mean value of the series of "bucket" measurements according to the alternate preferred embodiment.

FIG. 21 is schematic block diagram illustration of the steps to compute the fluctuation, or deviation from the mean value of the series of the per frame pixel measurements.

FIG. 22 is a partial schematic block diagram illustration which shows how to generate a third set of data which is referred to here at SET 3. The illustrated steps are performed on the above mean, above mean sets of frames.

FIG. 23 is a partial schematic block diagram illustration that is a continuation of FIG. 22.

FIG. 24 is a partial schematic block diagram illustration showing how to generate a fourth set of data which is referred to here at SET 4. The illustrated steps are performed on the below mean, below mean sets of frames.

FIG. 25 is a partial schematic block diagram illustration that is a continuation of FIG. 24.

FIG. 26 is a partial schematic block diagram illustration of the steps how to generate a fifth set of data which is referred to here at SET 5. The illustrated steps are performed on the above mean, below mean sets of frames.

FIG. 27 is continuation of the schematic block diagram illustration of FIG. 26.

FIG. 28 is a partial schematic block diagram illustration showing how to generate a sixth set of data which is referred to here at SET 6. The steps are performed on the below mean, above mean sets of frames.

FIG. 30 is a partial schematic block diagram illustration of the steps for performing an alternate preferred method of the present invention in which the improved final image is determined by adding the above-mean, above mean image to the below-mean, below-mean images, subtracting the above-mean, below-mean image, and subtracting the below-mean, above mean image.

FIG. 31 is a partial schematic block diagram illustration of the steps for performing an alternate preferred method of the present invention in which the improved final image is determined by adding the above-mean, above mean image, the below-mean, below-mean image, the above-mean, below-mean image, and the below-mean, above mean image.

FIG. 32 is an illustration showing results using a standard $G^{(2)}$ calculation to provide a baseline to demonstrate the advantages of the methods presented in this disclosure.

FIG. 36 is an illustration showing improved image results generated, wherein features such as the lamp post show much more contrast and edge clarity.

DETAILED DESCRIPTION OF THE PREFERRED EMBODIMENTS

Figure 1:
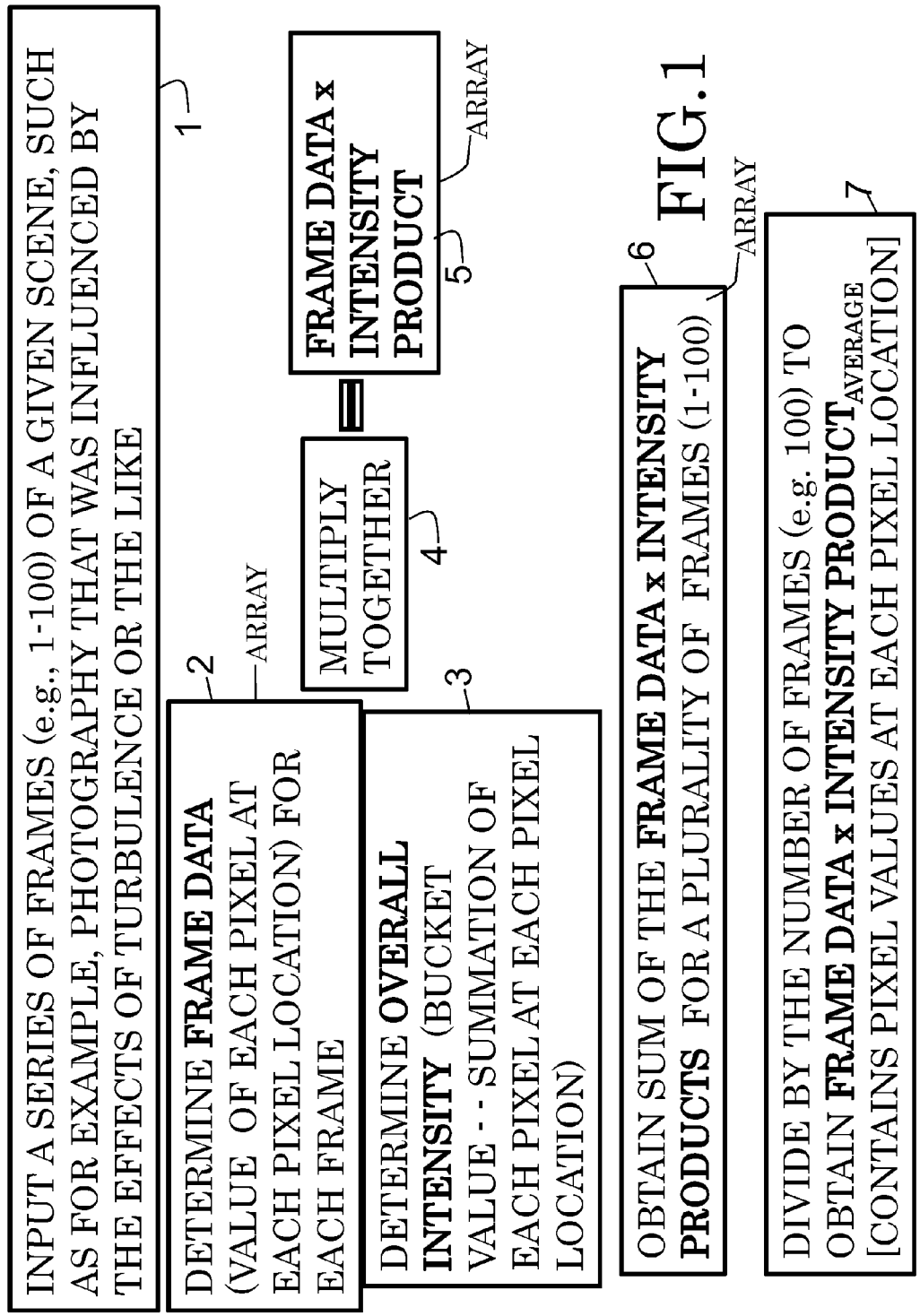
FIG. 1 is a partial schematic block diagram illustration of the steps for performing a preferred method of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

It will be understood that, although the terms first, second, etc. may be used herein to describe various groups, subgroups, elements, components, regions, layers and/or sections, these groups, subgroups, elements, components, regions, layers and/or sections should not be limited by these terms. For example, when referring first and second groups or subgroups, these terms are only used to distinguish one group, subgroup, element, component, region, layer or section from another group, subgroup, region, layer or section. Thus, a first group, subgroup, element, component, region, layer or section discussed below could be termed a second element, component.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention provides a method and system for the enhancement of images using the quantum properties of light or matter. An embodiment of the present invention increases the image quality of an object or scene as seen by a detector. When a low quality detector is aimed at an object, a high quality image is generated using the quantum properties of light. A low quality detector picks up quantum information on the object shape and its temporal relations to reference fields. The reference fields may be recorded by the same imager (CCD, camera, etc.) that acts as a bucket detector (that is, it does not necessarily contain spatial information). Current imaging methods are limited to the quality of the detector looking at the object being imaged. A preferred embodiment generates an improved quality image of the object without the object being imaged in high resolution directly. The preferred method may be used in connection with photographs taken during turbulent conditions.

An alternate embodiment comprises computing the average overall intensity of a plurality of frames and arranging the frames into two sets. A first set contains the frames having frame intensities greater than the average overall intensity for all frames; the average overall intensity being the summation of the intensities for frames divided by the number of frames. The second set containing frames having an overall intensity less than the average overall intensity. Each of the first and second sets is processed by repeating steps (a) through (i). The result obtained using the second set of frames is then subtracted from the result obtained using the first set of frames to create the image.

Yet another embodiment includes a method for image improvement that comprises: providing a series of frames of a given region of interest; determining the value of each pixel within each frame to form a first array of pixel values; determining the integral of pixel values of each frame to form a second array of overall frame integrals; partitioning the first array into two sets based on a predetermined criteria; partitioning the second array into two sets based on a predetermined criteria; using the first and second sets of the first and second arrays to compute a conditional product term for each of the four combinations of the first and second sets of the first and second arrays; and combining the conditional product terms to provide an improved image of the region of interest.

And yet a further embodiment includes a method for image improvement comprising providing a series of frames of a given region of interest; determining the value of each pixel at each location within each frame to form a first array of pixel values for each frame; determining the overall intensity of each frame; determining the product of the overall intensity and the array of pixel values for each frame; determining the sum of the products by adding together the products of the overall frame intensity and first array of pixel values for each frame; determining the average of the sum of products by dividing the sum of products by the number of frames in the series of frames; determining the average value of each pixel at each pixel location for the series of frames to form a second array of average pixel values; determining the average overall frame intensity for the series of frames; determining a second product of the second array of average pixel values and the average overall frame intensity; subtracting the second product from the first product to provide an improved image of the region of interest; partitioning the improved image into at least two partitions based on a predetermined criteria; mathematically operating upon the partitioned improved image to increase image contrast or image clarity.

The current invention utilizes the ability to increase the image quality of an object as seen by a detector using methods relating to the Quantum nature of light. For example, when a low quality detector is aimed at an object, then a high quality image may be generated based on the quantum properties of light. The high quality image is generated even in the presence of turbulence which might otherwise be disruptive to image clarity. Scattering of quantum particles such as photons off the object carries information of the object shape even when the quantum particles such as photons do not go directly into the camera or detector. An additional low quality bucket detector (such as, for example, a detector lacking spatial information) records quantum information on the object shape and its temporal relations to collocated reference fields. The reference fields may be recorded by the same type of imager (CCD, Camera, etc.) that looks at the object and which act like bucket detectors in U.S. Pat. No. 7,536,012, referenced in the foregoing.

Current imaging methods are limited to the quality of the detector looking at the object being imaged. Embodiments of this invention enable an image quality improvement by using techniques developed in the course of Ghost Imaging experiments, and includes, but is not limited to, methods to generate a high quality image of the object without the object being imaged in high resolution directly; i.e., low resolution images may be enhanced, thereby enabling high quality imaging when only low quality images of the object are imaged directly.

Second Order Imaging

Imaging of a scene or subject is typically accomplished by mapping an illuminated scene or subject onto an image sensor where there is a light measurement component such as film, CCD, or other sensing device. Light consists of a plurality of photons that may be measured. The illuminating light may be from one or more light sources either natural or artificial, or both. Common sources of light include for example the sun, coherent, incoherent, or partially coherent light, entangled photons, infrared radiation emitted by atoms and molecules, accelerating charges, lasers, light bulbs, light emitting diodes (LEDs), chaotic laser light, pseudo-thermal light generated by passing laser light through a rotating ground glass or other scattering material, stars, moons, clouds, planets, space objects, fluorescent lamps, electrical discharges, plasmas, bio-luminescence, and stimulated emission. Although it is not absolutely necessary a lens is often used to perform this mapping. Imaging is often susceptible to adverse affects such as obscuration, turbulence, low signal to noise ratio such as when operating in low-light conditions, jitter, and noise. Often, this type of imaging is referred to as "First Order" imaging due to the time, ensemble, or mixed time-ensemble averaging of the sensors involved. For instance, a first-order light intensity image $I(x, y, t)$ can be produced by light interacting with a sensor for some time $\Delta t$, i.e. shutter or integration time. A single instance of this may be referred to as a "frame". Multiple frames of images, $I(x, y, t_i)$, may be averaged over some or all of the frames in a sequence of frames to generate an averaged first-order image of the subject $<I(x, y, t_i)>$ where $<>$ indicates an ensemble average. A second order image involves averages of products of two first-order intensity or normalized intensity measurements. An enhanced image results from the subtraction of products of averages of first order intensities from the average of the product of the intensities. An intensity or normalized intensity can be decomposed into a mean ($<I_1>$) plus a deviation from the mean or average ($\Delta I_1$).

The terms $I_1$ and $I_2$ are intensities or normalized intensities measured by sensors 1 and 2, $I_1 = <I_1> + \Delta I_1$ and $I_2 = <I_2> + \Delta I_2$ with $I_1$ and $I_2$ being functions of space and time, i.e., x, y, t. $<I_1>$ is the ensemble average of intensity or normalized measurements of sensor 1 and $\Delta I_1$ is the deviation from the mean for the intensity or normalized intensity measurements of sensor 1. $<I_2>$ is the ensemble average of intensity or normalized measurements of sensor 2 and $\Delta I_2$ is the deviation from the mean for the intensity or normalized intensity measurements of sensor 2. The deviation is often called a fluctuation.

Mathematically the second-order enhanced image can be described by $<I_1 I_2> = <<I_1><I_2> + \Delta I_1<I_2> + \Delta I_2<I_1> + \Delta I_1 \Delta I_2>$. Simplifying this expression yields $<I_1 I_2> = <I_1><I_2> + <\Delta I_1 \Delta I_2>$. Similarly $$\langle \Delta I_1 \Delta I_2 \rangle = \langle (I_1 - \langle I_1 \rangle)(I_2 - \langle I_2 \rangle) \rangle$$
$$= \langle I_1 I_2 - I_1 \langle I_2 \rangle - I_2 \langle I_1 \rangle + \langle I_1 \rangle \langle I_2 \rangle \rangle$$
$$= \langle I_1 I_2 \rangle - 2 \langle I_1 \rangle \langle I_2 \rangle + \langle I_1 \rangle \langle I_2 \rangle.$$

$$\langle \Delta I_1 \Delta I_2 \rangle = \langle I_1 I_2 \rangle - \langle I_1 \rangle \langle I_2 \rangle.$$

A higher order enhanced image can be described with similar expressions. For example a $3^{rd}$ order image can be described by $$<\Delta I_1 \Delta I_2 \Delta I_3> = <(I_1 - <I_1>)(I_2 - <I_2>)(I_3 - <I_3>)>$$

$<\Delta I_1 \Delta I_2 \Delta I_3> = <I_1 I_2 I_3> - <I_1><I_2><I_3>$ and a $N^{th}$ order enhanced image may be described by $$<\Delta I_1 \Delta I_2 \ldots \Delta I_N> = <I_1 I_2 \ldots I_N> - <I_1><I_2> \ldots <I_N>.$$

$I_1 \ldots I_N$ may be selectable by user as follows. For instance, an imaging system may be configured to provide at least one measurement value for at least one spatial location of a region of interest. The spatial location can be represented by position within an array of "pixels". A frame of measured values may be composed of a plurality of pixels, typically in an at least one-dimensional array that together may form an image. Exemplary frames may be electronic image data such a TIFF or JPEG file. The measured values can be assigned to variables $I_1, I_2, \ldots, I_N$ in a variety of ways. As an example, when the imaging system provides a single color, or gray scale, image of the region of interest per frame then each measured pixel value may be assigned to variable $I_1$, and variable $I_2$ may be assigned the value of the sum of the measurement pixel values per frame. For a different embodiment $I_2$ may be, for instance, assigned the measured values of a particular pixel, say pixel i=12, j=300, and variable $I_3$ assigned the measured values of pixel, i=522, j=207 where i and j are indices into the 2D arrays of measured values. Generally, each measured value assigned to one of the $I_N$ variables may be selected by the user to meet the requirements for their specific application. At least one of the variables $I_N$ must be assigned positions that correspond to the pixel positions of the measured pixel value arrays provided by the imaging system at known pixel position coordinates.

In an example of a second order improved image, $I_1$ and $I_2$ may refer to intensities measured by at least two sensors where one of the sensors measures spatial information of the light ($I_1$) coming from the scene or subject (the "Reference" sensor) and the other sensor measures a quantity representative of the intensity ($I_2$) coming from the scene or subject, i.e. a "the bucket" sensor. One of the sensors may be a "virtual" sensor wherein, for instance, the representative intensity coming from the scene or subject is comprised of spatially integrating all or a selected subset of pixels on a CCD or CMOS camera or even consist of a single pixel from a CCD or CMOS camera. The enhanced image is contained in $<\Delta I_1 \Delta I_2>$ which has a δ-function like correspondence between points on the object and points on the image sensor and is largely unaffected by the degrading effects of turbulence, obscuration, low signal to noise ratio such as when operating in low-light conditions, jitter, and noise. See for example, Meyers et al., "Turbulence-free ghost imaging," Appl. Phys. Lett. 98, 111115, 2011, herein incorporate by reference.

A preferred method for practicing the present invention may be correlated to the mathematical representations as follows. Expressed using the terms $I_1$ and $I_2$, a preferred method for image improvement comprises inputting a series of frames of an image; determining the value of each pixel at each location within each frame to form a pixel value array for each frame; summing the pixel values in each frame to obtain the frame intensity for each frame (correlates to determining $I_2$); multiplying the pixels in pixel value array by the frame intensity to produce a frame intensity multiplied pixel value array (correlates to determining the product $I_1 I_2$); summing the frame intensity multiplied pixel value arrays together and dividing by the number of frames to obtain an average of the frame intensity multiplied pixel value arrays (correlates to determining $<I_1 I_2>$); using the pixel value arrays, creating an array of average pixel values (correlates to determining $<I_1>$); determining the average frame intensity for the series of frames (correlates to determining $<I_2>$); multiplying the array of average pixel values by the average frame intensity for all of the inputted frames (correlates to the product $<I_1><I_2>$); and subtracting the array of average pixel values multiplied by average frame intensity ($<I_1><I_2>$); from the average of the frame intensity multiplied pixel value arrays (correlates to $<I_1 I_2>$) to provide an array of modified pixel values to form an improved image $<\Delta I_1 \Delta I_2>$ second order image (which, from the previously expresses mathematical equations correlates to the equation $<\Delta I_1 \Delta I_2> = <I_1 I_2> - <I_1><I_2>$).

Other preferred methods may include the normalizing of the intensity to produce an enhanced image. There are several ways to normalize intensity. One way is to divide the Reference pixel intensity values by a non-zero value "bucket" intensity, $J_1 = I_1/I_2$. This normalization would give $J_1 = <J_1> + \Delta J_1$ and $I_2 = <I_2> + \Delta I_2$ with $J_1$ and $I_2$ being functions of space and time, i.e. x, y, t. Where $J_1$ and $I_2$ are normalized intensities and intensities measured by sensors 1 and 2. $<J_1>$ is the ensemble average of intensity or normalized measurements of sensor 1 and $\Delta J_1$ is the deviation from the mean for the normalized intensity measurements of sensors 1 and 2. $<I_2>$ is the ensemble average of intensity or normalized measurements of sensor 2 and $\Delta I_2$ is the deviation from the mean for the intensity or normalized intensity measurements of sensor 2. The deviation is often called a fluctuation.

Mathematically the second-order enhanced image can be described by $<J_1 I_2> = <<J_1><I_2> + \Delta J_1 <I_2> + \Delta I_2 <J_1> + \Delta J_1 \Delta I_2>$. Simplifying this expression yields $$<J_1 I_2> = <J_1><I_2> + <\Delta J_1 \Delta I_2>,$$

rearranging terms yields $$<\Delta J_1 \Delta I_2> = <J_1 I_2> - <J_1><I_2>$$

wherein the enhanced image is contained in $<\Delta J_1 \Delta I_2>$. The enhanced image may be normalized by the product of the standard deviations of $I_1$ and $I_2$ to generate an enhanced image that displays the correlation of $I_1$ and $I_2$. Other alternative ways to normalize the enhanced image include dividing $<\Delta I_1 \Delta I_2>$ or $<\Delta I_1 \Delta I_2>$ by the product $<J_1><I_2>$ or $<I_1><I_2>$ respectively.

One embodiment of the current invention comprises the subject area illumination being generated by one or more light sources which can be internal, external or a mixture of external and internal light sources. Examples of external light sources include the sun, coherent, incoherent, or partially coherent light illuminating the subject area generated by natural or artificial means indoors or out of doors propagating through any transmissive or partially transmissive media such as the air, water, or biological tissue including cells. Examples of internal light sources include the subject emanating light in the infrared given off by atoms and molecules. Light received may be reflected, scattered, or emanated from the subject into at least one first receiver at predetermined time intervals. Light may be received at the at least one second receiver at corresponding time intervals from the light source which may be reflected or partially reflected from the subject and contains spatial information. The first and second receivers may be selected from, for example, one or more arrays of pixels from one or more cameras, imagers, CCDs, etc. In a preferred embodiment, the measured values are transmitted from the first and second receivers to the at least one processor. The measured values of the at least one first receiver are then correlated with the spatially resolved measurements of the at least one second receiver at the corresponding intervals of time. A first image of the subject is then created based upon the correlated measured values and spatial information by combining the spatial information from at least one second receiver at predetermined intervals of time with the measured values from at least one first receiver at the corresponding intervals of time. An enhanced second image of the subject is generated by removing the blurred, distorted or noisy averaged first-order image part from the first image. The first order image part may be removed by subtraction or other equivalent mathematical operation.

It is to be appreciated that the methods and techniques described in this invention can be applied to microscopy. Microscopy of biological samples in particular can be degraded by the transmission and scattering of light propagating through scattering and absorbing media that can significantly degrade the quality of the image. It is to be appreciated that substituting a microscope objective for a telescope as described in certain embodiment only alters the focal length of the optical system and does not affect the image enhancement properties of this invention.

Another embodiment would entail generating enhanced images using intensity products where more than two intensity measurements are available. This is especially useful for when the intensity deviations do not follow Gaussian statistics. This would involve simultaneous measurements of three or more sensors at a time. Our method would be applied to generate enhanced images of the form $<\Delta I_1 \Delta I_2 \Delta I_3>$, $<\Delta I_1 \Delta I_2 \Delta I_3 \Delta I_4>, \ldots, <\Delta I_1 \Delta I_2 \ldots \Delta I_N>$. This has application to the investigation of turbulence, finding of non-classical photon behavior and as a research tool exploring higher order correlation statistics, the investigation of the fundamental nature of quantum physics such as non-local correlations, Bell inequalities, and EPR effects.

There is a trend in modern imaging devices, i.e. cameras, to provide more measured quantities at each pixel. Thus, the intensity measurements may include measurements such as wavelength (color or derived color mappings such as RGB, CMY, CMYK, etc.), polarization, Stokes parameters, spatial modes, orbital angular momentum (OAM), spin, etc. For example, a color camera may provide separate wavelength measurements, red (R), green (G), and blue (B) intensity values at each pixel, the polarization Stokes parameters at each pixel, and modern infrared (IR) cameras can provide measurements of long-wave infrared (LWIR) and mid-wave infrared (MWIR) intensities at each pixel of the imaging device, or combinations of these measurements. In the current invention at least one of the available measured quantities is selected to provide the frame data for the generation of the improved image of the region of interest.

It is to be appreciated that measurements of quantities such as wavelength and polarization are typically dependent on the responsiveness of the measurement device to the quantity being measured. As an example, color cameras typically use band-pass filters arranged in a pattern over the pixels of the measurement device. These filters are usually labeled Red, Green, and Blue (R, G, and B). The wavelengths that each of the R, G, G filters pass is centered at a particular wavelength and also passes nearby wavelengths with wavelengths being more distant from the center wavelength being more highly attenuated. This effect is referred to as the bandwidth of the filter. Polarization filters have similar bandwidths with respect to the orientation of the filter. The responsiveness to wavelength, polarization, etc., of an element on a measurement may also be adjusted by applying, for example, larger or smaller voltages to increase or decrease the degree to which each element (pixel) reacts to the wavelength or polarization of light that interacts with that pixel.

It is to be further appreciated that information that can be extracted from measurements made by at least one sensor may exist over a spectrum or bandwidth of time and space scales and that extraction of such information may be facilitated by electronic, computational, and/or optical filtering. For example, electronic filtering of measurements to emphasize lower or higher frequencies may enhance the observation of correlations between sensor measurements and improve the generated enhanced images. The character and amount of electronic and/or optical filtering needed to optimize enhanced images may vary with the types and makeup of the sensors used, the physical properties of the area of interest, the physical properties of the source of illumination, the nature and physical properties of the intervening regions, (e.g. atmosphere, ocean, biological tissue, material, outer space, obscurants, etc) between the sensors, illuminators, and the region of interest. By physical properties we also mean to include physical, chemical, biological, and electronic properties.

Referring now to FIG. 1, in accordance with one preferred embodiment, in Box 1 a series of frames are inputted into the memory or input of a processor or image processor. The frame may be composed on a plurality of pixels, typically in a two-dimensional (2D) array, that together form an image. Exemplary frames may be electronic image data such a TIFF or JPEG file. As used herein the terminology "processor" or "image processor" as used in the following claims includes a computer, multiprocessor, CPU, minicomputer, microprocessor or any machine similar to a computer or processor which is capable of processing algorithms. The frames may comprise photographs of the same region of interest. The region of interest may be a scene, landscape, an object, a subject, person, or thing. In Box 2, the frame data or value of each pixel at each pixel location is determined for a frame. In Box 3, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. At Box 4, the values in Box 2 are multiplied by the value determined in Box 3. Box 5 represents the Frame Data×Intensity Product for the frame. Inasmuch as the Frame Data is an array of pixel values, the Frame Data×Intensity Product is also an array of values. At Box 6, the products of Box 5 (Frame Data×Intensity Product) are repeated for each frame in a selected plurality of frames. As an example, one hundred frames may be selected. At Box 7, the summation of the Frame Data×Intensity Products for the plurality of frames determined in Box 6 is divided by the number of frames (such as for example one hundred) to determine the Frame Data×Intensity Product Average for the plurality of frames. As noted in Box 7, this Product Average is an array containing pixel values at each pixel location within the frame.

Figure 2:
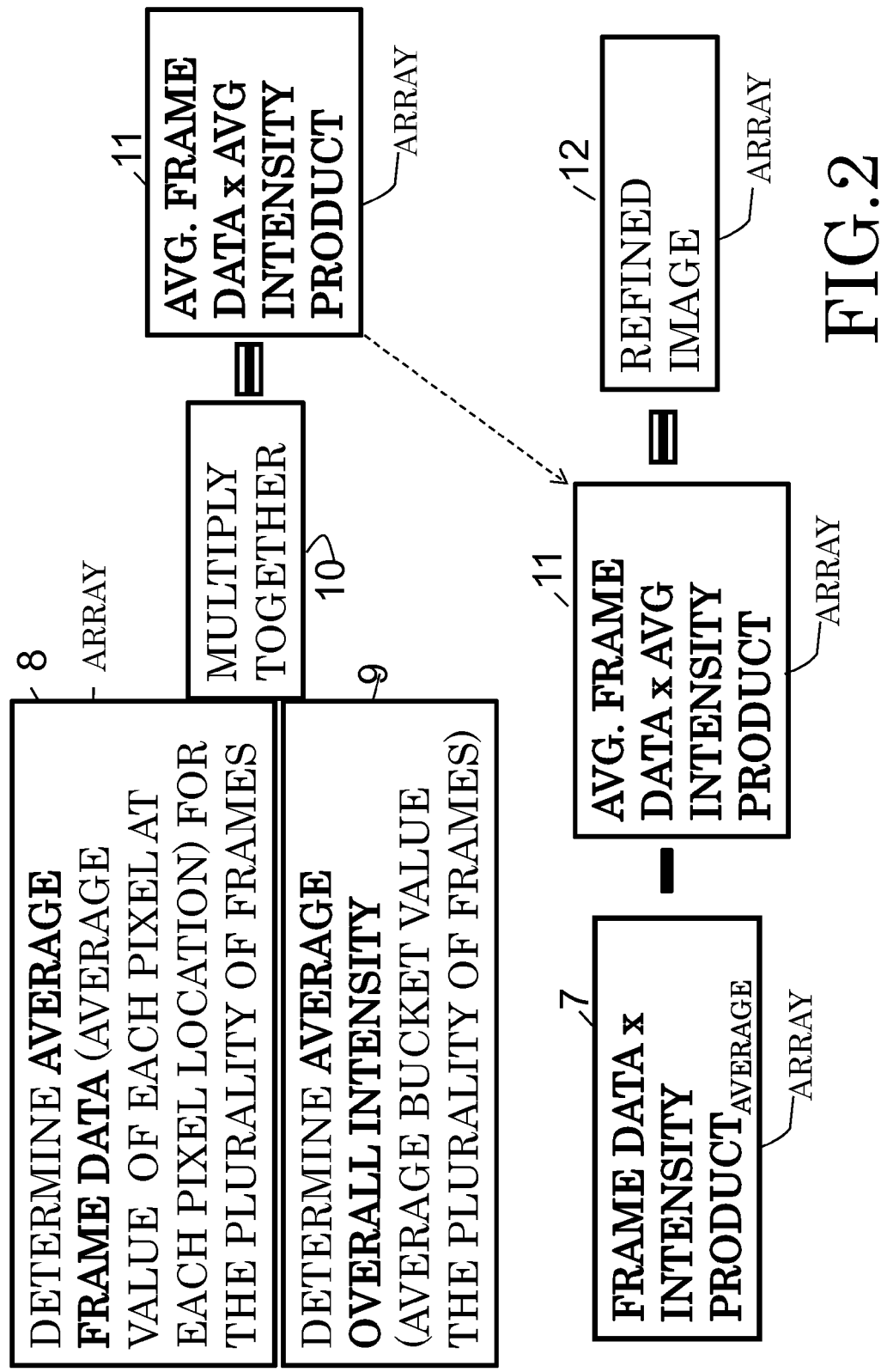
FIG. 2 is a schematic block diagram illustration of the steps for performing a preferred method of the present invention. Taken together, FIGS. 1 and 2 outline the steps of a preferred methodology for the present invention.

FIG. 2 is a further description of a methodology of the present invention. Note that Box 7 is carried over from FIG. 1 into FIG. 2. In Box 8, the average frame data (or average value of each pixel at each pixel location) is determined for the plurality of frames (e.g. 100) by averaging the pixel values at each pixel location for the plurality of frames to determine an array of average pixel values. In Box 9, the average overall intensity for the plurality of frames is determined. The is similar to the determination of Box 3 except that Box 3 is a determination for a frame and Box 9 is an average for a plurality of frames. As stated with respect to Box 3, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8 and 9 to form the Average Frame Data×Average Intensity Product, which is an array. As shown in the bottom portion of FIG. 2, the Average Frame Data×Average Intensity Product is subtracted from the Frame Data×Intensity Product Average to form the refined image of Box 12.

It is postulated that the preferred methodology in effect subtracts out or negates the effects or errors due to the effects of turbulence or the like. Most fluctuations caused by turbulence occur at the "edges" of objects. The algorithm focuses on the edges of letters, objects, etc. to refine the image edges.

Figure 3:
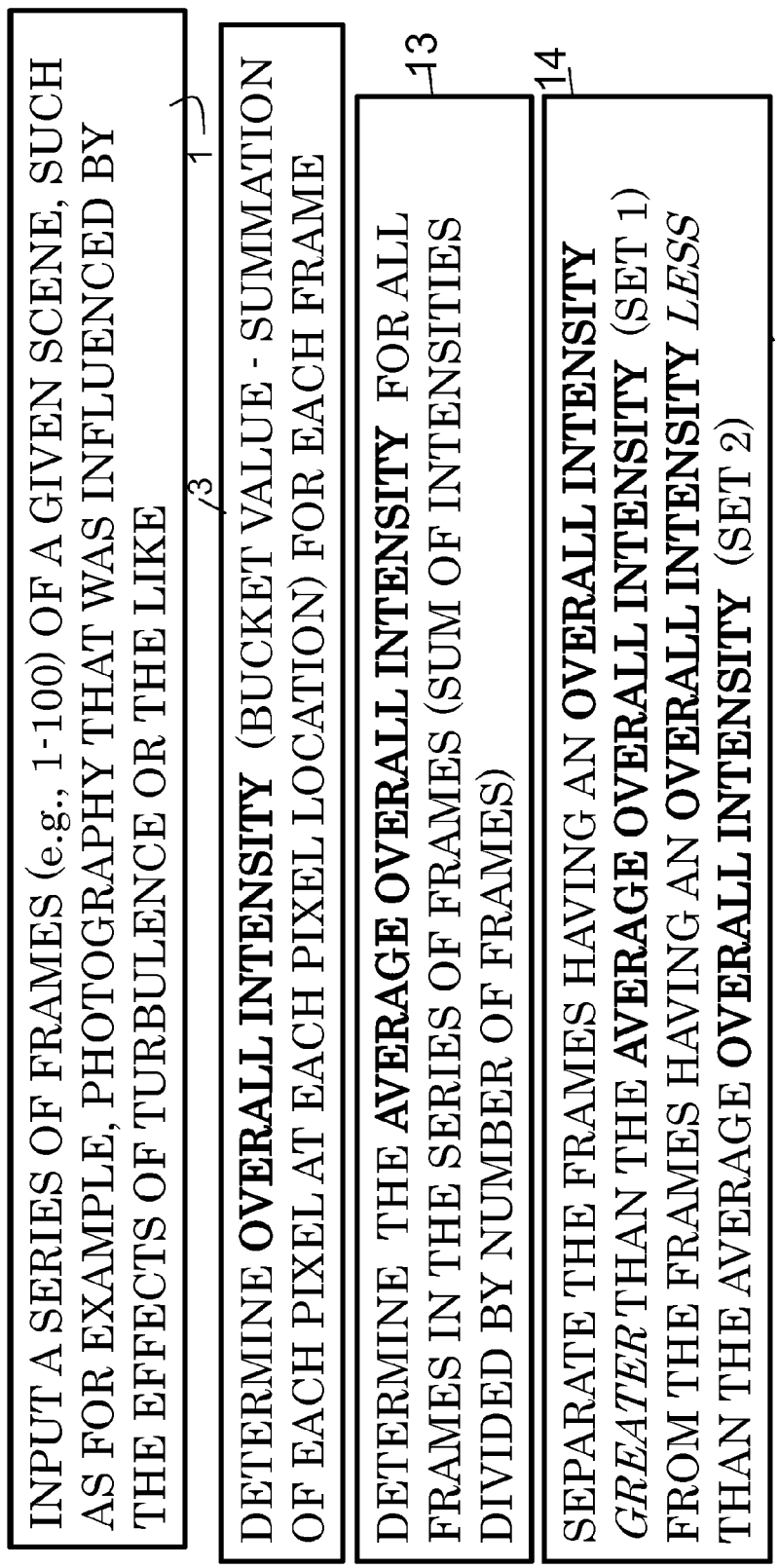
FIG. 3 is a partial schematic block diagram illustration of the steps for performing an alternate preferred method of the present invention in which steps for dividing the frames into two sets are illustrated.

FIG. 3 is a partial schematic block diagram illustration of the steps for performing an alternate preferred method of the present invention in which steps for dividing the frames into two sets are illustrated. In Box 1 a series of frames are inputted into the memory or input of a processor or image processor. The frames may comprise photographs of the same region of interest. The region of interest may be a scene, landscape, an object, a subject, person, or thing. In Box 3, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. In Box 13, the average overall intensity for all frames in the inputted (see Box 1) is computed. To determine the average overall intensity, the summation of the intensities for frames is divided by the number of frames. In Box 14, the frames are separated into two sets; set one contains frames having an overall intensity greater than the average overall intensity (derived in Box 13) and set two contains frames having an overall intensity less than the average overall intensity (derived in Box 13)

FIG. 4 is a partial schematic block diagram illustration in which steps performed on the first set of frames are illustrated. The figure shows how to generate a first set of data which is referred to here at SET 1. SET 1 frame set includes frames having an overall intensity greater than the average overall intensity. The steps are comparable in effect to the similarly numbered frames in FIGS. 1 and 2, as denoted by the addition of a letter "A" suffix to the correlating element number. In Box 2A, the frame data or value of each pixel at each pixel location is determined for a frame. In Box 3A, the overall intensity ("bucket value") of the frame is determined. In the case of a picture, the overall intensity correlates to the sum of the reflected illumination. In the case of an electronic display formed by pixels, the overall intensity is the summation each pixel value at each pixel location within a given frame. At Box 4, the values in Box 2A are multiplied by the value determined in Box 3A. Box 5A represents the Frame Data×Intensity Product for the frame. Inasmuch as the Frame Data is an array of pixel values, the Frame Data×Intensity Product is also an array of values. At Box 6A, the products of Box 5A (Frame Data×Intensity Product) are repeated for each frame in the first set of frames. At Box 7A, the summation of the Frame Data×Intensity Products for the plurality of frames determined in Box 6A is divided by the number of frames (such as for example one hundred) to determine the Frame Data×Intensity Product Average for the first set of frames. As noted in Box 7A, this Product Average is an array containing pixel values at each pixel location within the frame.

In the lower portion of FIG. 4, note that Box 7A is repeated as shown by the arrow. In Box 8A, the average frame data (or average value of each pixel at each pixel location) is determined for the first set of frames by averaging the pixel values at each pixel location for the first set of frames to determine an array of average pixel values for the first set. In Box 9A, the average overall intensity for the first set of frames is determined. This is similar to the determination of Box 3A except that Box 3A is a determination for a frame and Box 9A is an average for a plurality of frames. As stated with respect to Box 3A, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8A and 9A to form the Average Frame Data×Average Intensity Product, which is an array. As shown in the bottom portion of FIG. 4, the Average Frame Data×Average Intensity Product is subtracted from the Frame Data×Intensity Product Average to form the refined image of Box 12A.

FIG. 5 is a partial schematic block diagram illustration of the steps for performing an alternate preferred method of the present invention in which steps performed on the second set of frames are illustrated. The figure shows how to generate a second set of data which is referred to here at SET 2. The SET 2 frame set includes frames having an overall intensity less than the average overall intensity.

The steps are comparable in effect to the similarly numbered frames in FIGS. 1, 2, and 4 as denoted by the addition of a letter "B" suffix to the correlating element number. In Box 2B, the frame data or value of each pixel at each pixel location is determined for a frame. In Box 3B, the overall intensity ("bucket value") of the frame is determined. In the case of a picture, the overall intensity correlates to the sum of the reflected illumination. In the case of an electronic display formed by pixels, the overall intensity is the summation each pixel value at each pixel location within a given frame. At Box 4, the values in Box 2B are multiplied by the value determined in Box 3B. Box 5B represents the Frame Data×Intensity Product for the frame. Inasmuch as the Frame Data is an array of pixel values, the Frame Data×Intensity Product is also an array of values. At Box 6B, the products of Box 5B (Frame Data×Intensity Product) are repeated for each frame in a second set of frames. At Box 7B, the summation of the Frame Data×Intensity Products for the plurality of frames determined in Box 6B is divided by the number of frames (such as for example one hundred) to determine the Frame Data×Intensity Product Average for the second set of frames. As noted in Box 7B, this Product Average is an array containing pixel values at each pixel location within the frame.

In the lower portion of FIG. 5, note that Box 7B is repeated as shown by the arrow. In Box 8B, the average frame data (or average value of each pixel at each pixel location) is determined for the first set of frames by averaging the pixel values at each pixel location for the first set of frames to determine an array of average pixel values for the first set. In Box 9B, the average overall intensity for the second set of frames is determined. This is similar to the determination of Box 3B except that Box 3B is a determination for a frame and Box 9B is an average for a plurality of frames. As stated with respect to Box 3B, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8B and 9B to form the Average Frame Data×Average Intensity Product, which is an array. As shown in the bottom portion of FIG. 5, the Average Frame Data×Average Intensity Product is subtracted from the Frame Data×Intensity Product Average to form the refined image of Box 12B.

FIG. 6 is a partial schematic block diagram illustration of the steps for performing an alternate preferred method of the present invention in which the refined image data for the second set is subtracted from the refined image data for the first set to form enhanced image data (Box 12C).

Another alternate preferred method of the present invention applies the use of techniques from the field of Compressive Imaging or Compressive Sensing. In this embodiment the "bucket" values for each frame of the series is computed by integrating the values of the pixels within each frame. This bucket data is stored for use per Eq. 5 below. The pixel values for each frame of the series are stored as a row in a matrix J. The improved image is computed by application of a Compressive Imaging inversion algorithm such as GPSR to solve Eq. 6. The improved image is returned in the matrix R.

Virtual Ghost Imaging

Virtual Ghost Imaging refers to an imaging process which creates an enhanced image from a series of frames of an imaging subject based on a process related to Ghost Imaging.

Virtual Ghost Imaging in the current instance applies the following process to a series of frames of an imaging subject. Inasmuch as the overall frame intensity value determined in Box 3 correlates to the "bucket" value, a brief discussion of ghost imaging and reflective ghost imaging follows. Typically ghost imaging uses two detectors, one to observe the light source and the other, single pixel or bucket detector, to observe the light scattering and reflecting from the target object.

$$G^{(2)} = \langle I(x,y,t)_{source} I(t)_{bucket} \rangle - \langle I(x,y,t)_{source} \rangle \langle I(t)_{bucket} \rangle \quad (1)$$

where $\langle \ \rangle$ denotes an ensemble average. If $I_{source}$ and $I_{bucket}$ are recorded from the same target object, $I_{bucket}$ may be computed as $$I(t) = \int dxdy I(x,y,t)_{source} \quad (2)$$

Basic Virtual Ghost Imaging

Results of an experiment conducted through turbulence using chaotic laser or pseudo-thermal light are presented in FIG. 7. FIG. 8 shows the same target computed with data taken using a typical two path configuration.

FIG. 8 shows the average of the target images that were captured through turbulence. Note the blurriness and lack of definition of the letters. As one can see the "ARL" in FIG. 7 is a visually better image than that displayed FIG. 9. However, the "true" ghost image displayed in FIG. 8 has better contrast and definition of the letters than FIG. 7 or FIG. 9. This is likely due to the use of a reference field that has not been altered by interaction with a target object.

Accelerated (Compressive Imaging) $G^{(2)}$ Virtual Ghost Imaging

A relatively new mathematical field named Compressive Sensing (CS) or Compressive Imaging (CI) can be used to good effect within the context of ghost imaging. The first use of compressive techniques in the context of Ghost Imaging was performed by the Katz group (see O. Katz, et al., "Compressive Ghost Imaging," Appl. Phys. Lett., 95, 131110 (2009))(hereby incorporated by reference) who demonstrated a ghost like imaging proposal of Shapiro (see J. Shapiro, "Computational Ghost Imaging," Phys. Rev. A 78 061802(R) (2008)). Their demonstration was limited to a transmission object.

More recently the present inventors have performed experiments of this nature using reflection objects.

The inventors' use of CS and CI is based on finding approximate solutions to the integral equations using the GPSR mathematical methodology where $$JR = B \quad (3)$$

and $$R = R(x,y) \quad (4)$$

is the object reflectance. The term J is a matrix, where the rows are the illumination patterns at time k and the B vector:

$$B = [B_k] \quad (5)$$

represents the bucket values. In cases where the system is underdetermined (too few $[B_k]$), then $L_1$ constraints are applied to complete the system and sparseness is used:

$$\mathrm{argmin}_R = \frac{1}{2}\|B - JR\|_2^2 + \tau\|R\|_1 \quad (6)$$

The CS computational strategy takes advantage of the fact that it is normally true in images that not all pixels in an image contain new information and the system is said to be sparse on some basis since fewer degrees of freedom are needed to describe the system than the total number of pixels in the image. Data used to reconstruct an image can be referred to as sparse image data or sparse data. The parameter $\tau$ is often a constant.

Compressive imaging (CI) results for the ARL target are presented using Eq. 2 and varying the $\tau$ parameter. FIG. 10 is an example of a result where $\tau$ is too large and most of the pixel values are driven to 0. One can sense that the letters "ARL" are in the figure. Decreasing $\tau$ to a value of 5e7, shown in FIG. 11 more portions of the "ARL" letters appear. When $\tau$ is set to 2.5e7 the R is quite clear in FIG. 12 but the appearance of the A and the L are still degraded. Continuing with the examination of the effect of the parameter $\tau$, the value of $\tau$ is set to 1e7. These results are shown in FIG. 13.

Finally, as a lower image quality bound, $\tau$ is set to equal 1e6. The "ARL" presented in FIG. 14 is quite degraded. These GPSR calculated Virtual Ghost imaging results highlight the sensitivity of the calculations to an external parameter ($\tau$) which has no connection to the underlying physics.

Air Force Resolution Target

Results were computed using Eq. 1 subject to the self-bucketing concept of Eq. 2. These results are generated from a few hundred shots of the Air Force resolution target imaged at a 100 m distance through turbulence.

Figure 16:
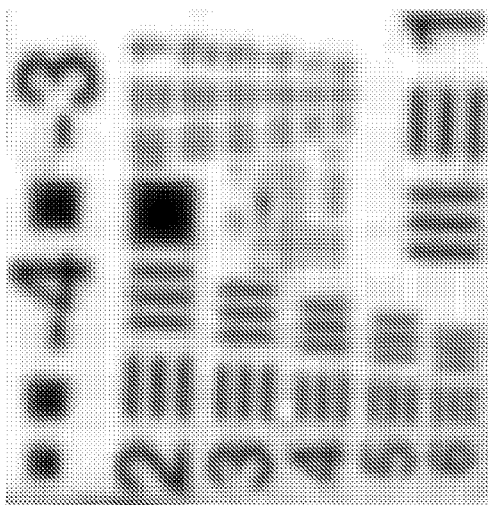
FIG. 16 is an illustration of an average of 335 frames.

A single image from this data set is presented in FIG. 15. This image illustrates the distorting effect of turbulence on imaging. A simple averaging of 335 frames of the dataset that was performed is shown in FIG. 16. This average image has some better qualities that the single frame image of FIG. 15 but one can still only resolve the coarser scale features of the Air Force target.

Figure 17A:
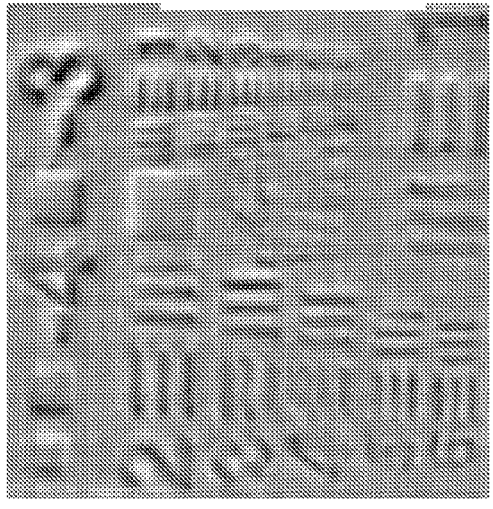
FIG. 17A is an illustration of an image formed utilizing the Ghost imaging concept using 2 frames taken at a distance of 100 m through turbulence.
Figure 17B:
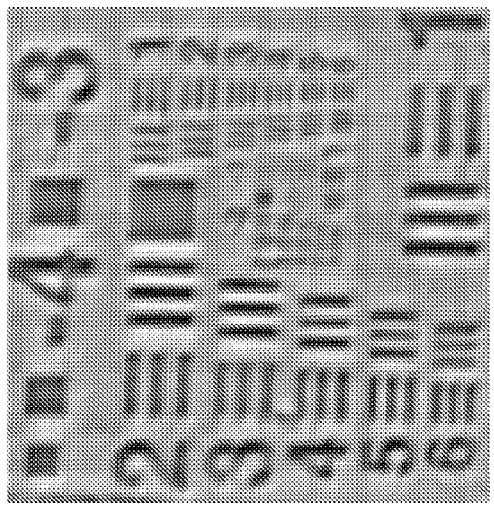
FIG. 17B is an illustration of an image formed using 335 frames; "Self Bucket $G^{(2)}$, 100 m distance through turbulence.

Using the self-bucket ghost imaging concept on this dataset, an initial result using only 2 frames of the dataset is displayed in FIG. 17A. Some of the edges in this image are very distinct and superior to areas in either the instantaneous or the average images. When the entire dataset is used, as presented in FIG. 17B, the results are striking. In particular the 4 and 5 on the right side of the target are legible and the small horizontal and vertical bars to the left of the numbers are distinct; whereas those regions in the instantaneous and average images are simply blurs.

Figure 18:
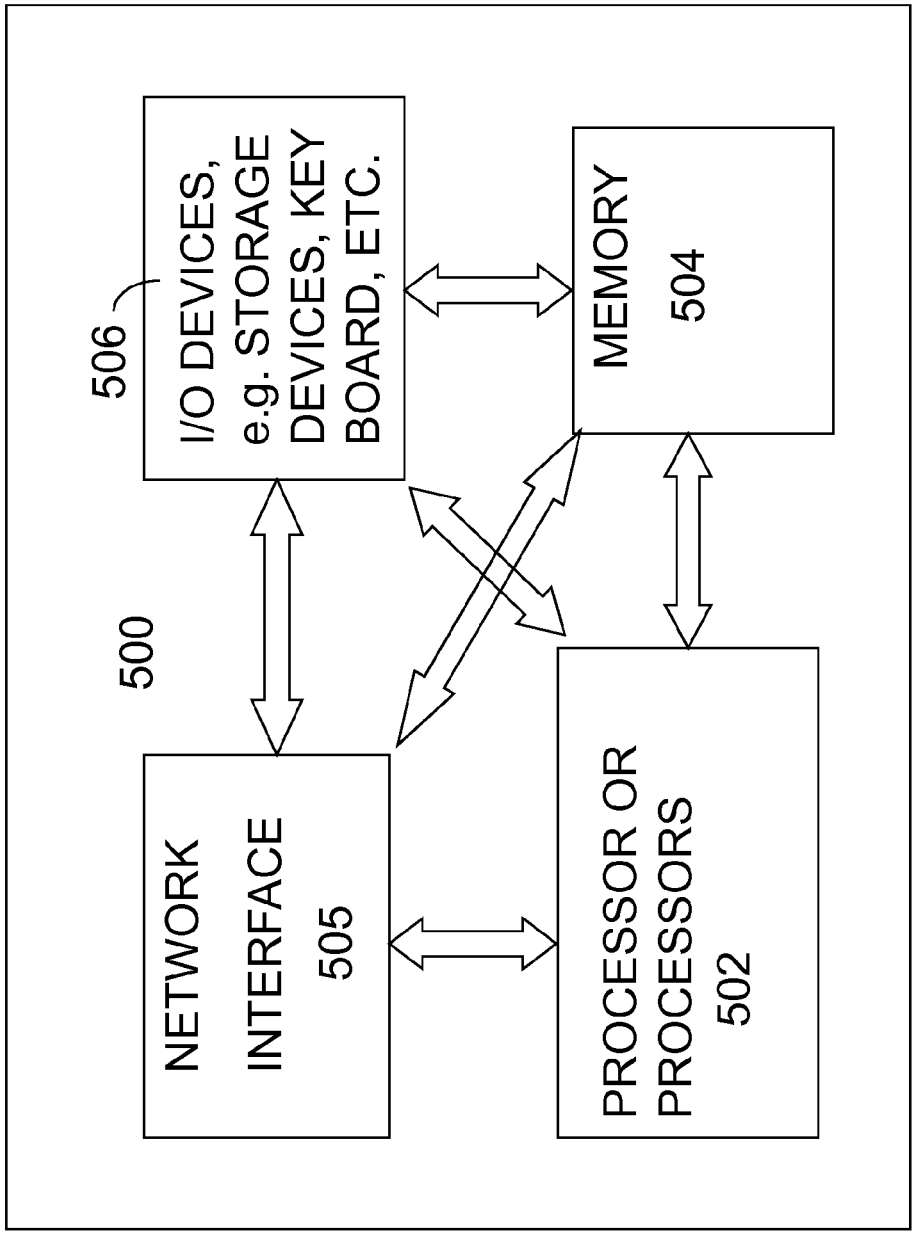
FIG. 18 depicts a high level block diagram of a general purpose computer configured to implement embodiments of the present invention.

FIG. 18 depicts a high level block diagram of a general purpose computer suitable for use in performing the functions described herein, including the steps shown in the block diagrams, schematic representations, and/or flowcharts in the various embodiments disclosed throughout this application. As depicted in FIG. 18, the system 50 includes a processor element 52 (e.g., a CPU) for controlling the overall function of the system 50. Processor 52 operates in accordance with stored computer program code, which is stored in memory 54. Memory 54 represents any type of computer readable medium and may include, for example, RAM, ROM, optical disk, magnetic disk, or a combination of these media. The processor 52 executes the computer program code in memory 54 in order to control the functioning of the system 50. Processor 52 is also connected to network interface 55, which transmits and receives network data packets. Also included are various input/output devices 56 (e.g., storage devices, including but not limited to, a tape drive, a floppy drive, a hard disk drive or compact disk drive, a receiver, a transmitter, a speaker, a display, a speech synthesizer, an output port, and a user input device (such as a keyboard, a keypad, a mouse and the like).

Further Improvement Embodiments

In a preferred embodiment there is provided a method to partition the values in the measured data sets, i.e. frames, into two or more groups for the frame data (reference fields) and overall frame intensities (bucket values). These groups are then used to compute products, or cross-correlations, between the different groupings. These individual product terms can be mathematically combined, via addition and/or subtraction processes, to generate improve images of the target or scene. This method further adapts the techniques presented in the parent application. One key advantage to this method is that it is possible with the following embodiments to generate all positive valued images and largely eliminate background and noise effects. Other advantages include the ability to operate on a computed partitioned image using functions such as logarithms and exponentials to further increase contrast or better identify objects and information on their properties.

The following embodiments are predicated on the appreciation that other operations involving the partitioned sets of above average and below average measurements are beneficial to improve image quality in adverse conditions such as turbulence. These operations would include but are not limited to cross-correlations between above average bucket (overall frame intensities) and below average reference fields. Typically four correlation types are available when data is partitioned into two distinct sets such as above the average and below the average values. In a non-normalized form this can be written as $$R_m = \frac{1}{N_M}\sum_1^{N_M} I_a I_b \quad (7)$$

where $R_m$ is proportional to the correlation between the two data sets $I_a$ and $I_b$. $N_M$ is the number of elements in the data sets being considered. The subscript "m" indicates that the correlation R is about the mean or average. Normalization is usually accomplished by dividing the $R_m$ by $\sigma_{I_a}$ the standard deviation of $I_a$ and $\sigma_{I_b}$ the standard deviation of $I_b$, $$RN_m = \frac{R_m}{\sigma_{I_a}\sigma_{I_b}}. \quad (8)$$

The data sets $I_a$ is the set of pixel measurements and $I_b$ is the set of bucket measurements are used in the current invention as the deviations from the average or mean.

$$I_a = (M_a - \langle M_a \rangle) \quad (9a)$$

$$I_b = (M_b - \langle M_b \rangle) \quad (9b)$$

where the M's indicate the measurement, either an individual pixel value or the bucket value and the $\langle \rangle$ indicates and average over the ensemble of the measurements.

The product terms that comprise a particular $R_m$ may be computed conditionally. The $R_m$ can be called conditional product terms. For instance, $R_m$ may be computed for the set of pixel values $I_a$ that are above the mean for those frames of data with bucket values $I_b$ that are above the mean. For example:

$$R_m^{++} = \frac{1}{N_m^+}\sum_1^{N_m^+} I_a^+ I_b^+ \quad (10)$$

The other combinations of above/below mean pixel values and above/below mean bucket values are computed similarly. These conditional $R_m$ may then be added or subtracted from each other to yield improved images of a scene or target. Furthermore, it should be noted that the particular combination of the $R_m$ below $$R_m^{++} + R_m^{--} - R_m^{+-} - R_m^{-+} \quad (11)$$

is always positive.

Another alternative embodiment may include computing a $G^{(2)}$ improved image. This improved image is then partitioned into pixels that are, for example, above the spatial mean $G^{(2)}$ and pixels that are below the spatial mean $G^{(2)}$. These alternative positive/negative $G^{(2)}$ partitioned improved images can display higher contrast and can be further operated upon by using mathematical operations such as logarithms to increase the dynamic range. It is to be recognized that other partitions are possible to tailor results needed for specific applications.

Another alternative embodiment may include computing a $R_m$ correlation image by calculating the correlation coefficient between the $I_a$ and $I_b$ partitions where the $I_a$ and $I_b$ are not aligned in time or frame. For instance, at a particular pixel i,j there may be 10 frames in which that pixel is above the mean value of that pixel for all frames, and there may only be say 5 frames for which the $I_b$ values is above the mean of $I_b$. A correlation coefficient may be computed between these two sets of data using:

$$R(i, j) = \frac{C(i, j)}{\sqrt{C(i, i)C(j, j)}} \quad (12)$$

where R(i,j) is the correlation coefficient between variables i and j. C indicates a covariance calculation between the variables i and j. The data sets are forced to be the same length, as required by the above R(i,j) process, by simply setting N to be the length of the data set with fewer elements and then taking the first N values of the data set that has a greater number of elements. This can lead to cross-time correlations that may prove useful for certain applications. The method of calculating the values of R(i,j) may also use the processes outlined above.

Combinations of Conditional Product Terms

As an example, for imaging measurements of pixel values and bucket values that have been grouped into two sets each of above and below their respective averages, there is a total of 80 possible ways to present for output the results of the computed conditional product terms. For instance, each conditional product term may be presented for display individually with either a positive or negative sign. Thus, individually for the four conditional product terms there is a total of 8 ways to present them for display. Combinations of two conditional product terms with signs allows for 24 options to present for display, combinations of three conditional product terms allows for 32, and combinations of all four conditional product terms allows for 16 ways to present for output and display.

Further Improvement Embodiments

FIGS. 19A and 19B are schematic block diagrams of alternate embodiments that provide a method to partition the values in the measured data sets, i.e. frames, into two or more groups for the frame data (reference fields) and overall frame intensities (bucket values). These groups are then used to compute products, or cross-correlations, between the different groupings. These individual product terms can be mathematically combined, via addition and/or subtraction processes, to generate improve images of the target or scene. This method further adapts the techniques presented in the parent application. One key advantage to this method is that it is possible with the following embodiments to generate all positive valued images and largely eliminate background and noise effects. Other advantages include the ability to operate on a computed partitioned image using functions such as logarithms and exponentials to further increase contrast or better identify objects and information on their properties.

FIG. 19A illustrates a diagram of alternate preferred embodiment 100, that generates enhanced averaged second-order images or movies of a region of interest. Note, the region of interest may emit photons that are not reflected or scattered photons from some other photon source. A photon source (labeled source) may include, for example, the sun, moon, coherent, incoherent, or partially coherent light, entangled photons, infrared radiation emitted by atoms and molecules, accelerating charges, lasers, light bulbs, light emitting diodes (LEDs), chaotic laser light, pseudo-thermal light generated by passing laser light through a rotating ground glass or other scattering material, stars, moons, clouds, planets, space objects, fluorescent lamps, electrical discharges, plasmas, bio-luminescence, and stimulated emission. The distant target scene 101 comprises a target 102 which is an area used of the distant target scene for the particular region of interest developed for image testing. The element 103 represents optionally present turbulence or other obscuring or image degrading effects along photon path between light source and target, and light source and imaging system or photon measurement devices or components. Light from the telescope 104 (although other apparatus or direct viewing may be used without departing from the scope of the invention). is focused by a lens 106 and an image is formed within the camera 105. Telescope 104 may zoom in on or expand view of the selected region of interest. An image or photon measurement device 105 may be for example, a camera. Lens 106 couples the telescope 104 to image or photon measurement device 105. The assembly 100 may optionally include a Barlow type lens for increased magnification of the region of interest. Control line 107 enables real-time control of data acquisition. Data transfer channel 108 extends from image or photon measurement device 105 to the processor 110. The communications channel 109 extends between processor 110 and data acquisition and real-time control 126. The processor, memory, and algorithms to generate enhanced average second-order images of the region of interest are represented by the shaded area labeled 110. Representative frames 111 of image data are measured by measurement device 105. Virtual bucket detector 112 represents where the "bucket" values are computed from the measured frame data by spatially summing specified pixel values. Software or hardware communications channel 113 transfers bucket information between processor 110 or on the same processor; Software or hardware communications channel 114 transfers bucket information between processors or on the same processor. Memory portion 115 represents the computation and storage of the pixel average image and the average bucket value and computes pixel deviations of the pixel value from the average pixel value and computes bucket deviations from the average bucket value. Image sets 118 and 119 represent partitions of spatially addressable pixel images into positive and negative bucket deviation groups. Image memory portion or image set 119 represents the grouping of negative value bucket deviation reference image frames. Image memory portion or image set 117 represents the grouping of positive value bucket deviation reference image frames. Image memory portion or image set 118 represents the grouping of positive and negative valued pixel deviations for reference frames that have positive valued bucket deviations. Image memory portion or image set 119 represents the grouping of positive and negative valued pixel deviations for reference frames that have negative valued bucket deviations. Image memory portion or image set 120 represents the collecting and averaging the product of negative value pixel deviations and positive value bucket deviations for corresponding frames. Image memory portion or image set 121 represents the; collecting and averaging the product of positive value pixel deviations and positive value bucket deviations for corresponding frames. Image memory portion or image set 122 represents the collecting and averaging the product of negative value pixel deviations and negative value bucket deviations for corresponding frames. Image memory portion or image set 123 represents the collecting and averaging the product of positive value pixel deviations and negative value bucket deviations for corresponding frames. Representation of an enhanced image 124 comprises addition, subtraction, normalization or other mathematical operations of the computed values of image sets 120, 121, 122, and 123. Block 125 indicates some of the physics for the display of the enhanced average second-order image of the region of interest. The block 125 is a depiction of the physics of a two-photon interference process where sub-sources are at A and B respectively and detection is at B and R elements wherein the lines represent two alternate but indistinguishable paths where a photon of sub-source A goes to detector R and a photon of sub-source B goes to detector B or a photon from sub-source A goes to detector B and a photon of sub-source B goes to detector R to achieve a joint detection. Block 126 comprises: data acquisition and real-time control electronics.

FIG. 19B illustrates a diagram of alternate preferred embodiment 100, that generates enhanced averaged second-order images or movies of a region of interest. Note, the region of interest may emit photons that are not reflected or scattered photons from some other photon source. A photon source (labeled source) may include for example the sun, moon, coherent, incoherent, or partially coherent light, entangled photons, infrared radiation emitted by atoms and molecules, accelerating charges, lasers, light bulbs, light emitting diodes (LEDs), chaotic laser light, pseudo-thermal light generated by passing laser light through a rotating ground glass or other scattering material, stars, moons, clouds, planets, space objects, fluorescent lamps, electrical discharges, plasmas, bio-luminescence, and stimulated emission. The distant target scene 101 comprises a target 102 which is an area used of the distant target scene for the particular region of interest developed for image testing. The element 103 represents optionally present turbulence or other obscuring or image degrading effects along photon path between light source and target, and light source and imaging system or photon measurement devices or components. Light from the telescope 104 (although other apparatus or direct viewing may be used without departing from the scope of the invention). is focused by a lens 106 and an image is formed within the camera 105. Telescope 104 may zoom in on or expand view of the selected region of interest. An image or photon measurement device 105 may be for example, a camera. Lens 106 couples the telescope 104 to image or photon measurement device 105. The assembly 100 may optionally include a Barlow type lens for increased magnification of the region of interest. Beam splitter 127 operates to split the beam off to bucket detector 128 which is connected to channel 129 which interconnects with image memory portion or set 115, which represents the computation and storage of pixel image values. Thus, channel 129 operates to pass the measured bucket values to the processor for computation of the average bucket value. Control line 107 enables e real-time control of data acquisition. Data transfer channel 108 extends from image or photon measurement device 105 to the processor 110. The communications channel 109 extends between processor 110 and data acquisition and real-time control 126. The processor, memory, and algorithms to generate enhanced average second-order images of the region of interest are represented by the shaded area labeled 110: Representative frames 111 of image data are measured by measurement device 105. Virtual bucket detector 112 represents where the "bucket" values are computed from the measured frame data by spatially summing specified pixel values. Software or hardware communications channel 113 transfers bucket information between processor 110 or on the same processor; Software or hardware communications channel 114 transfers bucket information between processors or on the same processor. Memory portion 115 represents the computation and storage of the pixel average image and the average bucket value and computes pixel deviations of the pixel value from the average pixel value and computes bucket deviations from the average bucket value. Image sets 118 and 119 represent partitions of spatially addressable pixel images into positive and negative bucket deviation groups. Image memory portion or image set 119 represents the grouping of negative value bucket deviation reference image frames. Image memory portion or image set 117 represents the grouping of positive value bucket deviation reference image frames. Image memory portion or image set 118 represents the grouping of positive and negative valued pixel deviations for reference frames that have positive valued bucket deviations. Image memory portion or image set 119 represents the grouping of positive and negative valued pixel deviations for reference frames that have negative valued bucket deviations. Image memory portion or image set 120 represents the collecting and averaging the product of negative value pixel deviations and positive value bucket deviations for corresponding frames. Image memory portion or image set 121 represents the; collecting and averaging the product of positive value pixel deviations and positive value bucket deviations for corresponding frames. Image memory portion or image set 122 represents the collecting and averaging the product of negative value pixel deviations and negative value bucket deviations for corresponding frames. Image memory portion or image set 123 represents the collecting and averaging the product of positive value pixel deviations and negative value bucket deviations for corresponding frames. Representation of an enhanced image 124 comprises addition, subtraction, normalization or other mathematical operations of the computed values of image sets 120, 121, 122, and 123. Block 125 indicates some of the physics for the display of the enhanced average second-order image of the region of interest. The block 125 is a depiction of the physics of a two-photon interference process where sub-sources are at A and B respectively and detection is at B and R elements wherein the lines represent two alternate but indistinguishable paths where a photon of sub-source A goes to detector R and a photon of sub-source B goes to detector B or a photon from sub-source A goes to detector B and a photon of sub-source B goes to detector R to achieve a joint detection. Block 126 comprises: data acquisition and real-time control electronics.

Figure 20A:
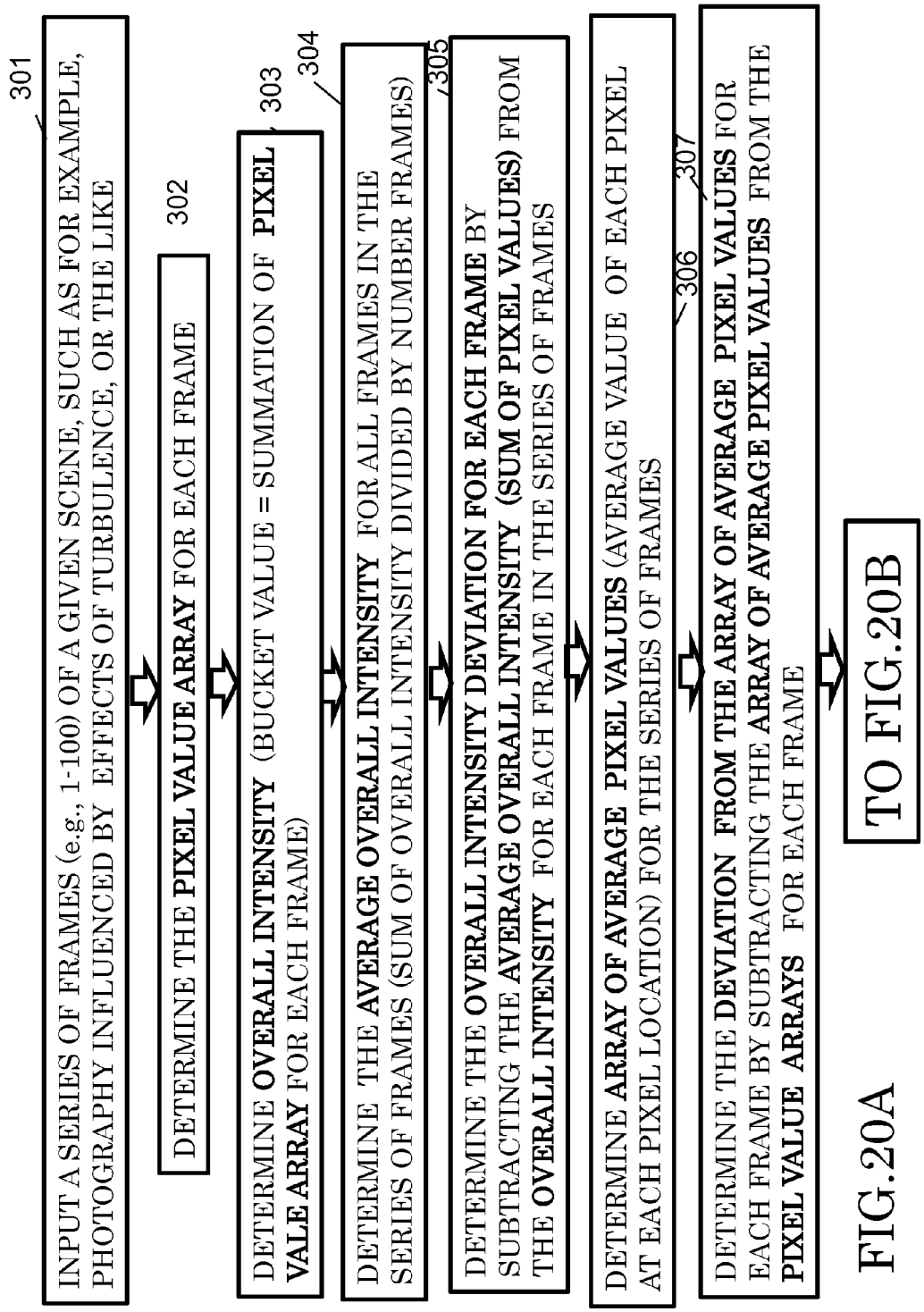
FIG. 20A is a schematic block diagram illustration of an alternate preferred embodiment of the present invention wherein groups and subgroups are used to determine product arrays to form an improved image.
Figure 20B:
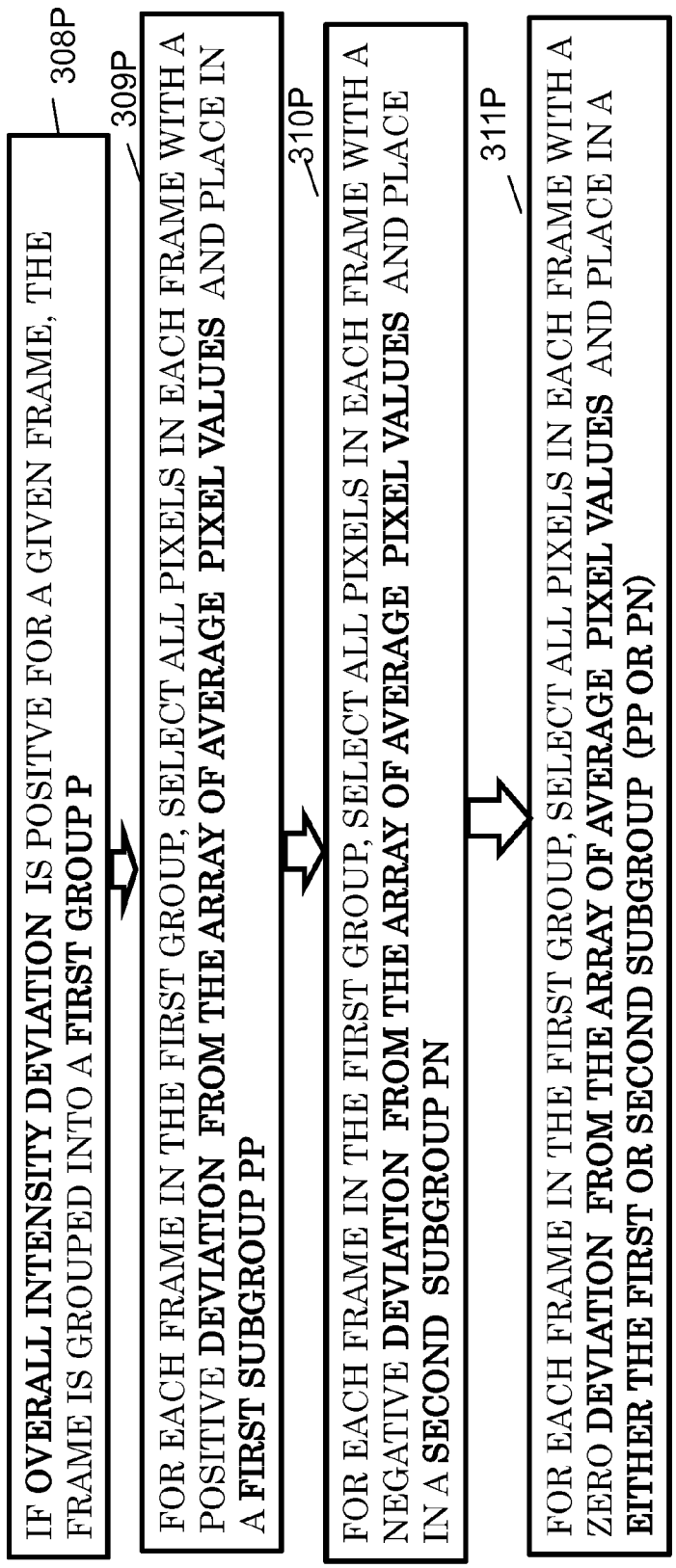
FIG. 20B is a continuation of the schematic block diagram illustration of FIG. 20A.

FIGS. 20A-20C illustrate a schematic block diagram of an alternate preferred embodiment of the present invention wherein groups and subgroups are used to determine product arrays to form an improved image. In: Box 301, a series of frames are entered into the memory or input of a processor or image processor. The frames may comprise photographs of the same region of interest. The region of interest may be a scene, landscape, an object, a subject, person, or thing. In Box 302 the pixel value for each pixel in each frame in the series of frames is determined. In Box 303, the overall intensity of the frame (or summation of pixel values for each frame) is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. In Box 303, the average overall intensity for all inputted frames (see Box 301) is computed. To determine the average overall intensity, the summation of the intensities for all frames is divided by the number of frames. In Box 304 the overall intensity is determined, In Box 305 the overall intensity deviation is determined for each frame by subtracting the average overall intensity from the overall intensity for each frame. The overall intensity deviation is a measure of the degree to which a frame is brighter or darker than the Average Overall Intensity. In Box 306, an array of average pixel values is formed (average value at each pixel location for the series of frames.

Continuing in FIG. 20B, in Box 308P, if overall intensity deviation is positive for a given frame, the frame is grouped into a first group P. In Box 309P, for each frame in the first group, select all pixels in each frame with a positive deviation from the array of average pixel values and place in a first subgroup PP.

In Box 310P, for each frame in the first group, select all pixels in each frame with a negative deviation from the array of average pixel values and place in a second subgroup PN. In Box 311P, for each frame in the first group, select all pixels in each frame with a zero deviation from the array of average pixel values and place in a either the first or second subgroup (PP or PN).

Continuing in FIG. 20C, in Box 308N, if the overall intensity deviation is negative for a given frame, the frame is grouped into a second group N. In Box 309N, for each frame in the second group, select all pixels in each frame with a positive deviation from the array of average pixel values and place in a third subgroup NP. In Box 310N, for each frame in the second group, select all pixels in each frame with a negative deviation from the array of average pixel values and place in a fourth subgroup NN. In Box 311N, for each frame in the second group, select all pixels in each frame with a zero deviation from the array of average pixel values and place in a either the first or second subgroup (NP or NN). In Box 312, for each pixel value for each frame in the each subgroup multiply each pixel value by overall intensity deviation for that frame to obtain a first product array (or conditional product array) for each frame in the subgroup (PN, PP, NP, NN). In Box 313, for each subgroup, add up the product arrays in the subgroup and divide by the number of frames in the subgroup to obtain a second or average conditional product array for each subgroup. In Box 314, one of more second product arrays is selected to generate an image.

Figure 21:
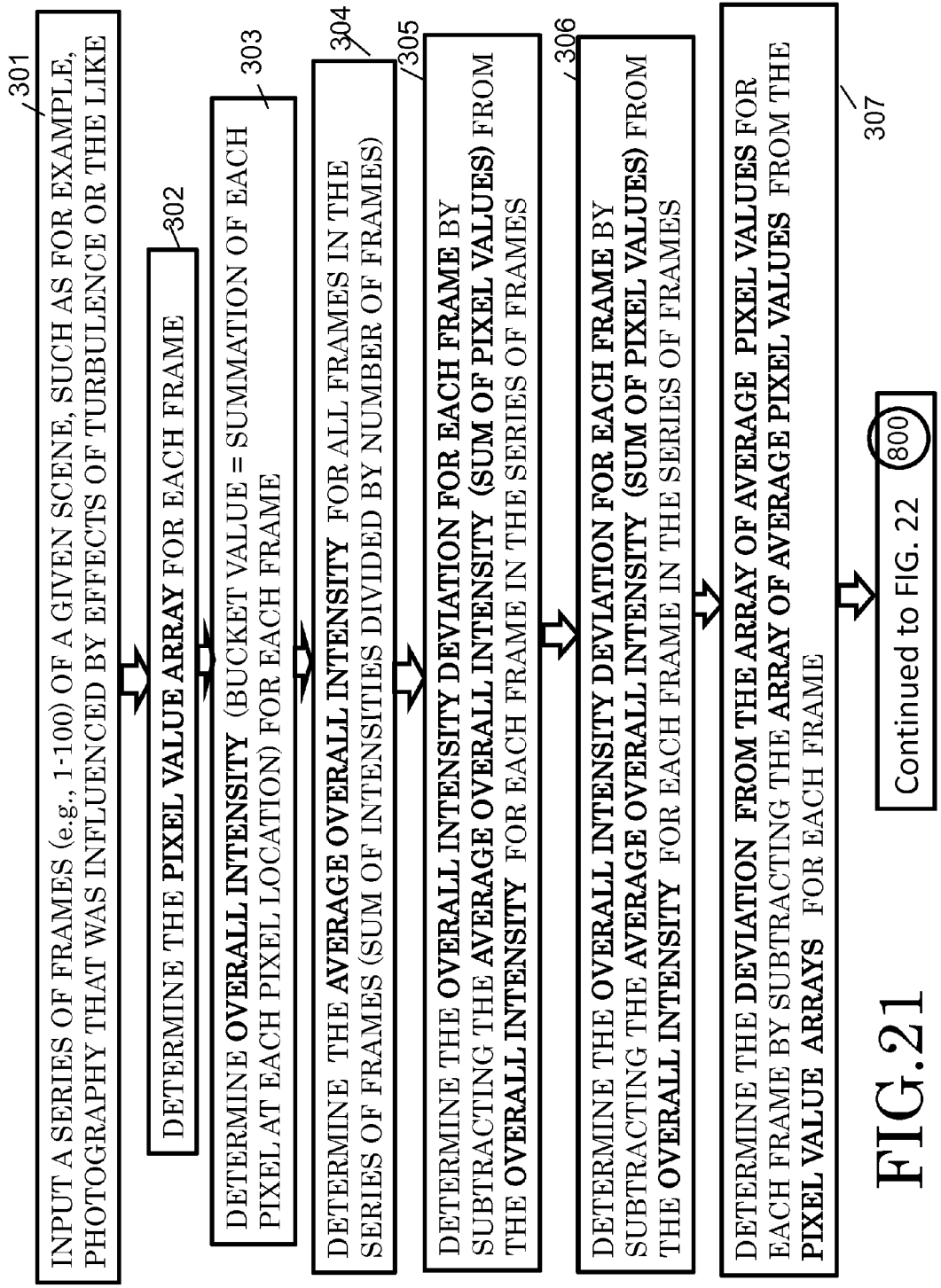

FIGS. 21-31 represent a partial schematic block diagram illustration of the steps for performing one embodiment of the present invention. In FIG. 21: Box 301, a series of frames are entered into the memory or input of a processor or image processor. The frames may comprise photographs of the same region of interest. The region of interest may be a scene, landscape, an object, a subject, person, or thing. In Box 303, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. In Box 313, the average overall intensity for all frames in the inputted (see Box 301) is computed. To determine the average overall intensity, the summation of the intensities for all frames is divided by the number of frames. In Box 314 the overall intensity deviation for each frame is determined by subtracting the Average Overall Intensity from the Overall Intensity for each frame. The overall intensity deviation is a measure of the degree to which a frame is brighter or darker than the Average Overall Intensity.

The method proceeds to FIG. 21. In Box 315, a series of frames are entered into the memory or input of a processor or image processor. The frames may comprise photographs of the same region of interest. The region of interest may be a scene, landscape, an object, a subject, person, or thing. These frames are the same frames used in Box 301 and may be reused if they are still available in the memory or input of the processor or image processor. In Box 316 the Average Frame Data is determined by computing the average value of each pixel at each pixel location for the plurality of frames. In Box 317 the Deviation Frame Data is determined by subtracting the Average Frame Data from the Frame Data for all pixels in each frame for the plurality of frames.

The method proceeds via path 800 to FIG. 22 which shows how to generate a third set of data which is referred to here at SET 3. SET 3 data includes conditional product terms using frames having a positive overall intensity deviation and positive deviation frame data pixels. SET 3 may be determined as follows: In Box 318 frames with a Positive Overall Intensity Deviation multiply the value of the Overall Intensity Deviation by the Positive Frame Data Deviation pixels within that set of frames. In Box 319 pixel locations (a), the square of the Positive Overall Intensity Deviation (b), the product of the Positive Overall Intensity Deviation×the Positive Deviation Frame Data pixels and the square of the Positive Deviation Frame Data pixels are recorded and accumulated. In Box 320 the pre-normalized Positive-Positive Product pixel values, 320(a), are determined by dividing the product of the Positive Overall Intensity Deviation×the Positive Deviation Frame Data Frame Data pixels by 319(a). The average of the squares of the Positive Overall Intensity is determined by dividing 319(b) by 319(a). The average of the squares of the Positive Deviation Frame Data pixels is determined by dividing 319(d) by 319(a).

Figure 23:
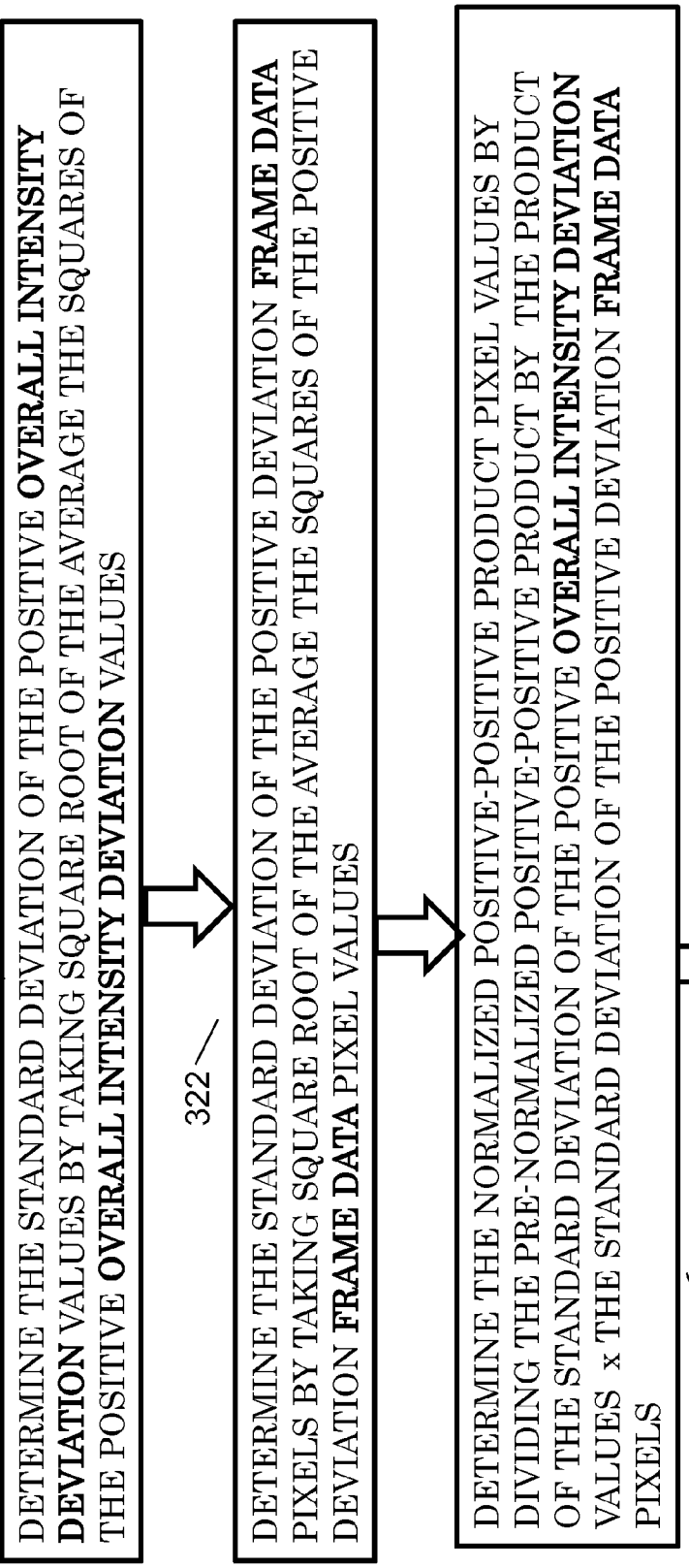

Continuing via path 900 to FIG. 28, the method proceeds to FIG. 23 In Box 321 the standard deviation of the Positive Overall Intensity Deviation is determined by taking the square root of the average of the squares of the Positive Overall Intensity Deviation, 320(a). In Box 322 the standard deviations of the Positive Deviation Frame Data pixels is computed by taking the square root of the average of the squares of the Positive Deviation Frame Data pixels, 320(b). Box 323 determines the Normalized Positive-Positive Product pixel values by dividing the pre-Normalized Positive-Positive Product, 320(a), by the product of the standard deviation of the Positive Overall Intensity Deviation, 321, and the standard deviation of the Positive Deviation Frame Data pixels, 322.

The method proceeds via path 800 to FIG. 24 which shows how to generate a fourth set of data which is referred to here at SET 4. SET 4 frame data includes conditional product terms using frames having a negative overall intensity deviation and negative deviation frame data pixels. SET 4 may be determined as follows: In Box 400 frames with a Negative Overall Intensity Deviation multiply the value of the Overall Intensity Deviation by the Negative Frame Data Deviation pixels within that set of frames. In Box 401 pixel locations (a), the square of the Negative Overall Intensity Deviation (b), the product of the Negative Overall Intensity Deviation×the Negative Deviation Frame Data pixels and the square of the Negative Deviation Frame Data pixels are recorded and accumulated. In Box 402 the pre-normalized Negative-Negative Product pixel values, 402(a), are determined by dividing the product of the Negative Overall Intensity Deviation×the Negative Deviation Frame Data Frame Data pixels by 401(a). The average of the squares of the Negative Overall Intensity is determined by dividing 401(b) by 401(a). The average of the squares of the Negative Deviation Frame Data pixels is determined by dividing 401(d) by 401(a).

From Box 402 in FIG. 24, the method can proceed via path 901 to FIG. 25. In Box 403 the standard deviation of the Negative Overall Intensity Deviation is determined by taking the square root of the average of the squares of the Negative Overall Intensity Deviation, 402(a). In Box 404 the standard deviations of the Negative Deviation Frame Data pixels is computed by taking the square root of the average of the squares of the Negative Deviation Frame Data pixels, 402(b). Box 405 determines the Normalized Negative-Negative Product pixel values by dividing the pre-Normalized Negative-Negative Product, 402(a), by the product of the standard deviation of the Negative Overall Intensity Deviation, 403, and the standard deviation of the Negative Deviation Frame Data pixels, 404. At the conclusion of Box 405, the method proceeds via path 700 to FIG. 30 for determining an improved image data 701, or to FIG. 31 for determining alternative improved image data 702 by an alternative embodiment.

Returning to FIG. 22, the method also can concurrently proceeds via path 800 to FIG. 26 which shows how to generate a fifth set of data which is referred to here at SET 5. SET 5 frame data includes conditional product terms using frames having a negative overall intensity deviation and positive deviation frame data pixels. SET 5 may be determined as follows: In Box 800 frames with a Negative Overall Intensity Deviation multiply the value of the Overall Intensity Deviation by the Positive Frame Data Deviation pixels within that set of frames. In Box 801 pixel locations (a), the square of the Negative Overall Intensity Deviation (b), the product of the Negative Overall Intensity Deviation×the Positive Deviation Frame Data pixels and the square of the Positive Deviation Frame Data pixels are recorded and accumulated. In Box 802 the pre-normalized Positive-Negative Product pixel values, 802(a), are determined by dividing the product of the Negative Overall Intensity Deviation×the Positive Deviation Frame Data Frame Data pixels by 801(a). The average of the squares of the Negative Overall Intensity is determined by dividing 801(b) by 801(a). The average of the squares of the Positive Deviation Frame Data pixels is determined by dividing 801(d) by 801(a).

From Box 802 in FIG. 26, the method can proceed via path 902 to FIG. 27. In Box 803 the standard deviation of the Negative Overall Intensity Deviation is determined by taking the square root of the average of the squares of the Negative Overall Intensity Deviation, 802(a). In Box 804 the standard deviations of the Positive Deviation Frame Data pixels is computed by taking the square root of the average of the squares of the Positive Deviation Frame Data pixels, 802(b). Box 805 determines the Normalized Positive-Negative Product pixel values by dividing the pre-Normalized Positive-Negative Product, 802(a), by the product of the standard deviation of the Negative Overall Intensity Deviation, 803, and the standard deviation of the Positive Deviation Frame Data pixels, 804.

At the conclusion of Box 805 in FIG. 27, the method proceeds via path 700 to FIG. 30 for determining an improved image data 701, or to FIG. 31 for determining alternative improved image data 702 by an alternative embodiment.

Similar as discussed above with respect to the fifth set of data (SET 5), returning to FIG. 22, the method also can concurrently proceed via path 800 to FIG. 28 which shows how to generate a sixth set of data which is referred to here at SET 6. SET 6 frame data includes conditional product terms using frames having a positive overall intensity deviation and a negative deviation frame data pixels. SET 6 may be determined as follows: In Box 600 frames with a Positive Overall Intensity Deviation multiply the value of the Overall Intensity Deviation by the Negative Frame Data Deviation pixels within that set of frames. In Box 601 pixel locations (a), the square of the Positive Overall Intensity Deviation (b), the product of the Negative Overall Intensity Deviation×the Negative Deviation Frame Data pixels and the square of the Negative Deviation Frame Data pixels are recorded and accumulated. In Box 602 the pre-normalized Negative-Positive Product pixel values, 602(a), are determined by dividing the product of the Positive Overall Intensity Deviation×the Negative Deviation Frame Data Frame Data pixels by 601(a). The average of the squares of the Positive Overall Intensity is determined by dividing 601(b) by 601(a). The average of the squares of the Negative Deviation Frame Data pixels is determined by dividing 601(d) by 601(a).

From Box 602 in FIG. 28, the method can proceed via path 903 to FIG. 28. In Box 603 the standard deviation of the Positive Overall Intensity Deviation is determined by taking the square root of the average of the squares of the Positive Overall Intensity Deviation, 602(a). In Box 604 the standard deviations of the Negative Deviation Frame Data pixels is computed by taking the square root of the average of the squares of the Negative Deviation Frame Data pixels, 602(b). Box 605 determines the Normalized Negative-Positive Product pixel values by dividing the pre-Normalized Negative-Negative Product, 602(a), by the product of the standard deviation of the Positive Overall Intensity Deviation, 603, and the standard deviation of the Negative Deviation Frame Data pixels, 604.

At the conclusion of Box 605 in FIG. 29, the method proceeds via path 700 to FIG. 30 for determining an improved image data 701, or to FIG. 31 for determining alternative improved image data 702 by an alternative embodiment.

FIG. 30 is a partial schematic block diagram illustration of the steps for performing an alternate preferred method of the present invention in which the improved final image is determined by adding the above-mean, above mean image to the below-mean, below-mean images, subtracting the above-mean, below-mean image, and subtracting the below-mean, above mean image. Here, improved image data 701 is determined by adding "SET 3" 323 to "SET 4" 405 and subtracting "SET 5" 505 and subtracting "SET 6" 605.

FIG. 31 is a partial schematic block diagram illustration of the steps for performing an alternate preferred method of the present invention in which the improved final image is determined by adding the above-mean, above mean image, the below-mean, below-mean image, the above-mean, below-mean image, and the below-mean, above mean image. Here, an alternate embodiment of improved image data 702 is determined by adding "SET 3" 323, "SET 4" 405, "SET 5" 805 and "SET 6" 605 together.

FIG. 32 is a result computed using Eq. 1 subject to the self-bucketing concept of Eq. 2. This result was from a few hundred shots taken of a typical scene using an infra-red camera. Some portions of the scene are partially visible such as the lamp post in the middle and the clouds (32.a) in the sky background. Other features such as the safety bars (32.b) and the tree line in the background (32.c) are not distinguishable.

Figure 33:
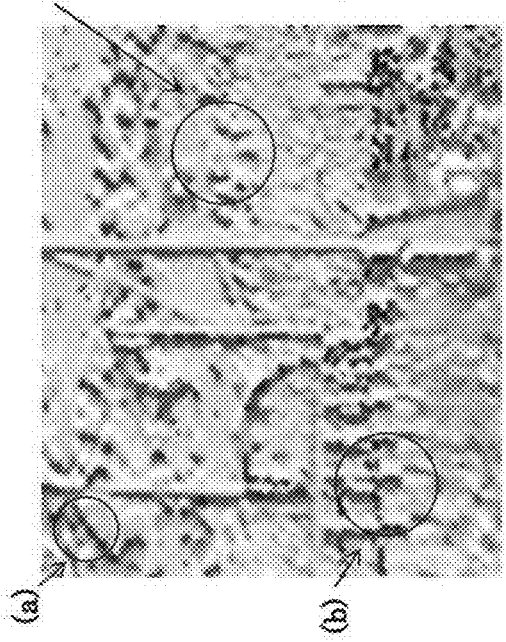
FIG. 33 is an illustration showing the improved imaging results when applying the methods and processes outlined in FIG. 30. The trees in the distance and clouds are much more distinguishable in this figure when compared to the results shown in FIG. 32.

FIG. 33 is a result computed using the same data from FIG. 32 but applying the inventive procedure described in which the $R_m$ conditional product terms were combined with $R_m^{++}+R_m^{--}-R_m^{+-}-R_m^{-+}$ to produce the improved image. The superscripts indicate a positive or negative deviation for the conditional product terms. In comparison with FIG. 32, the safety bars on the right of the image are now very distinct (33.b) and the edges of the clouds (33.a) are more sharply defined. Furthermore, in the distance a tree line (33.c) has been resolved by the applications of the method described herein.

Figure 34:
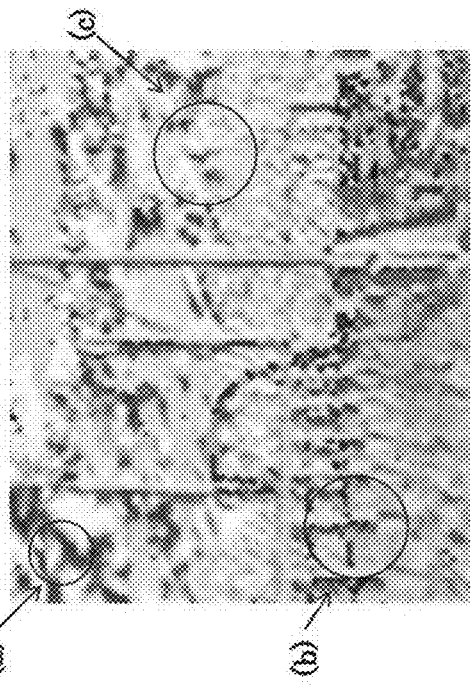
FIG. 34 is an illustration showing the improved imaging results using the methods and processes outlined in FIG. 31. As in FIG. 33, the trees and clouds are much more distinguishable than what is seen in FIG. 32.

FIG. 34 is a result computed using the same data from FIG. 32 but applying the inventive procedure described in which the $R_m$ conditional product terms were combined with $R_m^{++}+R_m^{--}+R_m^{+-}+R_m^{-+}$ to produce the improved image. The superscripts indicate a positive or negative deviation for the conditional product terms. In comparison with FIG. 32, the safety bars (34.b) on the right of the image are distinct, the edges of the clouds (34.a) are more sharply defined, and the distant tree line is resolved (34.c). A comparison between the (a), (b), and (c) features of FIG. 33 shows some apparent relative smoothing and a bit less contrast in FIG. 34.

Figure 35:
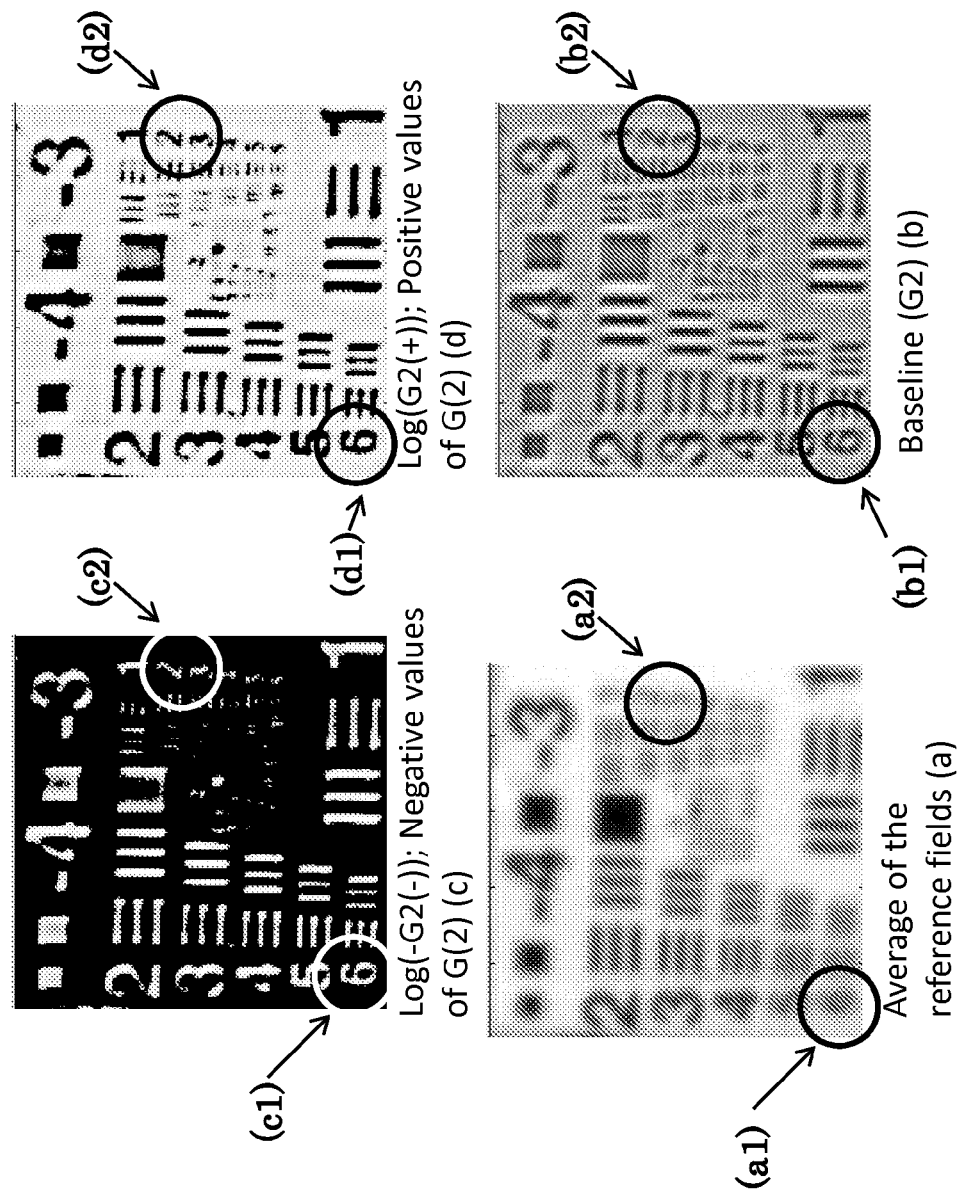
FIG. 35 is an illustration showing the image contract improvement, wherein both the Log positive and negative components of the base $G^{(2)}$ image show increased contrast and sharpening of edges especially when compared to the average image in the lower left.

FIG. 35 is a set of experimental results computed using a simple average of the collected frame data (a); A baseline result computed using Eq. 1 subject to the self bucketing concept of Eq. 2 (b); and two improved images when applying the partitioning procedure shown in FIG. 21 et seq. Both the Log positive (d) and negative (c) components of the base $G^{(2)}$ image show increased contrast and sharpening of edges. In particular, a comparison between (a1) on the average image and (c1) and (d1) of the improved log negative and log positive images highlights that the number "6" is quite legible in the improved images. A comparison of the (b2), (c2) and (d2) regions highlights the increased contrast of the (c2) and (d2) area with respect to the baseline (b) image.

FIG. 36 presents improved image results using a few hundred shots taken of a typical scene using an infra-red camera. Some portions of the scene are partially visible such as the lamp post in the middle and the clouds in the sky background. The improved image was computed combining the methods shown in FIG. 30. Features such as the lamp post show much more contrast and edge clarity. It should be noted that the process described in FIG. 36 yields all positive results with background noise largely eliminated.

Radiation Emitting Image Area

Objects within the field of view of a light sensing device typically reflect and scatter light from an external source of illumination as well as emitting light. Depending on the source of illumination and the material composition of the objects within the scene the contributions from reflected/scattered light and emitted light are often quite different. Light that is reflected from an object typically polarizes the reflected light while emitted light is often unpolarized. Emitted light may be from physical processes that include, but are not limited to, luminescence, fluorescence, "black body," and thermal radiation.

Low Light Imaging

Figure 38:
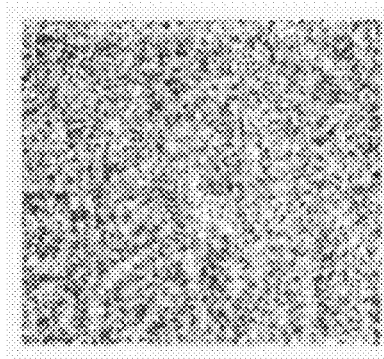
FIG. 38 is an illustration showing an average image of target area with data acquired in low-light and turbulence conditions viewed from 2.33 kilometers.
Figure 37:
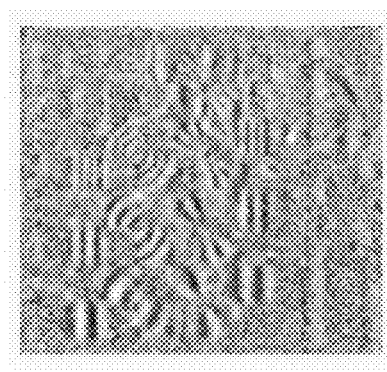
FIG. 37 is an illustration showing results of an enhanced image generated using preferred embodiment of FIGS. 20A-20C with data acquired in low-light and turbulence conditions viewed from 2.33 kilometers.
Figure 39:
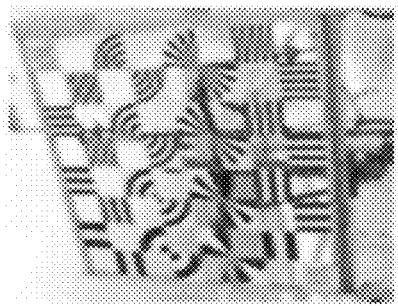
FIG. 39 is a view of the target shown in FIGS. 37 and 38 from a short distance.

The present invention relates to a method that can be applied to improve images of many types of low-light target objects and areas. Objects and target areas of interest are often very faint, either due, but not limited to, to low photon emission rate, being very distant (radiation intensity with distance from a source follows an inverse square law, i.e. $1/(r^2)$ where r is the distance from the center of the emitter to the receiving device), the reflectance of the object or target area of interest being very small, the effective integration or shutter time of the measurement device being very short, the efficiency of the detector may be small, or through attenuation and/or scattering due to the media through which the radiation propagates. Low light conditions could generally said to exist when the quality of the image degrades with the reduction of illuminating light or light received from the imaged area of interest by the eye or a sensor such as a camera. A low signal to noise ratio sensed by a sensor such as a CCD, CMOS, or single photon detector may also indicate low-light imaging conditions when the noise of the sensor exceeds the measured light by the sensor. Outdoors between dusk and dawn would typically be considered low-light conditions and indoors without bright overhead illumination may also produce low-light conditions. In an environment when obstacles occlude the light source such as in a cave or thick forest also produce low-light conditions. Conditions that cause the use of intensity amplification are considered low-light conditions. FIG. 38 is an average image of a distant (2.33 km) target taken under low-light conditions. FIG. 37 demonstrates an improved enhanced image of the same target as shown in FIG. 38. A close up picture of the target is shown in FIG. 39. It was determined that the conditions were low-light because the average image deteriorated to be virtually free from recognizable patterns as the intensity of the sun decreased by more than a factor or two late in the afternoon.

Figure 40:
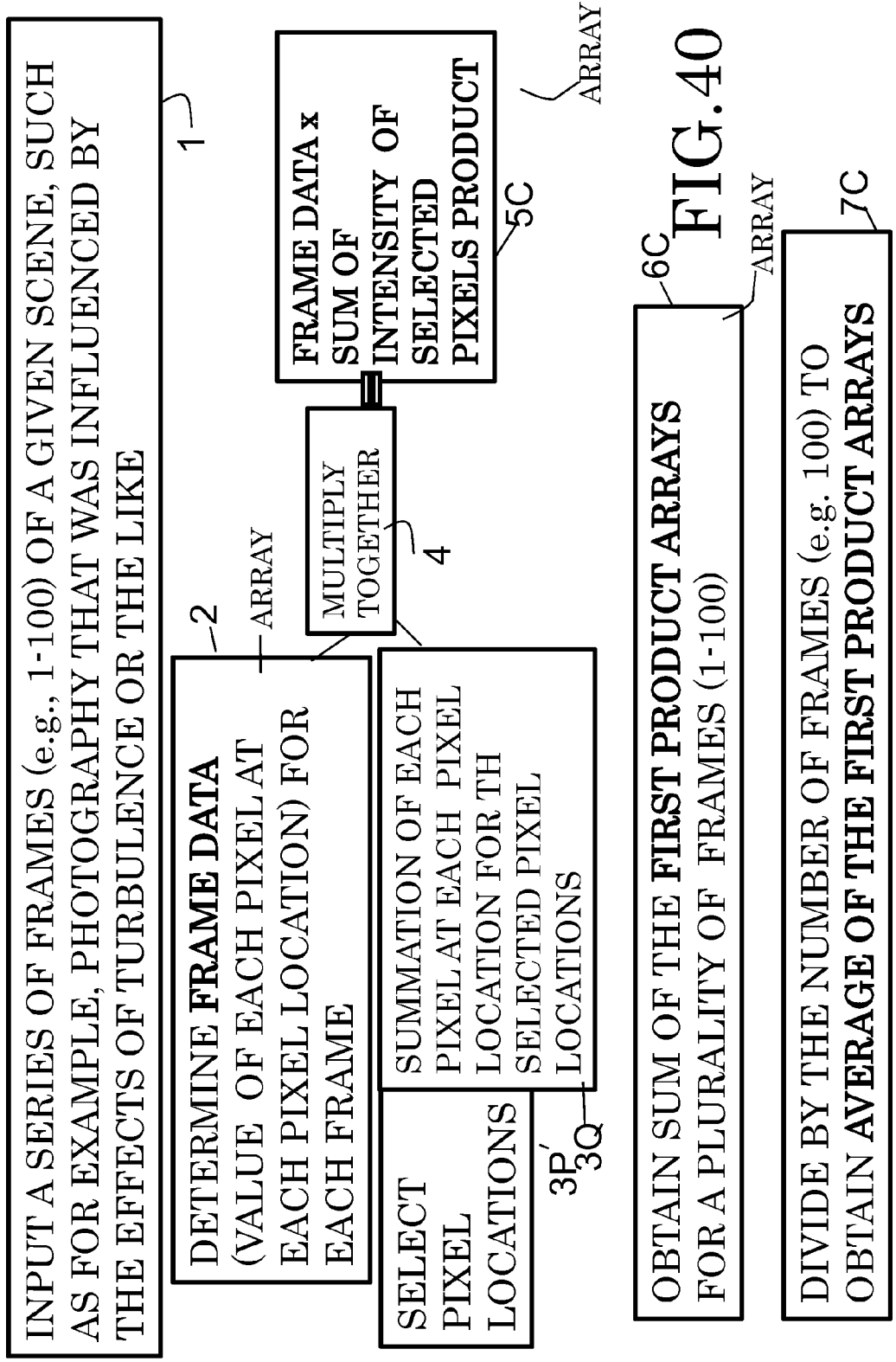
FIG. 40 is schematic block diagram illustration of the steps for performing an alternate preferred method of the present invention.

Referring now to FIG. 40, in accordance with one preferred embodiment, in Box 1 a series of frames are inputted into the memory or input of a processor or image processor. The frame may be composed on a plurality of pixels, typically in a two-dimensional (2D) array, that together form an image. Exemplary frames may be electronic image data such a TIFF or JPEG file. As used herein the terminology "processor" or "image processor" as used in the following claims includes a computer, multiprocessor, CPU, GPU, minicomputer, microprocessor or any machine similar to a computer or processor which is capable of processing algorithms. The frames may comprise photographs of the same region of interest. The region of interest may be a scene, landscape, an object, a subject, person, or thing. In Box 2, the frame data or value of each pixel at each pixel location is determined for a frame. In Box 3Q, a predetermined number of pixels are selected, rather than the entire "overall intensity) as was the case in regard to the preferred embodiment of FIG. 1. The intensity value of the predetermined pixels correlates to a "bucket value" determination. It correlates to the summation of the light intensity at the predetermined pixel locations. In the case of a picture, the overall intensity correlates to the sum of the reflected illumination at the predetermined pixel locations. In the case of an electronic display formed by pixels, the intensity is the summation each pixel value at each pixel location. At Box 4, the values in Box 2 are multiplied by the value determined in Box 3Q. Box 5C represents the frame data×sum of intensity of selected pixels product for the frame, which will henceforth be referred to as the First Product Array, which is also an array of values. At Box 6C, the sum of the First Product Arrays for a plurality of frames (1-100) products is obtained. As an example, one hundred frames may be selected. At Box 7C, the summation of the First Product Arrays determined in Box 6C is divided by the number of frames (such as for example one hundred) to determine the Average Of The First Product Arrays.

Figure 41:
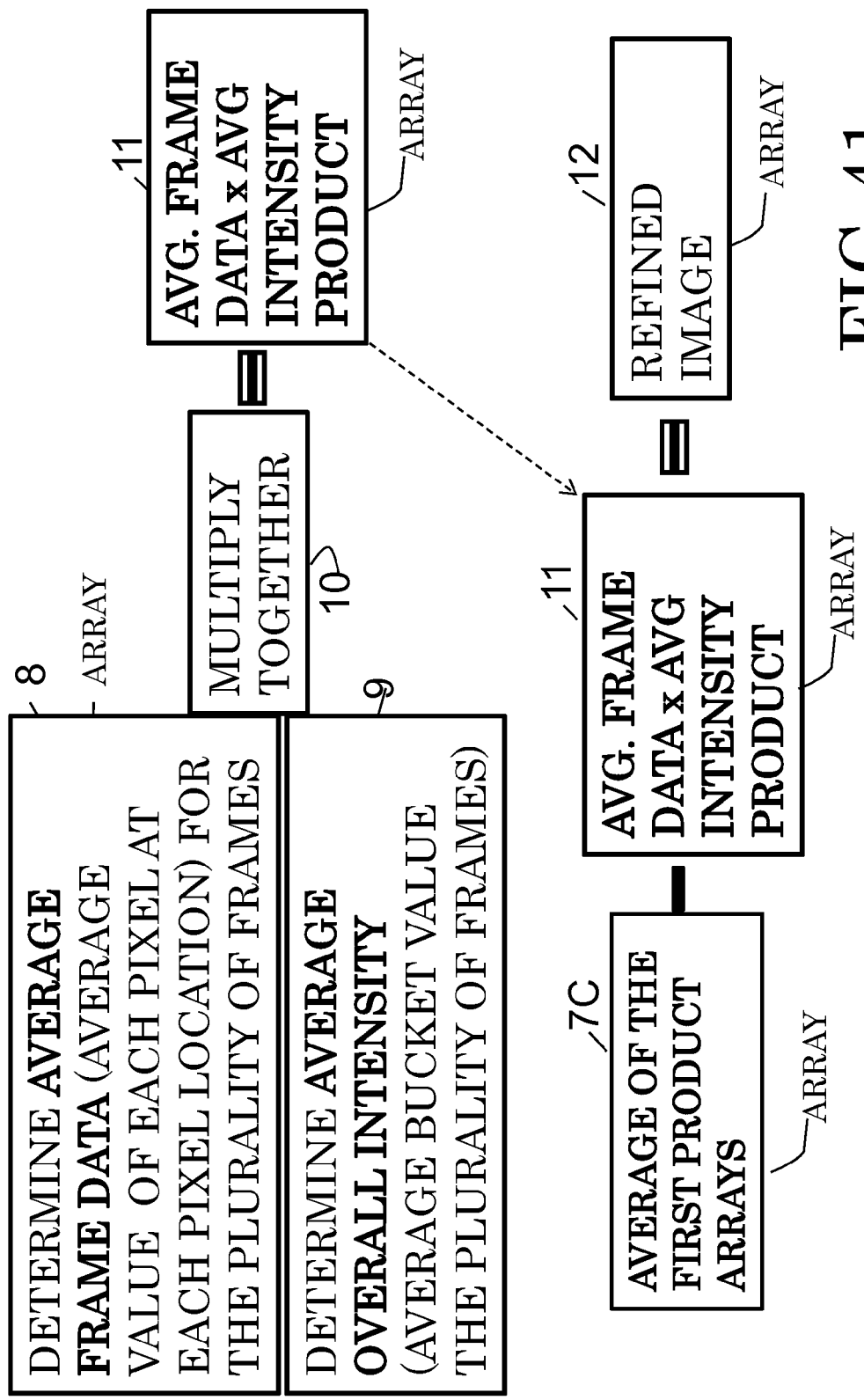
FIG. 41 is a schematic block diagram illustration of the steps for performing an alternate method of the present invention. Taken together, FIGS. 40 and 41 outline the steps of an alternate preferred methodology for the present invention.

FIG. 41 is a further description of a methodology of an alternate preferred embodiment of the present invention. Note that Box 7C is carried over from FIG. 40 into FIG. 41. In Box 8, the average frame data (or average value of each pixel at each pixel location) is determined for the plurality of frames (e.g. 100) by averaging the pixel values at each pixel location for the plurality of frames to determine an array of average pixel values. In Box 9, the average overall intensity for the plurality of frames is determined. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8 and 9 to form the Average Frame Data×Average Intensity Product, which is an array. As shown in the bottom portion of FIG. 41, the Average Frame Data×Average Intensity Product is subtracted from the Average Of The First Product Arrays to form the refined image of Box 12.

Imaging Through Weather, Turbulence, and Obscuration

The methods and techniques described in conjunction with the present invention can be applied to improve and enhance imaging of subject areas, objects, and scenes that would otherwise be degraded by the influence of scattering, particulates, bad weather conditions, including but not limited to rain or fog, turbulence, and obscuration, which may create at least one of the effects of artifacts, distortion, or noise in the measured image data. The invention has been demonstrated to improve and enhance images as shown by FIGS. 37 through 39. Turbulence, a type of obscuring property of the atmosphere, degrades the conventional image. In like manner, a conventional image degraded by bad or changing weather, low light, and/or obscuration would also be enhanced and improved by the current invention.

Centriods or center-of-intensity calculations are commonly used in first order imaging applications such as fluorescence microscopy. Many images of an illuminated target are measured and the locations of fluorescing emitters are determined to greater resolution than the average of the images by computing a center-of-intensity, or centroid, of the measured fluorescence. Where the location of the emitting source is determined by $$R = \frac{1}{I} \int_V \rho(r) r \, dV$$

where I is the total intensity in the volume, V is the volume, r is a position vector within the volume and ρ(r) is the value of the intensity at location r. However, two-photon "centroids" can be used to determine with more resolution the location of the point of reflection or scattering of entangled photons pairs from a region of interest that cause a measured coincidence detection event. In one embodiment one of the detectors may be a spatially resolving detector ($D_1$) and the other detector ($D_2$) is used as a non-spatially resolving "bucket detector." When detectors $D_1$ and $D_2$ both make a measurement within some coincidence window $T_c$ then a history of the locations on $D_1$ is recorded and a center-of-coincidences can be determined and the location of the source of coincidences would be determined with sub-pixel resolution. In a second embodiment where detector $D_2$ is also a spatially resolving detector then the spatial locations measured by each detector are used to determine the center-of-coincidences. A third embodiment would change detector $D_1$ to be the bucket measurement and detector $D_2$ to the spatially resolving detector. It is to be appreciated that inclusion of more detectors, i.e. $D_3 \ldots D_N$, would allow for higher-order coincidences to be measured and an $N^{th}$ order center-of-coincidence to be determined. These types of calculations can be performed when the entangled photons travel collinearly or non-collinearly.

Higher Order Partitioning (1) Separation of different orders of interference with measurements at different space-time locations for better contrast, visibility, and different views of the physics. (2) With two levels, i.e. +/−, there are 80 different views. (3) Separating the orders of photon interference as manifest in images at the data +/− ensemble levels is useful for quantum imaging and quantum computing.

Stereoscopic Images, Range, and Movies

Improved stereoscopic images and movies can be generated with application of the methods and techniques described in this invention. A typical stereoscopic image or movie is produced by viewing a region of interest with two distinct and separated imaging sensors such as two cameras or two human eyes. The optical path from the region of interest to each sensor is slightly different and each sensor also emphasizes slightly different portions of the region of interest. Furthermore, the field of view between each sensor and the region of interest is typically subject to different degrees of obscuration and degrading turbulence effects. The methods and techniques described in this invention can be applied to each of the stereoscopic channels individually, or in other embodiments cross-channel products between the reference fields and the buckets may be used, i.e. a right channel reference with a left channel bucket and a left channel reference with a right channel bucket. Range or depth maps of a region of interest can be generated from stereographic images. Since the stereographic images are adversely affected by obscurants and turbulence the methods and techniques described herein can be applied to generate improved stereographic images which may then be used to generate more accurate range or depth maps of the region of interest.

LADAR Per Pixel Range

Turbulence causes changes in the index of refraction in the atmosphere. These changes in the index of refraction cause a change in the speed of light through media thereby causing ranging problems. For example, light travels slower thru air with higher index of refraction. Other factors that influence the index of refraction in the atmosphere include but are not limited to temperature and concentrations of other materials such as water. The current invention can be applied to mitigate the effects of the anisotropic, inhomogeneous, and temporally fluctuating changes in the index of refraction along an optical path from a sender to a receiver. As an example a current type of LADAR system would direct a laser pulse to the region of interest, on sending the pulse the receiver detector would start taking a series of measurements for N consecutive measurements or bins. Each of the measurements would correspond to a dT where light returning from the target area would be measured. The particular dT out of the N dT measurements that measured the greatest number of photons would be assumed to give the range to the region of interest (c M dT)/2 where c is the speed of light, M is the index of the measurement time with the greatest number of photons measured, dT is the time width of each bin. The factor of 2 corrects for the time of the pulse to travel from the laser to the target and back from the target to the receiver. However, index of refraction variations generally spread out the pulse sometimes to the extent where no single dT bin has the greatest number of photon counts. Applying the methods and techniques described in this invention can mitigate this variable index of refraction induced degradation and generate improved depth or distance to target maps of the region of interest.

Alternative Grouping for Reference and Bucket Field Measurements

An alternative embodiment of the current invention may use different groupings of pixels or spatially resolved measurements for the "reference" field and the "bucket" field measurements. As an example, the pixels of a CCD type sensor may be grouped into a checker board type pattern where the equivalent pixels to a red (even) or black (odd) box on a checker board are treated as two distinct sensors. The even (odd) pixel set is then used as a set of "reference" measurements while the odd (even) pixel set is summed over and used as the set of "bucket" measurements. A $G^{(2)}$ type image for each pairing, even/odd or odd/even, can then be computed using the methods and techniques described herein to generate improved images of a region of interest. Each of the computed improved images may be examined separately or the can be added or subtracted from each other to highlight different features of the region of interest. It is to be appreciated that other groupings of pixels or spatially resolved measurements would be advantageous for specific applications or characteristics and details in the region of interest.

Color Images and Movies

Many current imaging devices are able to measure distinct portions of the electro-magnetic and optical spectrum. These devices such as color CCD cameras, smart phone cameras, and video recorders often split the colors of a region of interest into three color bands, i.e. red, green, and blue. Turbulence and obscurants typically impose an optical frequency dependent degradation on color images. The current invention can mitigate these degradations on a per color band basis. For example, using the methods and techniques described in this invention the measured red, green, and blue color bands could be used to generate an improved red image, improved green image, and an improved blue image. These three improved color band images could then be collected into a single improved "color" image. Other alternative embodiments would include using, for instance a "red" bucket with a "blue" reference field. These types of cross-color calculations may be useful to highlight or suppress desired features of the region of interest.

Extraction of Relative Dynamics Between Measurements Separated in Space, Time, or Both Embodiments of the present invention can be used to determine the dynamics and relative dynamics contained in measurements of the region of interest. The dynamics would consist of the information on the physical, chemical, and biological processes as they evolve in space and time. This would include but is not limited to the dynamics of light sources, surface characteristics such as reflection, and scattering in the transmission media.

Ghost Imaging with a Single Camera

Using ghost imaging we have shown that it is possible to generate an improved image of an area of interest using two detectors. The first detector is a sensitive light meter that measures light scattered or reflected from the area of interest. The second detector can be a camera, such as a charged coupled device (CCD), CMOS, or other device capable of imaging the relevant light source, such as the sun, stars, and moon outdoors, or light bulbs indoors, that illuminate the area of interest. In the case where the area of interest emits radiation such as infrared radiation, detector one measures the combined reflected, scattered, and emitted radiation. Detector two measures the effects of the reflected, scattered, and emitted radiation sources. By combining coincident measurements of first detector and the second detector a ghost image can be computed of the area of interest. It turns out that the ghost image can achieve higher resolution or greater clarity than an image of the area of interest using the camera type device alone taking a picture classically. This has been demonstrated in experiments and publications of peer reviewed articles. An explanation for the improvement of the image in turbulence is demonstrated by so called two-photon models of coincident imaging found in our publication. There it is shown that turbulence aberrations cancel and do not affect the improved resolution of the ghost image. Sometimes, a two-photon ghost image is referred to as a second order image. Whereas, the camera image taken by classical means is referred to as a first order image. Classical theory and experiment show that first order images are smeared by turbulence.

It would be desirable to generate a second order ghost image with high resolution and clarity even through turbulence while using just a single camera which may or may not be a color camera. In the case of a color camera ghost imaging system and method can be applied to each color that the color camera measures a color ghost image will result. Also, the camera could measure in infrared, UV, or more than one other wavelengths and pseudo-coloring can be used to display the ghost image depicting the intensity in the different wavelength bands. One embodiment of how to do this would be to treat the area of interest as a mirror or an imperfect mirror for the light sources. Thus, an array of pixel on the camera can image the area of interest as a measure of the light sources just as the second detector above. The first detector which measures the reflected and scattered light from the area of interest can be other or the same array of pixels in the camera.

One method would be to use a black and white checkerboard pattern of pixels where the white pixels act as detector two and the sum of the measurements on the black pixels act as detector one. By combining coincident measurements of first detector and the second detector a ghost image can be computed of the area of interest.

An alternate embodiment of this would be to place a beam splitter between the camera and the area of interest. The beam splitter can split the radiation into two parts, one part towards detector one and the other part towards detector two. For example with a 50/50 beam splitter half of the light from the area of interest would be directed to the pixels of the camera which act as the second detector. The remaining half of the light would be directed to a separate sensor which acts as the first detector. The separate sensor could be attached to the camera or even be a single pixel of the usual camera array. This second embodiment is not as simple as the first embodiment. However, it may be more accurate if the first detector has higher sensitivity or accuracy. By combining coincident measurements of first detector and the second detector a ghost image can be computed of the area of interest.

Another alternate embodiment would be to use all of the pixels of the camera to act as detector two and the sum of the measurements of all of the pixels act as detector one. By combining coincident measurements of first detector and the second detector a ghost image can be computed of the area of interest. Various combinations of the pixels including those which overlap or do not overlap of the camera can used as detector one and detector two. It has been demonstrated with experiments that these combinations described can be useful to obtain improved quality ghost images.

In calculating the improved quality ghost image the processor creates a correlation product of measurements from detector one times measurements from detector two at coincident times for each pixel location measured by detector two. Summing and averaging these correlations over an ensemble of coincidence times yields a measure of the ghost image. This ghost image is combined of both first order and second order image information. Subtracting off the first order image which may be smeared by turbulence yields a second order ghost image which will be improved over the first order image in that it will have higher resolution and less distortion due to turbulence. This image is often referred to as a $G^{(2)}$ image. When, for instance, thermal photons have Gaussian statistics then the $G^{(2)}$ image is expected to be positive. However, Gaussian statistics may not accurately characterize the photon measurements made by cameras imaging areas of interest. In addition, turbulence and other physical characteristics of the illuminating source, area of interest, camera, detectors one and two and intervening media may combine in ways to create photon measurements that would be best characterized as non-Gaussian. Some of the physical characteristics that may contribute to the non-Gaussian photon statistics can include any or all of inhomogeneous, non-stationary, anisotropic, non-ergodic, nonlinear, and quantum processes.

As it turns out empirically, $G^{(2)}$ gives a good image of the area of interest. However, it is important to try to improve the $G^{(2)}$ image contrast. Sometimes $G^{(2)}$ contrast is not as high as ideally desirable. One way to improve the image contrast is to artificially scale the ghost image by subtracting off any background. An analysis of the $G^{(2)}$ sign shows that when $G^{(2)}$ is positive then the intensity deviations that comprise it are correlated. When $G^{(2)}$ is zero then the intensity deviations are uncorrelated. When $G^{(2)}$ is negative then intensity deviations are anti-correlated. When the negative parts of $G^{(2)}$ subtracts from the positive parts of $G^{(2)}$ then an all positive $\Delta G^{(2)} = G^{(2)}$ correlated $-G^{(2)}$ anti-correlated can be computed. This method can be imaged by a display to have high contrast since the minimum is zero and other values are positive.

As described in the specification for U.S. patent application Ser. No. 13/247,470 filed Sep. 28, 2011 (ARL 11-03) herein incorporated by reference, there are many possibilities to combine results from the conditional product terms, $R_m^{++}$, $R_m^{--}$, $R_m^{+-}$, and $R_m^{-+}$, computations to generate and display an improved image of the region of interest. This sum, $RI_{\theta_x}$, is a weighed sum of correlated products. These correlated products would be formed from results of measurements of quantum particles. There are many applications for the method described below including imaging using photons and other quantum particles, measurement of gravitational waves, measurement of the quantum properties of sound, improved LIDARs, LADARs, improved medical imaging, improved Earth surveillance from space, improved space surveillance from Earth or other places in space. It is helpful to put the weighted sum of correlated products in a form where a user could compare the value of one vs. others for their application.

In particular, one useful way would be to weight terms in $R_m^{++}+R_m^{--}-R_m^{+-}-R_m^{-+}$ by $\cos\theta$ and $\sin\theta$ factors, i.e.

$$RI_{\theta 1}=\cos\theta\{R_m^{++}+R_m^{--}\}+\sin\theta\{R_m^{+-}+R_m^{-+}\},$$

where $\theta$ is an angle. This arrangement allows for continuously varying the contributions of the conditional product terms to display improved images to include an all positive image, an all negative image, a $G^{(2)}$ image and the negative of the $G^{(2)}$ image.

Another alternative would apply a $\cos\theta$ weight to the cross-term portion, $RI_{\theta 2}=\{R_m^{++}+R_m^{--}\}+\cos\theta\{R_m^{+-}+R_m^{-+}\}$.

While the conditional product terms can be displayed independently as an image, the alternative means described here to present and display the results would be useful for teaching and for detailed examination and analysis of the properties of the region of interest.

In practice, a movie displaying $RI_{\theta 1}$ or $RI_{\theta 2}$ would be made that scans through values of $\theta$ by the desired amount. For example, the movie could start at $\theta=0$ and each for each successive frame $\theta$ could be incremented by one degree until $\theta$ takes all values from 0 to 360 degrees. This will show the continuous change of $RI_{\theta 1}$ or $RI_{\theta 2}$ exhibiting varying contrast, visibility, and resolution of the computed image of the region of interest. For example when the symmetric terms are added to the asymmetric terms then a $G^{(2)}$ image results when the asymmetric terms are subtracted from the symmetric terms then an all positive image results. Which image is "better" for the user depends on the needs of the user. For example, from $RI_{\theta 2}$ one may obtain high contrast for $\theta=180$ degrees for an all positive image with high visibility. In some cases, more resolution of the region of interest may be found for $\theta=0$ degrees.

Color cameras often have pixel sensors that are covered by color filters. That way light directed towards a pixel sensor first passes through a filter before interacting with the pixel sensor. The filters are often laid out on a grid of pixel sensors in patterns that are variations of the "Bayer" pattern. For example, the filters over each pixel may be red, green, or blue arranged in a Bayer pattern. Usually 50% of the pixels are green 25% are blue and 25% are red so that the pixels only respond to the color of light that transmits through their color filter. There is a process for converting a Bayer pattern image to a RGB image where a processor computes a RGB value for each pixel. For example at a pixel that ordinarily measures a "green" value the RGB values may be completed by interpolating surrounding red pixel values and surrounding blue pixel values to that pixel. One method to record the RGB image is a variation of the AVI standard. Video sequences or individual pictures from a color camera are often recorded in AVI. Producing ghost images from AVI may result in high-quality ghost images. Occasionally, visual artifacts may be present in the ghost images due to the Bayer to RGB interpolation and conversion process. For some images that have been converted from Bayer to RGB it is possible to reverse the process to investigate what the ghost image would look like in the original Bayer pattern format.

For example, one means to convert back to a Bayer pattern image from a RGB image would be to extract the Bayer pixel color for each pixel location and zero out the interpolated color components. This would recover the underlying Bayer pattern image which could then be used to compute a ghost image that would be absent any artifacts from the interpolative or Bayer-to-RGB process.

Resolution of Conditional Product Terms

This section contains information on the conditional product terms. Conditional product terms are terms formed by correlations between values measured above or below the mean value. The values may represent intensity, polarization, or other physical quantities that are able to be measured. When these quantities have quantum properties or are able to be represented by quantum physics, such as photons or other quantum particles, then the resolution and visibility of the conditional product terms may be enhanced beyond conventional limits.

Positive and Negative $G^{(2)}$

The values of a particular $G^{(2)}$ can be either positive or negative. A positive $G^{(2)}$ indicates that the measurements at an x, y pixel are correlated with the bucket measurements. A negative $G^{(2)}$ indicates that the two measurements are anti-correlated.

CASE 1: As an example assume that an ensemble of measurements is made at location (a) and location (b). For this case assume that the ensemble consists of two measurement realizations 1 and 2. For realization 1, $I_a(1)=8$ and $I_b(1)=8$. For realization 2, $I_a(2)=2$ and $I_b(2)=2$. $G^{(2)}=<I_aI_b>-<I_a><I_b>$, where $<>$ indicates and average over the ensemble of realizations. For this ensemble, $G^{(2)}=34-25=9$. Examining $I_a$ and $I_b$ it is easy to see that the values of both of the measurements decrease at the same and typically referred to as correlated.

CASE 2: In a case where the ensemble of measurements is made at location (a) and location (b) for realizations 1 and 2, $I_a(1)=2$, $I_a(1)=8$ and $I_b(1)=8$, $I_b(2)=2$. Then $G^{(2)}=16-25=-9$. In this example $I_a$ increases in magnitude from 2 to 8 while $I_b$ decreases from 8 to 2. This is typically referred to as anti-correlated.

Multiple Buckets on Same Image

Bucket pixels can be allocated down to an individual pixel or a group of pixels in particular frames. The pixels in a group of pixel selected to be summed to a bucket (integrated intensities) value for a frame need not be contiguous. The bucket pixel or pixels may also be chosen on a per-frame basis. For instance, all pixels within 10% of the maximum pixel value for a frame may be chosen to be summed over for the bucket value for that frame. The spatial distribution of those pixels within 10% of the maximum pixel value is likely to change from frame to frame based on lighting conditions and turbulence/obscuration effects between the target area and the measurement system. Furthermore, single pixel buckets or multiple pixel buckets may be utilized.

Bucket Pixel Selection for Each Reference Pixel

The criteria for selecting a set of pixels to use as a "bucket" value includes but is not limited to finding those pixels which contribute to improved contrast of the refined image, improving the convergence rate of the refined image, improving resolution of the refined image, improving the refined image fidelity to the imaged scene or target, finding optimal placement/selection of pixel sensors as "buckets" to minimize noise in refined image, providing enhanced resolution, to comply with certain $G^{(2)}$ mathematical constraints such as positivity, and to explore the computational, mathematical, and/or physical effects of changing the bucket configuration. For example, we can compute a $G^{(2)}$ using all the pixels in a frame to represent the bucket. A $G^{(2)}$ refined image may also be computed using only one pixel out of a set of pixels in a frame. We may see from comparison of two $G^{(2)}$ images that the $G^{(2)}$ image with the many pixel bucket provides different images than a $G^{(2)}$ image using a single pixel. Furthermore, the $G^{(2)}$ image changes with the pixel location or other physical property such as wavelength in the ensemble of frames array. This comparison provides image information about the effect of a single pixel "bucket," its location and the many pixel "bucket" average of the ensemble of such pixels. From this information, the effect of bucket size (number of pixels used for the bucket) and shape (distribution of pixels in space and time used as the bucket) on the properties of the refined image can be determined which provides theoretical and practical benefits such as determining and implementation of optimized bucket selection to provide enhanced images of the target or region of interest.

Each pixel within a set of measurements (I), typically intensity values, taken using a camera may be indexed by a location $x_i$, $y_j$, k, i.e. I(xi, yj, k). When the locations of the measurement elements of the sensor are not arbitrarily distributed a pixel value can be indexed as I(i, j, k). The values of i vary from 1 to IMAX where IMAX is the number of horizontal pixels on the sensor, j varies from 1 to JMAX where JMAX is the number of vertical pixels on the sensor and k is the identifier for the frame number which varies from 1 to NFRAMES. For example a sensor may have 8 pixels in the horizontal (IMAX=8) and 8 pixels in the vertical (JMAX=8). If 10 images where measured with this sensor then NFRAMES would equal 10. In the current invention, a "bucket" value B(i, j, k) is determined on a per pixel basis for each pixel in the set of measured values. The "bucket" for say, pixel i=2, j=6, k=3 could be a normalized summation of pixels values. For example B(2, 6, 3) could be [I(1, 1, 1)+I(3, 8, 7)]/2. B(3, 1, 1)=[I(2, 1, 2)+I(1, 9, 3)+I(10,10,9)]/3. Then these bucket values B(i, j, k) can be used to compute a $G^{(2)}$ image as <I(i, j, k)*B(i, j, k)>−<I(i, j)>*<B(i, j)> where < > indicates an ensemble average over the number of frame. In the current invention a previous embodiment would have the "bucket" or "overall frame intensity" defined as B(k)=ΣI(i, j, k) where the summation is over all i=1 to IMAX and j=1 to JMAX. The B(k) value for this embodiment would be applied to compute a $G^{(2)}$ images as $G^{(2)}$=<I(i, j, k)*B(k)>−<I(i, j)>*<B>.

Correlations Between Different Wavelengths

Reference values and bucket (integrated intensities of pixels) values may be allocated based upon the wavelength, or color, of the measured photons. For instance, measured green values on a color CCD or CMOS camera may be used to provide the reference field pixel measurements and measured red values may be allocated or summed to provide the value of the bucket measurement for a frame.

Infrared Between Bands

Modern advanced infrared cameras may provide per-pixel co-located measurements of infrared wavelengths in, for instance, the mid-wave infrared (MWIR) and long-wave infrared (LWIR) wavelength bands. One band may be used to provide reference pixel values and pixel in the other band can be allocated or summed to provide bucket values. A further, local $G^{(2)}$ type calculation may take place wherein deviations from the ensemble mean of one wavelength band can be multiplied with deviations from the ensemble mean of the other wavelength band. These deviation products are performed for each pixel in a frame and summed over all the frames of data in the ensemble. A preferred methodology may therefore comprise dividing this deviation product sum by the total number of frames in the ensemble to yield a $G^{(2)}$ image of the area of interest.

Coordinate Shifting of Pixel Values

Figure 42:
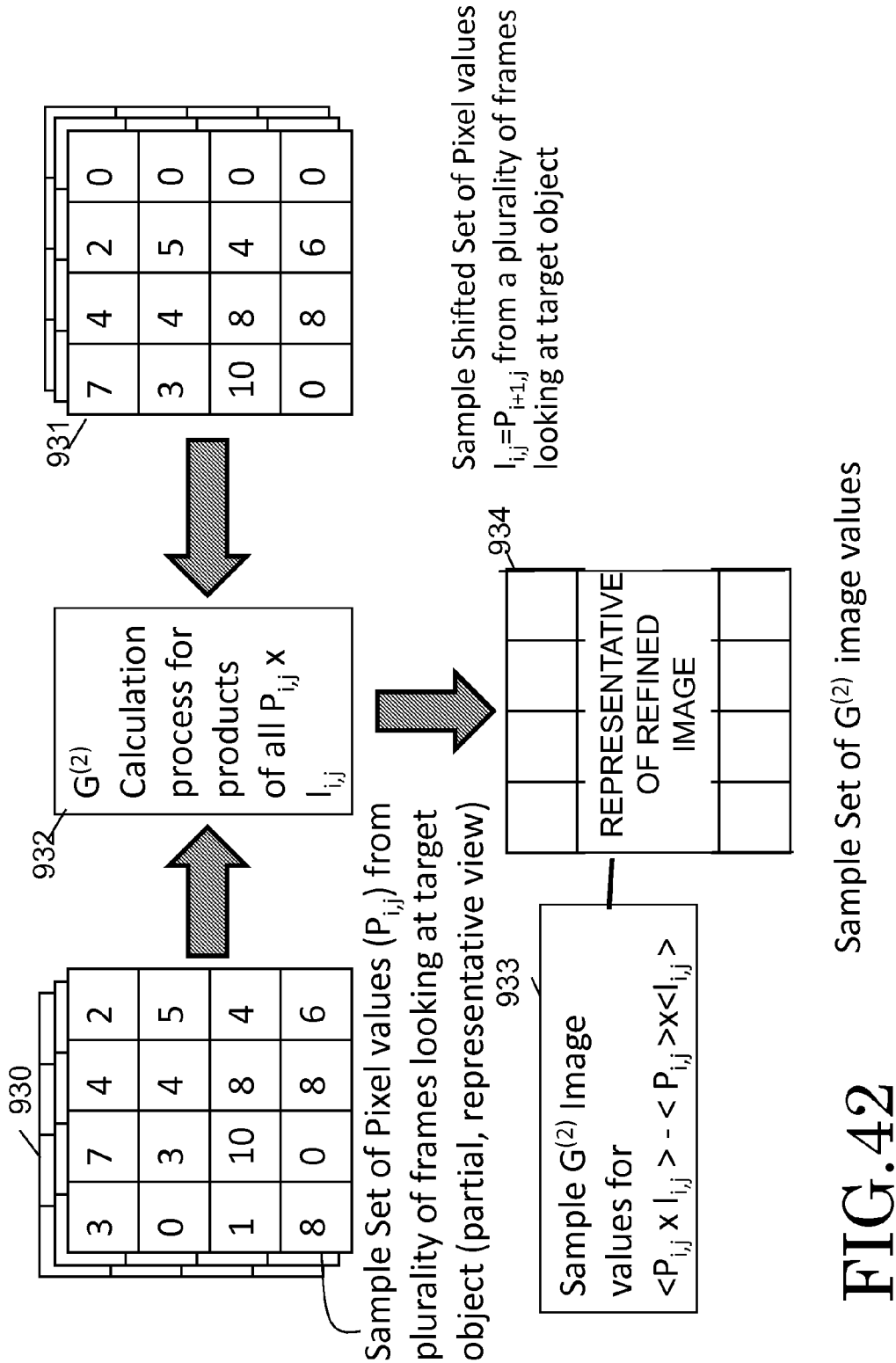
FIG. 42 is a schematic diagram of an alternate preferred embodiment involving coordinate shifting of pixel values.

FIG. 42 is a schematic diagram of an alternate preferred embodiment involving coordinate shifting of pixel values. As illustrated schematically in FIG. 42, element 930 is a frame of pixel values, such as from a charge coupled device (CCD). Note that only a small, representative fraction of the pixel values in an entire frame is depicted. A charge-coupled device (CCD) as used herein is a device for the movement of electrical charge, usually from within the device to an area where the charge can be manipulated, for example conversion into a digital value. Element 931 represents the shifted set of pixels values from element 930 where the pixel values of 930 are shifted to the left by 1 column; the furthest left column is filled with 0 values. Box 932 represents the performance of the inventive calculations with the shifted pixel values including the calculations for ensemble average arrays of pixel values, ensemble average arrays of shifted pixel values; deviations of pixel value arrays and shifted pixel value arrays from their respective averages, and calculation of the enhanced final image; ie., the $G^{(2)}$ Image for process for products of all $P_{i,j} \times I_{i,j}$. Box 933 is the explanation for the $G^{(2)}$ Image for $<P_{i,j} \times I_{i,j}> - <P_{i,j}> \times <I_{i,j}>$ that is represented by Box 934. 930 Sample array of pixel values from CCD or other imaging device. The calculated enhanced final image pixel values may be transferred from Box 934 to memory for storage or to a display for viewing.

Figure 43:
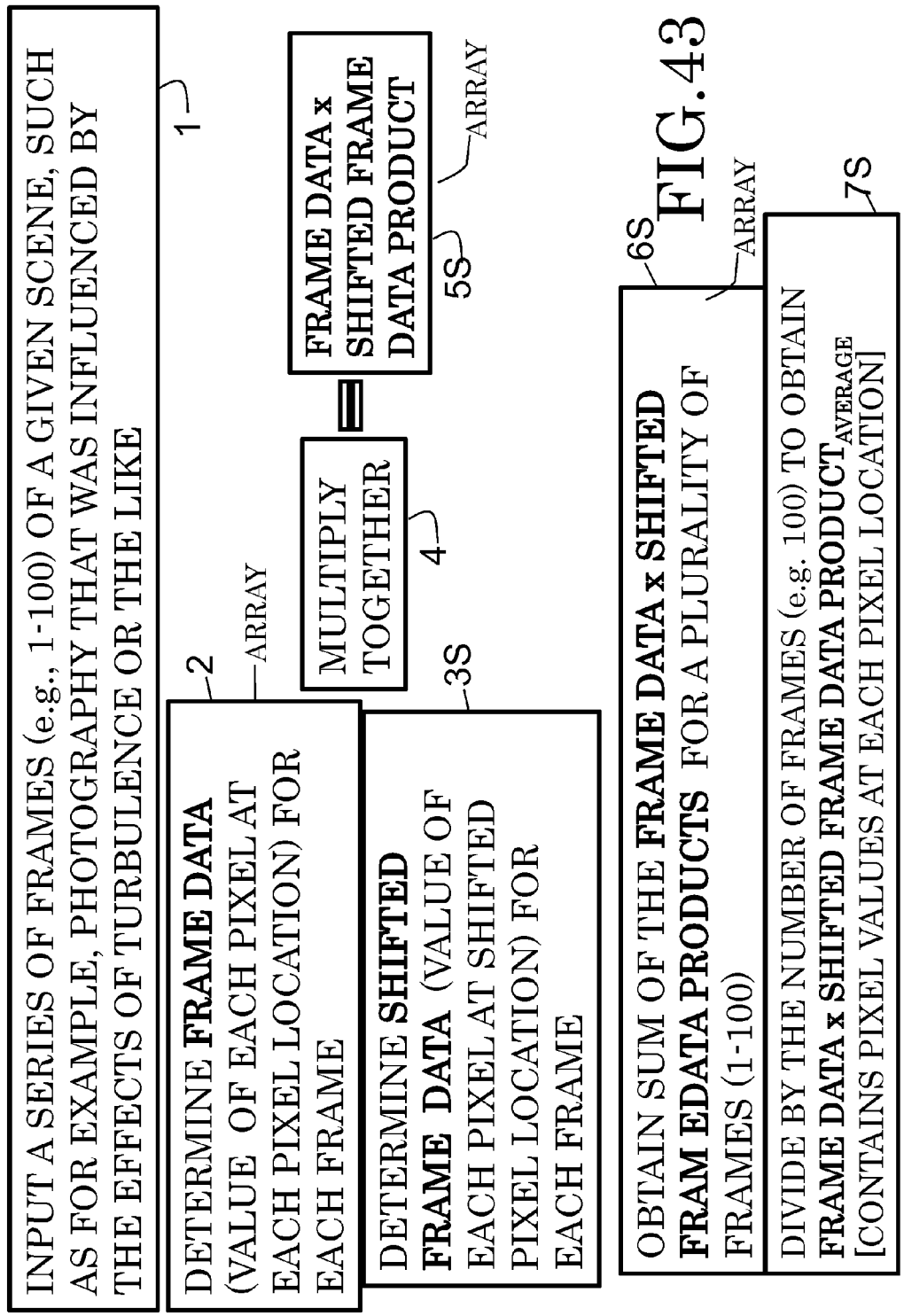
FIG. 43 a partial schematic block diagram illustration of the steps for performing an alternate preferred method involving coordinate shifting of pixel values.
Figure 44:
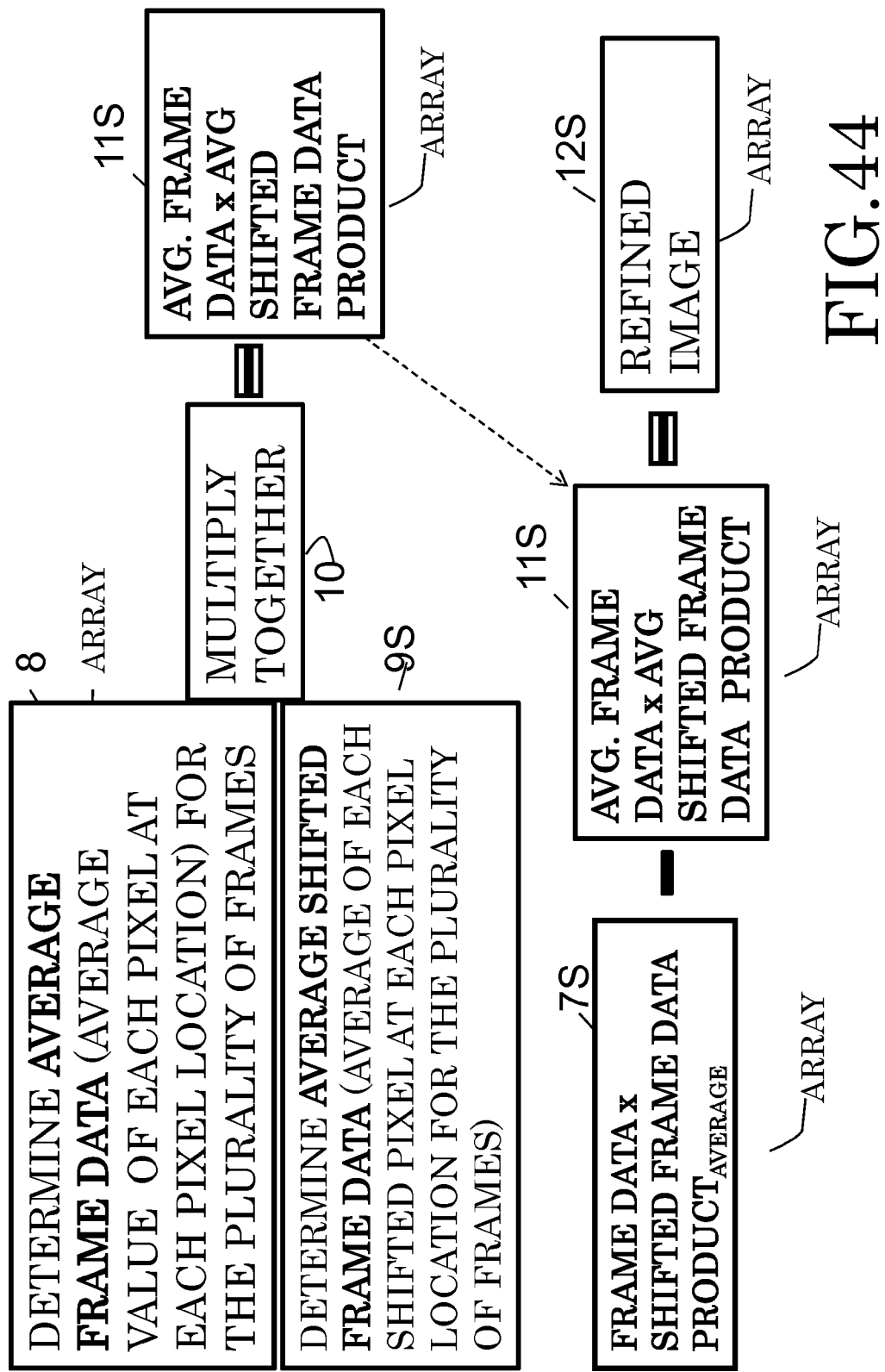
FIG. 44 is a schematic block diagram illustration of the steps for performing an alternate preferred method involving coordinate shifting of pixel values. Taken together, FIGS. 43 and 44 outline the steps of an alternate preferred methodology involving coordinate shifting of pixel values.

FIG. 43 is a partial schematic block diagram illustration of the steps for performing an alternate preferred method involving coordinate shifting of pixel values FIG. 44 is a schematic block diagram illustration of the steps for performing an alternate preferred method involving coordinate shifting of pixel values. Taken together, FIGS. 43 and 44 outline the steps of an alternate preferred methodology involving coordinate shifting of pixel values. Boxes which are not labeled with a suffix "S" are the same as described with respect to FIGS. 1, 2, 40 and 41. Box 38 represents determining shifted frame data (value of each pixel at shifted pixel location) for each frame. Box 58 represents the frame data× shifted frame data product. Box 68 is the sum of the frame data×shifted frame data products for a plurality of frames (1-100). Box 78 represents the division by the number of frames (e.g. 100) to obtain frame data×shifted frame data product average [contains pixel values at each pixel location]. Box 98 represents the determining of the average shifted frame data (average of each shifted pixel at each pixel location for the plurality of frames). Box 118 represents the average frame data×average shifted frame data product, which is subtracted from Box 78 to produce the enhanced image.

Figure 45:
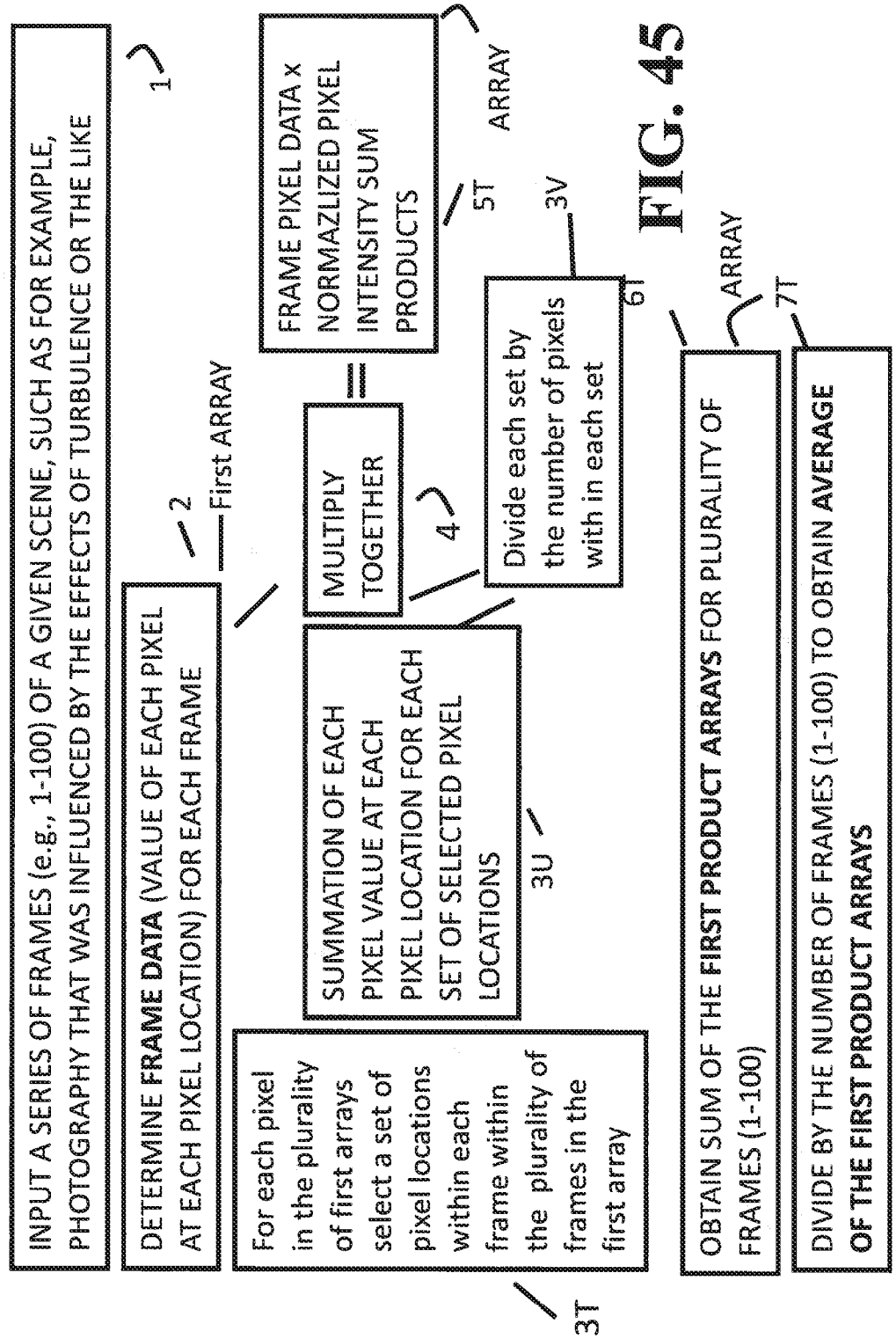
FIG. 45 is a partial schematic block diagram illustration of an alternate preferred embodiment method involving a generalized means to select pixels to use as "bucket" values for each pixel in the plurality of frames of data.
Figure 46:
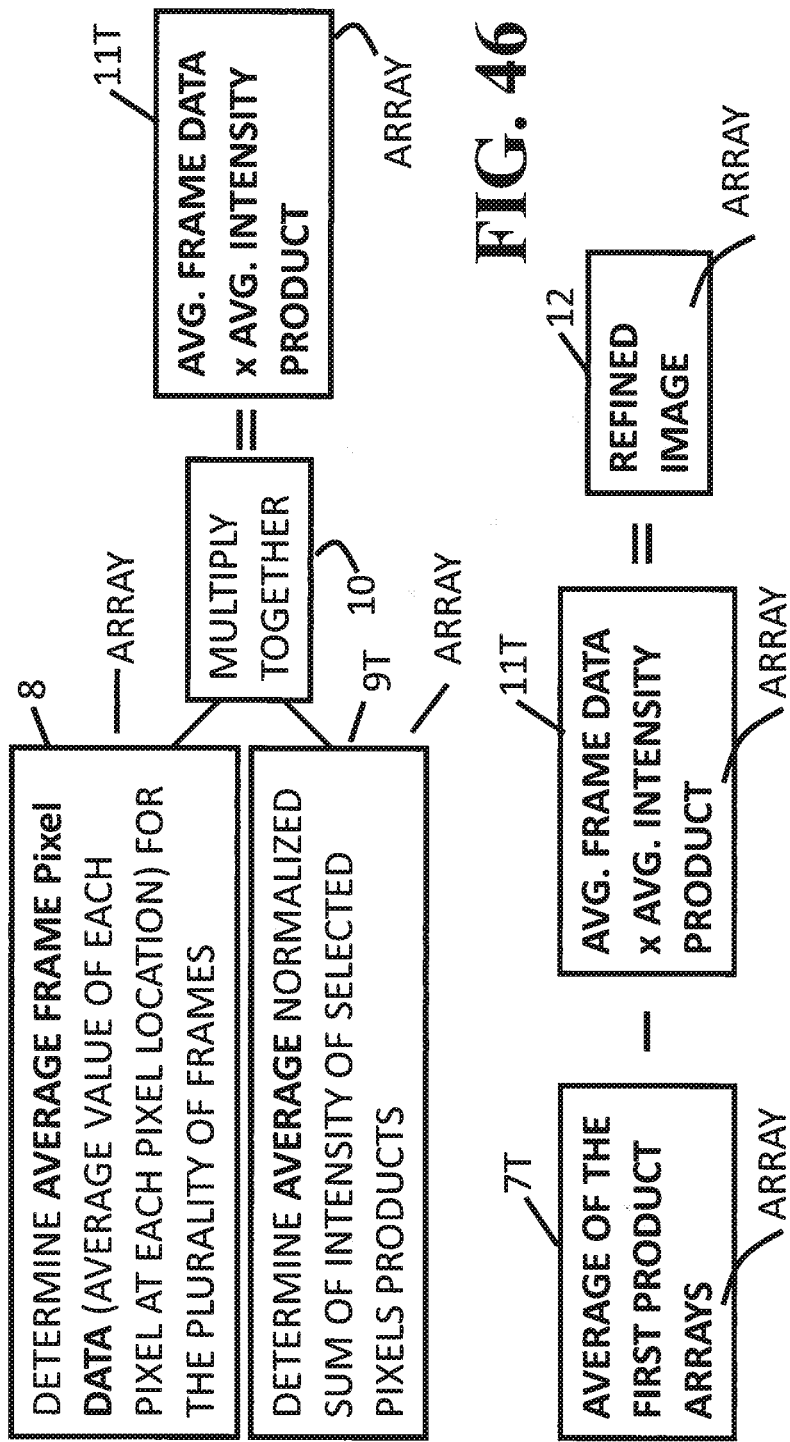
FIG. 46 is a schematic block diagram illustration of the steps for performing an alternate preferred embodiment involving selecting a set of pixels to generate a normalized sum to use as a "bucket" value for each measured pixel value in the plurality of frames. Taken together, FIGS. 45 and 46 outline the steps of an alternate preferred embodiment involving selecting a set of pixels to generate a normalized sum to use as a "bucket" value for each measured pixel value in the plurality of frames.
Figure 47:
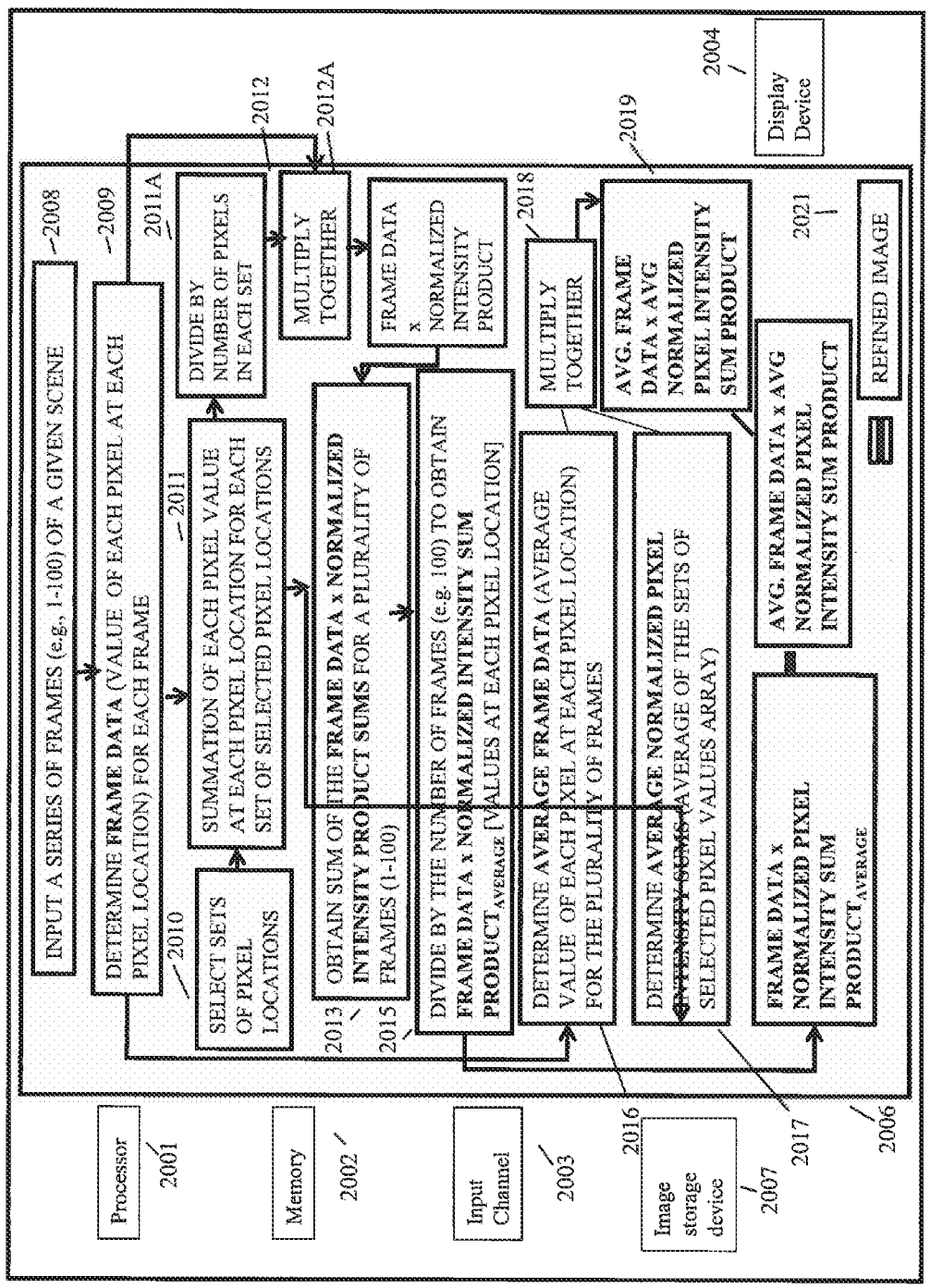
FIG. 47 is a high level block diagram configured to implement a particular embodiment of the present invention.

FIGS. 45 to 47 present schematic diagrams for methods and system embodiments of calculating enhanced images of a region of interest wherein the values used to multiply the pixel values of the "first array" are generalized to be a selected set of pixel values within the plurality of frames. The sum of selected intensity values is determined for each pixel in the "first array." Effectively this is a per pixel "bucket value" that would allow for the tailoring of the "bucket" values to meet imaging requirements. As an example, pixels in the first array that are not representative of the region of interest can be excluded. Such pixels may include those pixels on the sensor that are returning measurement values of 0 or pixels that are returning values that are much larger in magnitude than nearby pixels.

FIG. 45 is a partial schematic block diagram illustration of the steps for performing an alternate preferred method involving a generalized means to select pixels to use as "bucket" values for each pixel in the plurality of frames of data. FIG. 46 is a schematic block diagram illustration of the steps for performing an alternate preferred method involving selecting a set of pixels to generate a normalized sum to use as a "bucket" value for each measured pixel value in the plurality of frames.

Taken together, FIGS. 45 and 46 outline the steps of an alternate preferred methodology involving selecting a set of pixels to generate a normalized sum to use as a "bucket" value for each measured pixel value in the plurality of frames. Boxes which are not labeled with a suffix "S", "T", or "U" are the same as described with respect to FIGS. 1, 2, 40, 41, 43 and 44. Box 3T represents determining the selecting sets of pixels to generate a normalized sum to use as a bucket values for each pixel for each frame. Box 3U represents normalizing the sum of the selected sets of pixels by dividing the sum of the pixel values in each set of pixel by the number of pixels within each set of selected pixels. Box 5T represents the frame data×normalized pixel intensity sum product. Box 6T is the sum of the frame data×normalized pixel intensity sum products for a plurality of frames (1-100). Box 7T represents the division by the number of frames (e.g. 100) to obtain frame data×s normalized pixel intensity sum product average [contains pixel values at each pixel location]. Box 9T represents the determining of the average normalized pixel intensity sum (average of each normalized pixel intensity sum at each pixel location for the plurality of frames). Box 11T represents the average frame data×average normalized pixel intensity sum product, which is subtracted from Box 7T to produce the enhanced image.

FIG. 47 presents a block diagram of a system for image improvement 2000 including a processor 2001, memory 2002, input channel 2003, display 2004, and an image storage device 2007. The system 2000 is operative to execute the image improvement algorithm 2006 on processor 2001 wherein the algorithmic program and input image data frames are stored in memory 2002. The steps of the algorithmic process 2006 are detailed as follows: In Box 2008 a series of frames. e.g. 100 frames, are inputted into the memory or input of a processor or image processor. The frame may be composed on a plurality of pixels, typically in a two-dimensional (2D) array, that together form an image. Exemplary frames may be electronic image data such a TIFF or JPEG file. As used herein the terminology "processor" or "image processor" as used in the following claims includes a computer, multiprocessor, CPU, minicomputer, microprocessor or any machine similar to a computer or processor which is capable of processing algorithms. The frames may comprise photographs of the same region of interest. The region of interest may be a scene, landscape, an object, a subject, person, or thing. In Box 2009, the frame data or value of each pixel at each pixel location is determined for each frame. In Box 2010, a predetermined number of pixels are selected for each pixel in the plurality of frames, rather than the entire "overall intensity) as was the case in regard to the preferred embodiment of FIG. 1, to sum and use as the "bucket value" for the corresponding pixel. In Box 2011 The intensity value of the predetermined pixels correlates to a "bucket value" determination. It correlates to the summation of the light intensity at the predetermined pixel locations. In the case of a picture, the overall intensity correlates to the sum of the reflected illumination at the predetermined pixel locations. In the case of an electronic display formed by pixels, the intensity is the summation each pixel value at each pixel location. Box 2011a divides the summation of pixel values by the number of pixels for each set of pixels selected. At Box 2012, the values in Box 2009 are multiplied by the values determined in Box 2011a. Box 2012A represents the frame data×normalized sum of intensity of selected pixels product for the frame, which will henceforth be referred to as the First Product Array, which is also an array of values. At Box 2013, the sum of the First Product Arrays for a plurality of frames (1-100) products is obtained. As an example, one hundred frames may be selected. At Box 2014, the summation of the First Product Arrays determined in Box 2013 is divided by the number of frames (such as for example one hundred) to determine the Average Of The First Product Arrays. In Box 2016, the average frame data (or average value of each pixel at each pixel location) is determined for the plurality of frames (e.g. 100) by averaging the pixel values at each pixel location for the plurality of frames to determine an array of average pixel values. In Box 2017, the averaged normalized pixel intensity sums for each pixel in the plurality of frames is determined. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames. Box 2018 represents the multiplication of Boxes 2016 and 2017 to form the Average Frame Data×Average Normalized Pixel Intensity Sum, which is an array. The Average Frame Data×Average Normalized Pixel Intensity Sum is subtracted from the Average Of The First Product Arrays to form the refined image of Box 2021. In one exemplary configuration of system 2000, the processor 2001 may be a Dell Precision T7500 Xeon 64 bit CPU, the memory 2002 be 12 Gigabytes of DDR3 RAM, the input channel 2003 may be a serial ATA (SATA), and the image storage 2007 may be a hard disk drive.

Figure 48:
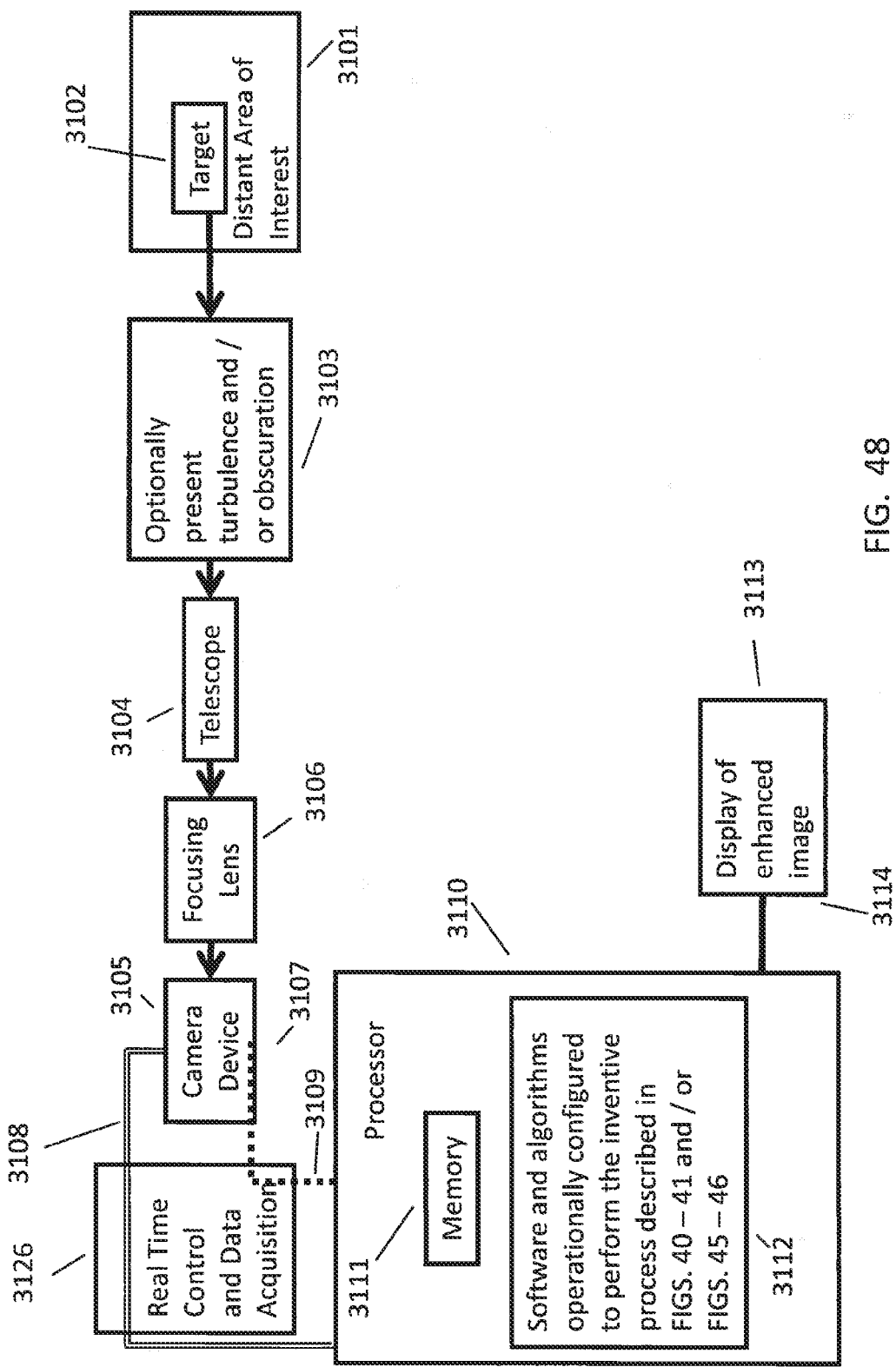
FIG. 48 is a high level schematic block diagram of an alternate preferred embodiment similar of the present invention.

FIG. 48 illustrates a high level block diagram that generates enhanced averaged second-order images or movies of a region of interest. Note, the region of interest may emit photons that are not reflected or scattered photons from some other photon source. A photon source may include for example the sun, moon, coherent, incoherent, or partially coherent light, entangled photons, infrared radiation emitted by atoms and molecules, accelerating charges, lasers, light bulbs, light emitting diodes (LEDs), chaotic laser light, pseudo-thermal light generated by passing laser light through a rotating ground glass or other scattering material, stars, moons, clouds, planets, space objects, fluorescent lamps, electrical discharges, plasmas, bio-luminescence, and stimulated emission. The distant target scene 3101 comprises a target 3102 which is an area used of the distant target scene for the particular region of interest developed for image testing. The element 3103 represents optionally present turbulence or other obscuring or image degrading effects along photon path between light source and target, and light source and imaging system or photon measurement devices or components. Light from the telescope 3104 (although other apparatus or direct viewing may be used without departing from the scope of the invention) is focused by a lens 3106 and an image is formed within the camera 3105. Telescope 3104 may be configured to zoom in on or expand view of the selected region of interest, as well as zoom out. An image or photon measurement device 3105 may be for example, a camera. Lens 3106 couples the telescope 3104 to image or photon measurement device 3105. The assembly may optionally include a Barlow type lens for increased magnification of the region of interest. Control line 3107 enables e real-time control of data acquisition. Data transfer channel 108 extends from image or photon measurement device 3105 to the processor 3110. The communications channel 3109 extends between processor 3110 and data acquisition and real-time control 3126. The processor, memory, and algorithms to generate enhanced average second-order images of the region of interest are represented by box 3110. Box 3111 is a memory associated with processor 3110 to store input images, algorithms, intermediate computations, and enhanced second order images of the region of interest. Box 3112 represents software operationally configured to perform the inventive process described in FIGS.

40-41, and/or FIGS. 45-46. Box 3113 is a display operationally connected by channel 3114 to processor 3110 to display the generated enhance second-order image of the region of interest. 3114 indicates a cable or communications channel to connect display 3113 to processor 3110 to transfer the generated enhanced second-order images of the region of interest to the display. Block 3126 comprises the data acquisition and real-time control electronics.

Figure 49:
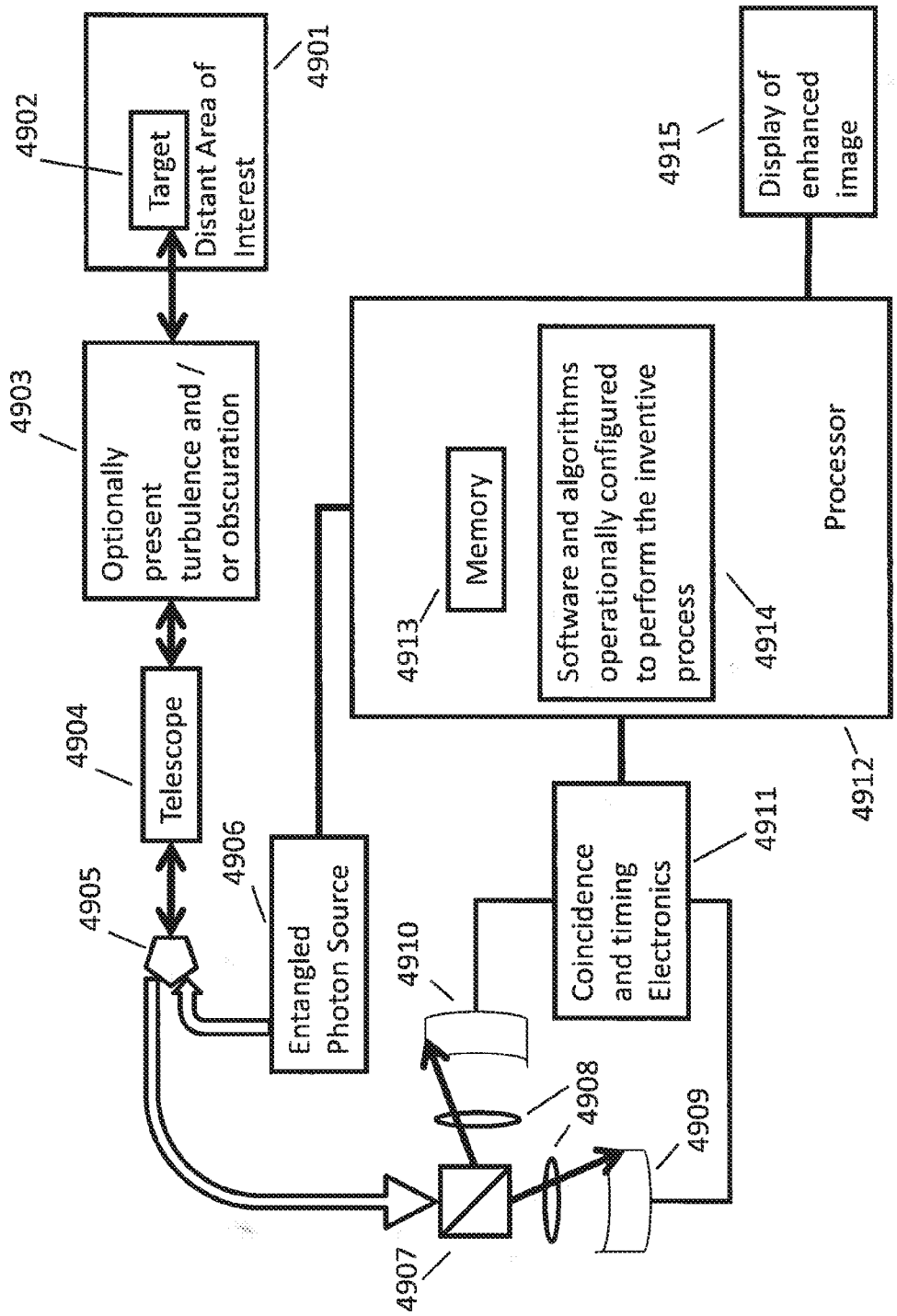
FIG. 49 is a schematic block diagram of an alternate preferred embodiment using illumination with entangled photons.
Figure 50:
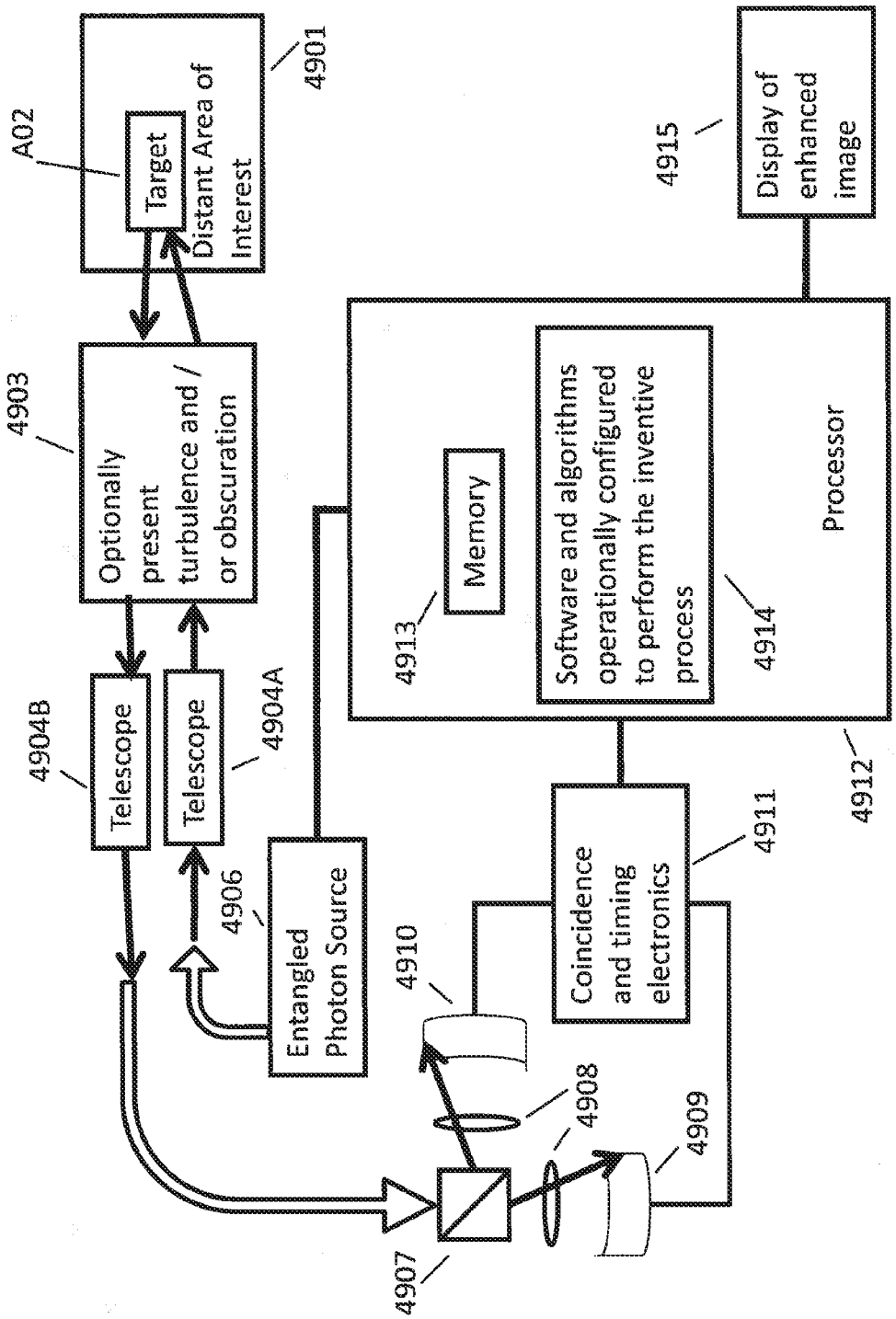
FIG. 50 is a schematic block diagram of an alternate preferred embodiment with two telescopes and entangled photon illumination.
Figure 51:
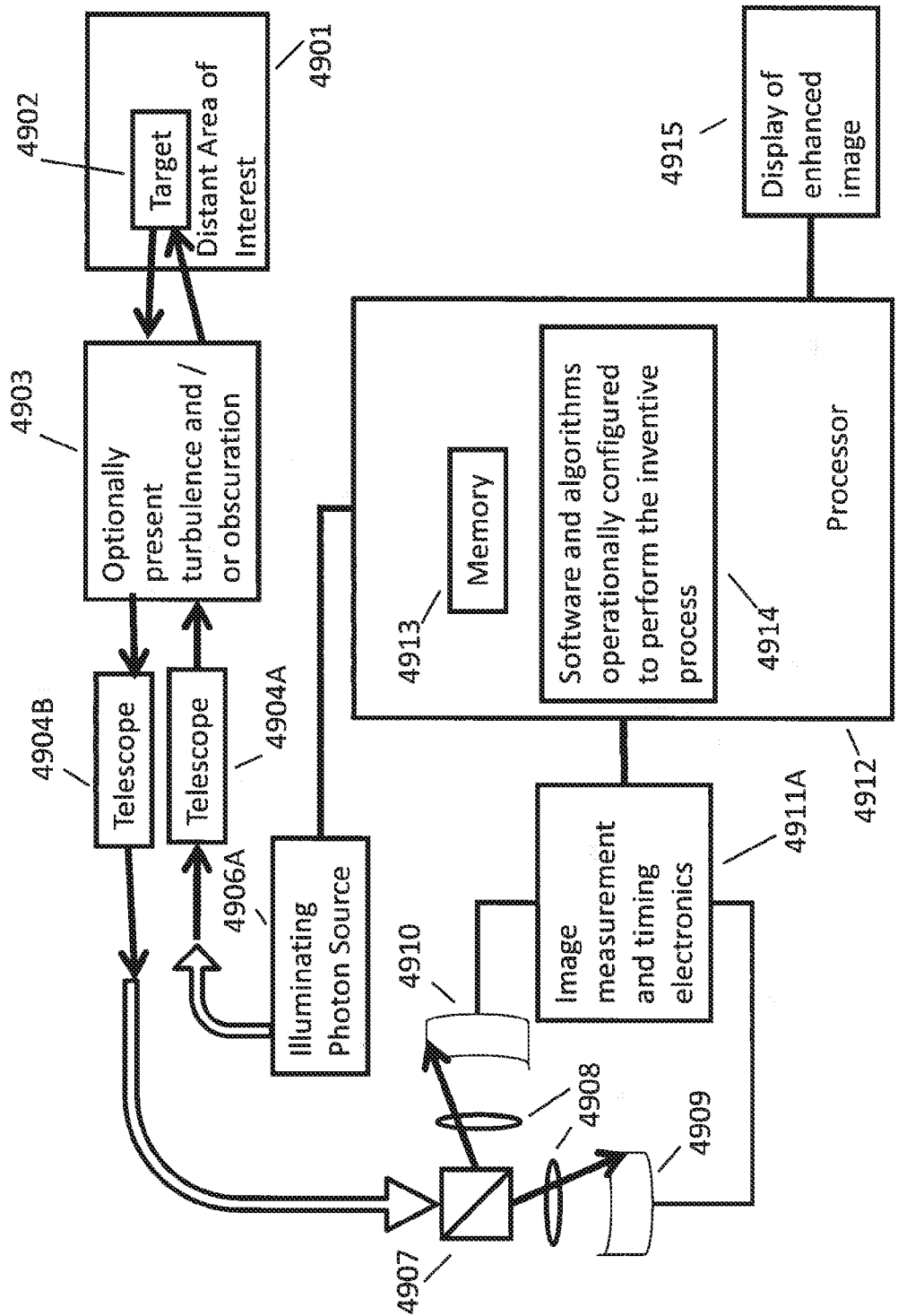
FIG. 51 is a schematic block diagram of an alternate preferred embodiment with two telescopes.

FIGS. 49 to 51 present block system diagrams for systems that provide illumination of a distant area of interest for use in generating an enhanced image of the target or area of interest. The illumination can be entangled photons, incoherent photons, or coherent photons. Illumination has benefits for instances when the environmental illumination is insufficient or for instanced when it is desirable to use particular types of photons, e.g. entangled photons for range determination or absorption characteristics of the area of interest, etc., coherent photons of a particular wavelength, or broad-band incoherent light to meet particular application requirements.

FIG. 49 presents a block diagram of an embodiment of a system for image improvement.

Box 4901 indicates a distant target scene area. Box 4902 indicates the target which is an area of the distant target scene for the particular region of interest selected for improvement and enhancement. Box 4903 indicates optionally present turbulence or other obscuring or image degrading effects along photon path between light source and target, and light source and imaging system or photon measurement devices or components. Box 4904 is a telescope. Telescope 4904 (although other apparatus or direct viewing may be used without departing from the scope of the invention). Telescope 4904 may zoom in on or expand view of the selected region of interest, as well as zoom out. Telescope 4904 is used to transmit entangled photon pairs to the region of interest and receive entangled photon pairs reflected or scattered from the region of interest. Box 4905 is an optical circulator: An optical circulator is an optical element that transfers incoming photons to the next port of the circulator unlike a beam-splitter where photon paths are split to two or more ports. Box 4906 is an entangled photon source. The entangled photon source generates entangled photon pair that are entangled in time-energy, H-V polarization or between other conjugate pair properties of the photons. Exemplary examples of entangled photo-sources include entangled photons generated via Spontaneous Parametric Down-conversion (SPDC) in a nonlinear crystal such a Beta-Barium Borate (BBO) or potassium titanyl phosphate (KTP), entangled photons generated in a quasi-phase matched nonlinear media such as periodically poled KPT (PPKTP) or periodically poled Lithium Niobate (PPLN), and entangled photons generated in a four-wave mixing process in a nonlinear optical fiber.

Box 4907 is a polarizing beamsplitter, dichroic-mirror or other optical element that operates to direct one portion of an entangled photon pair towards spatially resolving detector 1 and directs the remaining portion of an entangled photon pair toward spatially resolving detector 2. The portions of the entangled photon that are directed towards, for example, detectors 4909 and 4910 are selected by the element in Box 4907. As an example, an entangled photon produced in an entangled polarization state |HH>|VV>+|VV>|HH> may be generated with frequencies $v_1$ and $v_2$; the frequencies are not correlated with the polarizations. Then, Box 4907 could be configured with a dichroic mirror that would operate to direct, for example, $v_1$ towards detector 4909 and $v_2$ towards detector 4910 for measurement. The choice of the element for Box 4907 of course would depend on the configuration of the system and/or the type of entanglement being used to illuminate the target.

Element 4908 is a lens used to focus the photons onto detector 1 and detector 2. Box 4909 indicates spatially resolving detector 1. Spatially resolving detector 1 measures the time and spatial (x, y) location of one part of an entangled pair that has interacted with the remote scene, target or subject. Box 4910 indicates spatially resolving detector 2. Spatially resolving detector 2 measures time and spatial (x, y) location of the second part of an entangled pair that has interacted with the remote scene, target or subject. Detectors placed at multiple, diverse locations allow imaging from separate vantage points. One can also generate stereo views from different locations and composite imaging to provide a large field of view, increased depth, texture, and resolution of the region of interest. Furthermore, the measurements from separate sensors can be utilized for higher-order images of the region of interest.

Volumetric Ghost Imaging

A volumetric ghost image of a region of interest would be able to provide a 3D space filling representation of the region of interest that would not be degraded by the adverse effects of obscurants or turbulence. The 3D space filling representation could then be output to a 3D computer rendering system, 3D printer, or computer-numerical-control (CNC) device for visualization or for the generation of a physical model of the region of interest that was volumetrically ghost imaged. One could have a series of such volumetric images to form a 3D movie or a moving representation of the 3D volume.

Some exemplary detectors which may be used for the detector 1 and detector 2 include charge coupled devices (CCD), CMOS, SPAD arrays, quantum well, LIDAR, LADAR, video device, spatial sensor, light field (plenoptic) camera, gyro-stabilized camera, spatial phase sensitive camera, or range sensor.

Box 4911 indicates coincidence and timing electronics that operates to register when a pixel on detector 1 and a pixel on detector 2 occur inside within a user defined coincidence window $\Delta T_c$. A coincidence window is a time difference within which two photon measurements are defined to be co-incident. The timing electronics further operate to record the time that has elapsed since a user chosen laser pulse and the first coincidence pair detection for ranging calculations. Box 4912 indicates a processor, memory, and algorithms to generate enhanced average second-order images of the region of interest. Box 4913 indicates memory associated with processor 4912 to store input images, algorithms, intermediate computations, and enhanced second order images of the region of interest. Box 4914 indicates software operationally configured to perform the image improvement and enhancement processes. The processing corresponding to Box 4914 may include at least one of the inventive methods described, for example by FIGS. 40-41, to compute a second or higher order improved image of the target area. Box 4915 is a display operationally connected to processor 4912 to display the generated enhanced second-order or higher order image of the region of interest.

FIG. 50 presents a block diagram of an embodiment of a system for image improvement. Box 4901 indicates a distant target scene area. Box 4902 indicates the target which is an area of the distant target scene for the particular region of interest selected for improvement and enhancement. Box 4903 indicates optionally present turbulence or other obscuring or image degrading effects along photon path between light source and target, and light source and imaging system or photon measurement devices or components. Box 4904A is a first telescope (although other apparatus or direct viewing may be used without departing from the scope of the invention). Telescope 4904A may zoom in on or expand view of the selected region of interest, as well as zoom out. Used to transmit entangled photon pairs to the region of interest. Box 4904B is a second telescope (although other apparatus or direct viewing may be used without departing from the scope of the invention). Telescope 4904B may zoom in on or expand view of the selected region of interest. 4904B is configured to receive entangled photon pairs reflected or scattered from the region of interest. By providing separate first and second telescopes, it is possible to provide better results and independently control light transmitted and received.

Box 4906 is an entangled photon source. The entangled photon source generates entangled photon pair that are entangled in time-energy, H-V polarization or between other conjugate pair properties of the photons. Box 4907 is a polarizing beamsplitter, dichroic-mirror or other optical element that operates to direct one portion of an entangled photon pair towards spatially resolving detector 1 and directs the remaining portion of an entangled photon pair toward spatially resolving detector 2. Element 4908 is a lens used to focus the photons onto detector 1 and detector 2. Box 4909 indicates spatially resolving detector 1. Spatially resolving detector 1 measures the time and spatial (x, y) location of one part of an entangled pair that has interacted with the remote scene, target or subject. Box 4910 indicates spatially resolving detector 2. Spatially resolving detector 2 measures time and spatial (x, y) location of the second part of an entangled pair that has interacted with the remote scene, target or subject. Box 4911 indicates coincidence and timing electronics that operates to register when a pixel on detector 1 and a pixel on detector 2 occur inside within a user defined coincidence window $\Delta T_c$. A coincidence window is a time difference within which two photon measurements are defined to be co-incident. The timing electronics further operate to record the time that has elapsed since a user chosen laser pulse and the first coincidence pair detection for ranging calculations. Box 4912 indicates a processor, memory, and algorithms to generate enhanced average second-order images of the region of interest. Box 4913 indicates memory associated with processor 4912 to store input images, algorithms, intermediate computations, and enhanced second order images of the region of interest. Box 4914 indicates software operationally configured to perform the image improvement and enhancement processes. Box 4915 is a display operationally connected to processor 4912 to display the generated enhanced second-order or higher order image of the region of interest.

FIG. 51 presents a block diagram of an embodiment of a system for image improvement. Box 4901 indicates a distant target scene area. Box 4902 indicates the target which is an area of the distant target scene for the particular region of interest selected for improvement and enhancement. Box 4903 indicates optionally present turbulence or other obscuring or image degrading effects along photon path between light source and target, and light source and imaging system or photon measurement devices or components. 4904A is a telescope (although other apparatus or direct viewing may be used without departing from the scope of the invention). Telescope 4904A may zoom in on or expand view of the selected region of interest, as well as zoom out. It is used to transmit illuminating photons to the region of interest. Box 4904B is a second telescope (although other apparatus or direct viewing may be used without departing from the scope of the invention). Telescope 4904B may zoom in on or expand view of the selected region of interest. 4904B is configured to receive illuminating photons reflected or scattered from the region of interest. Box 4906A Illuminating photon source: The illuminating photon source generates photons with distinguishable properties such as two or more wavelengths, polarizations or entanglements of conjugate photon properties. Illuminating light may be from one or more light sources either natural or artificial, or both. Common sources of light include, for example, sunlight, coherent, incoherent, or partially coherent light, entangled photons, infrared radiation emitted by atoms and molecules, accelerating charges, lasers, light bulbs, light emitting diodes (LEDs), chaotic laser light, pseudo-thermal light generated by passing laser light through a rotating ground glass or other scattering material, stars, moons, clouds, planets, space objects, fluorescent lamps, electrical discharges, plasmas, bio-luminescence, and stimulated emission. The use of an illuminating source other than an entangled photon source could provide advantages when, for example, (a) a lower cost configuration is desirable or (b) for cases where there is no entangled photon source with the desired wavelength.

Box 4907 is a polarizing beamsplitter, dichroic-mirror or other optical element that operates to direct one portion of the photons with distinguishable properties towards spatially resolving detector 1 and directs the remaining portion of the photons with distinguishable properties toward spatially resolving detector 2. Element 4908 is a lens used to focus the photons onto detector 1 and detector 2. Box 4909 indicates spatially resolving detector 1. Spatially resolving detector 1 measures the time and spatial (x, y) location of one part of an entangled pair that has interacted with the remote scene, target or subject. Box 4910 indicates spatially resolving detector 2. Spatially resolving detector 2 measures time and spatial (x, y) location of the second part of an entangled pair that has interacted with the remote scene, target or subject. Box 4911A indicates image measurement, readout, and timing electronics that operates to read the measurements from detector 1 and detector 2. Box 4911A differs from Box 4911 in that Box 4911 includes a capability to register coincident measurements between pixels located on detectors 4909 and 4910. Coincidence electronics are typically more complex and expensive than usual timing electronics and are often only employed when a very high degree of precision in determining if two measurement events happened within a coincidence window $\Delta T_c$ is required.

The images from detector 1 and detector 2 are transferred to processor 4912. Box 4912 indicates a processor, memory, and algorithms to generate enhanced average second-order images of the region of interest. Box 4913 indicates memory associated with processor 4912 to store input images, algorithms, intermediate computations, and enhanced second order images of the region of interest. Box 4914 indicates software operationally configured to perform the image improvement and enhancement processes. Box 4915 is a display operationally connected to processor 4912 to display the generated enhanced second-order or higher order image of the region of interest.

Figure 52:
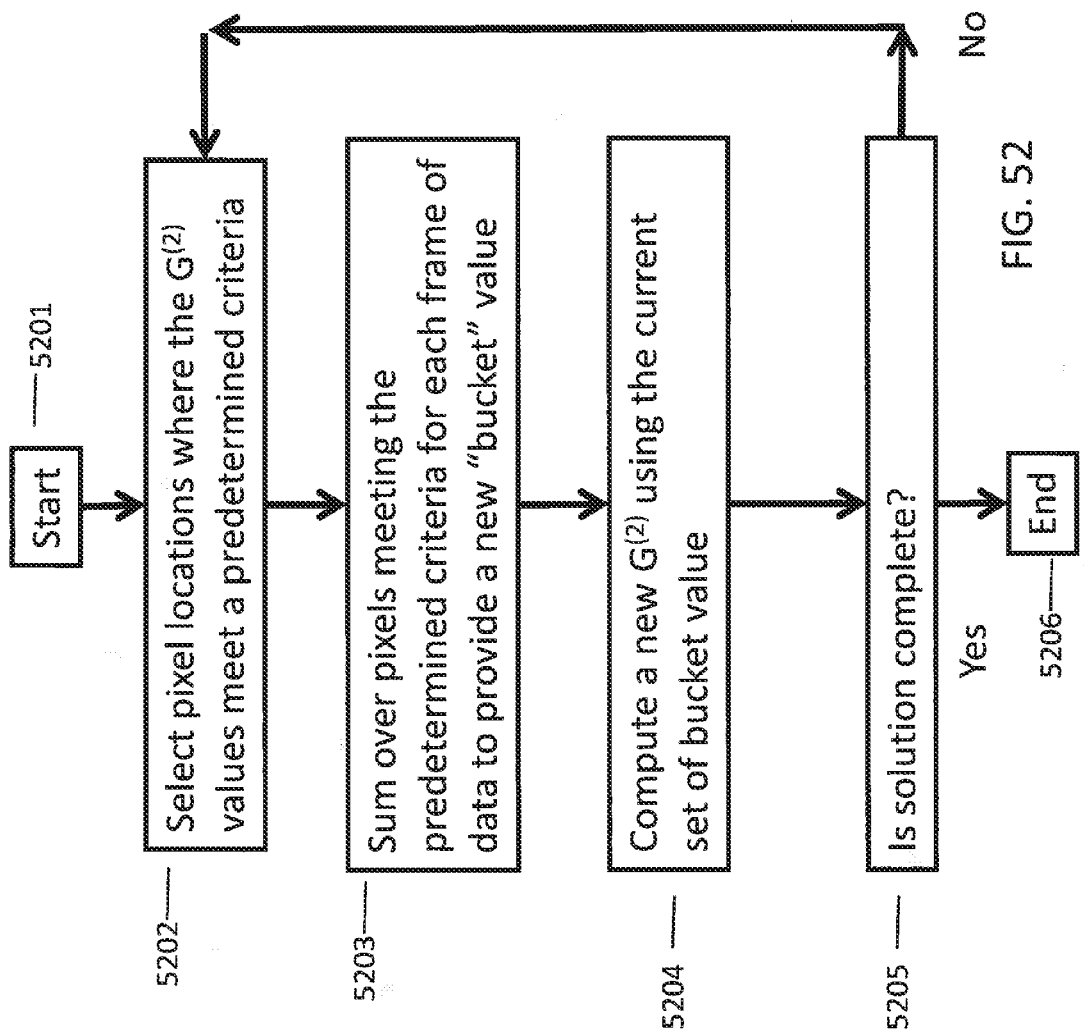
FIG. 52 is a schematic flow-chart diagram of an embodiment to perform an interactive process for image improvement.

FIG. 52 presents a flow chart block diagram describing a process to iteratively compute an improved image of the region of interest. Iterative methods can help generate a clearer image of a subject using fewer frames of measurements than would otherwise be needed and can further produce a higher contrast improved image of the region of interest.

Box 5201 accepts an initial $G^{(2)}$ image provided by, for example the processes described in FIGS. 40-41, and/or FIGS. 45-46. FIGS. 40-41 and FIGS. 45-46 are exemplary means to compute an initial $G^{(2)}$ image, in particular FIGS. 47 to 51 and 54 may use the methods described by FIGS. 40-41 and FIGS. 45-46 or other methods to compute the initial $G^{(2)}$ image. In Box 5202 pixel locations within the provided $G^{(2)}$ image are selected based upon a predetermined criteria such as those pixel locations where the value of the $G^{(2)}$ image is greater than 0. At least one pixel would need to be selected in Box 5202 to begin the iterative process. Should no pixels be selected this can be construed to mean that the $G^{(2)}$ image is already converged to an image where further iteration would provide no corresponding improvement or enhancement to the generated image. In 5203 the measured image intensities (first array values) at the selected pixel locations are summed to provide new "bucket" values, "over-all frame intensity values" or "normalized pixel intensity sum" values. In 5204 a new $G^{(2)}$ image is calculated using current computed "bucket" values. Box 5205 performs a determination as whether to complete the iteration process which may include, for example, testing all values of the new $G^{(2)}$ image being positive, or the pixels selected for the current "bucket" values have not changed from the previous pixel location selected, or the calculated using current computed "bucket" values or that the currently computed $G^{(2)}$ image has not changed significantly from the previous computed $G^{(2)}$ image, i.e. the maximum difference between the two images is less than 1e-6. If the test is true then the process proceeds to box 5206, otherwise if the test is false then the processes continues to box 5202. In Box 5206 the iteration process is complete and the computed $G^{(2)}$ image of the region of interest is available for storage or display.

Figure 53:
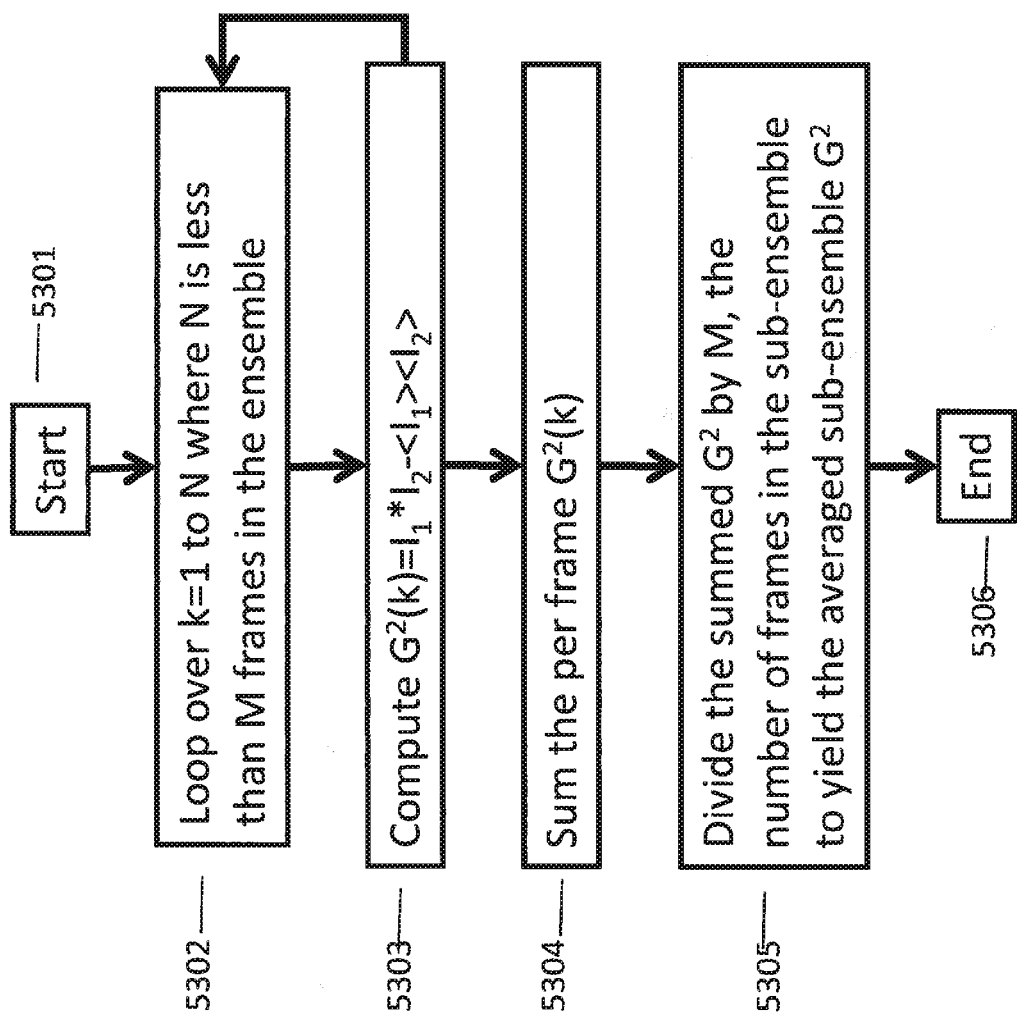
FIG. 53 is schematic block diagram of the inventive process where sub-ensembles are used to generate improved images of the region of interest.

FIG. 53 presents a flow-chart block diagram describing a process to use sub-ensembles to generate an improved image of the region of interest. A sub-ensemble process could be employed, for instance, to generate an improved image of a target that is a nearly instantaneous improved image of the target. In other instances, sub-ensemble may be used to generate an improved image of a moving subject as a "freeze frame" with significant background subtraction. Also, the sub-ensembled process can further provide an indication of where a moving target is going and/or where the moving target has been.

In Box 5301, a sequence of images taken of the region of interest are provided. Box 5302 is the start of the loop to compute per-frame new $G^{(2)}$ images for a set of M frames where M<N (the total number of frames in the input sequence of images). In Box 5303 calculate the per-frame $G^{(2)}$ image where $I_1$ is the measured pixel intensity of the kth frame. 12 is the overall frame intensity or "bucket" value of the kth frame. $<I_1>$ and $<I_2>$ are the overall averages of the measured pixel intensities and the overall average of the "bucket" values where the average is taken over all N frames in the input sequence of images. In Box 5304 the per-frame sub-ensemble $G^{(2)}$ images are summed over the M computed new $G^{(2)}$ images. Box 5305 divides the sum of the per-frame sub-ensemble new $G^{(2)}$ images by the number of frames used in the sub-ensemble (M) to generate a sub-ensemble improved image of the region of interest. Box 5306 ends the process and the computed sub-ensemble $G^{(2)}$ image of the region of interest is available for storage or display.

Figure 54:
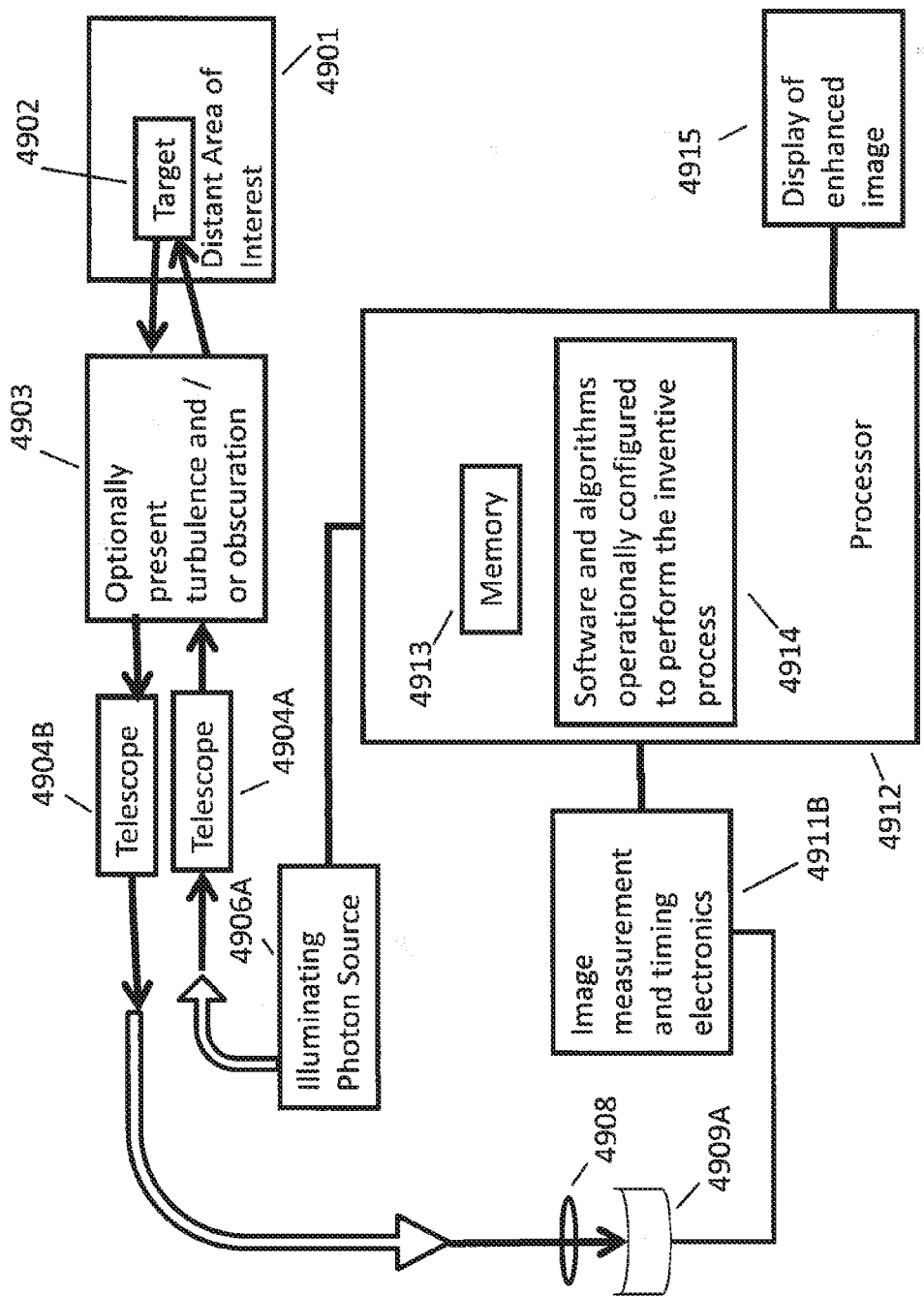
FIG. 54 is a block diagram of an embodiment of a system for image improvement.

FIG. 54 presents a block diagram of an embodiment of a system for image improvement. This system is somewhat analogous to those shown in FIG. 19A and FIG. 19B. The primary difference here, though, is the inclusion of active illumination components 4906A and 4906B. Examples of when a system of this configuration could be used would include but is not limited to cases when (a) the environmental, e.g. solar, lunar, etc, illumination is inadequate, (b) when a 3D time-of-flight ranged depth image of the distant target area is being generated, (c) when an image of particular colors of the distant target area is being generated, i.e. a wavelength dependent reflectance map, (d) when a particular fluorescence image of the distant target area is being generated, fluorescence of molecules/atoms is typically very specific to the wavelength of the illuminating light, (e) when a simpler possibly less expensive configuration is desirable, or (f) when a more compact configuration is required.

Box 4901 indicates a distant target scene area. Box 4902 indicates the target which is an area of the distant target scene for the particular region of interest selected for improvement and enhancement. Box 4903 indicates optionally present turbulence or other obscuring or image degrading effects along photon path between light source and target, and light source and imaging system or photon measurement devices or components. 4904A is a first telescope (although other apparatus or direct viewing may be used without departing from the scope of the invention). Telescope 4904A may zoom in on or expand view of the selected region of interest, as well as zoom out. Used to transmit illuminating photons to the region of interest. Box 4904B is a second telescope (although other apparatus or direct viewing may be used without departing from the scope of the invention). Telescope 4904B may zoom in on or expand view of the selected region of interest. 4904B is configured to receive illuminating photons reflected or scattered from the region of interest. Box 4906A Illuminating photon source. The illuminating photon source generates photons with distinguishable properties such as two or more wavelengths, polarizations or entanglements of conjugate photon properties. Element 4908 is a lens used to focus the photons onto detector 1. Box 4909A indicates spatially resolving detector 1. Spatially resolving detector 1 measures the time and spatial (x, y) location of one photons that have interacted with the remote scene, target or subject. Detector 1A may be able to resolve wavelengths (color) or polarizations, etc. Box 4911B indicates image measurement, readout, and timing electronics that operates to read the measurements from detector 1. The timing electronics further operate to record the time since a user chosen illumination pulse and the first photon detections for ranging calculations. The images from detector 1 are transferred to processor 4912. Box 4912 indicates a processor, memory, and algorithms to generate enhanced average second-order images of the region of interest. Box 4913 indicates memory associated with processor 4912 to store input images, algorithms, intermediate computations, and enhanced second order images of the region of interest. Box 4914 indicates software instructions for operationally configuring a processor to perform the image improvement and enhancement processes. Box 4915 is a display operationally connected to processor 4912 to display the generated enhanced second-order or higher order image of the region of interest.

$G^{(2)}$ type images may be calculated on a per-pixel basis by shifting the pixels in a frame of data, for instance if a frame of measured is $I_1(i, j, k)$ where i, j indicates a pixel location and k is the time or frame index, then $I_2$ can be set to be equal to a pixel shifted set of measured values $I_2(i, j, k)=I_1(i+1, j, k)$. Deviations of $I_1$ and $I_2$ from their respective ensemble averages can then be computed and the average of the products of those deviations $<\Delta I_1(i, j, k) \Delta I_2(i, j, k)>$ is a $G^{(2)}$ image computed from space or coordinate shifted pixels of the measured values. Other statistical quantities such as standard deviations may also be computed from the spatially shifted arrays.

The concept of time/frame shift of pixel values enhancement can be beneficial in identifying objects in a scene that are in motion. Shifting of pixel values can also occur between frames wherein, for instance, $I_2(i, j, k)=I_1(i, j, k+1)$. Deviations and averages of the products of those deviations can be computed to yield $G^{(2)}$ images of the area of interest.

Normalizations $G^{(2)}$ improved images can be normalized by dividing the improved $G^{(2)}$ image by, for example, the product of the standard deviations of the reference values and the bucket values or dividing by the product of the ensemble averages of the reference values and the bucket values. Other normalizations, i.e., $G^{(2)}/(\sigma(I_1)*\sigma(I_2))$ where $I_1$ and $I_2$ can be pixel values over time and $G^{(2)}/[(\sigma(I_1)*\sigma(I_2)*<I_1>*<I_2>)]$ Where $<>$ indicates an ensemble average and $\sigma$ indicates the standard deviation. $\sigma$ is typically computing using the following equation: $\sigma(1)=$ $$\left(\frac{1}{N}\sum_{l=1}^{N}(1-\langle I\rangle)^2\right)^{\frac{1}{2}}.$$

$G^{(2)}$ images can also be normalized by dividing by an all-positive $G^{(2)}$ to enhance image features. All positive $G^{(2)}$ images can also be normalized by dividing by $(\sigma(I_1)*\sigma(I_2)*<I_1>*<I_2>)$; this type of normalization on the all positive $G^{(2)}$ calculations is particularly lifelike. It is noted that $G^{(2)}$ images that are normalized by the product of the averages typically need to be colormap inverted, i.e. multiplied by −1, to recover realistic shading. $G^{(2)}$ images that are computed with a pixel shift process or the bucket process can be used to normalize the other calculation to highlight differences in the spatial or temporal scales of any distorting media between the measurement component and the area of interest.

Subensembles

Sub-ensembles (such as utilizing a portion of an full ensemble, e.g., 1000 frames) can be averaged subset blocks of $G^{(2)}/(\sigma(I_1)*\sigma(I_2)<I_1>*<I_2>)$, i.e., 10 blocks of 10 frames for frames 1 to 100. Examples of sub-ensemble $G^{(2)}$ s are as follows.

An example of a sub-ensemble used in a preferred method of the present invention comprises utilizing sum of $G^{(2)}$ per frame where $G^{(2)}(k)=I_1(k)*I_2(k)-<I_1><I_2>$ and the sum of the $G^{(2)}(k)$ over a set of i=1 to total number of frames in the ensemble is the improved image. A smaller subset of $G^{(2)}(k)$ can be summed over a sub-ensemble, k=1 to N where N is less than the total number of frames in the ensemble to provide an improved image. Note that the full set of measurements may be greater than the N being used for the current ensemble.

A further example of a sub-ensemble used in a preferred method of the present invention comprises a $G^{(2)}$ image that may be computed by summing and averaging per-frame $G^{(2)}$ images over a set of frames that is less than the total number of frames in the ensemble of measurements. A per frame $G^{(2)}$ would be $G^{(2)}(k)=I_1(k)*I_2(k)-<I_1><I_2>$ where the k indicates the frame number out of the ensemble of frames. $<I_1>$ and $<I_2>$ are the "reference" and "bucket" averages over the ensemble of measurements. When the $G^{(2)}(k)$ are summed and averaged over a set of frames that is less than the total number of frame this constitutes a sub-ensemble $G^{(2)}$ calculation. This sub-ensemble improved $G^{(2)}$ image can highlight different features of the area of interest and may further provide a means to generate improved image frames for a movie of the area of interest.

The movies produced by this method can separate scale of turbulence. Separate scales of turbulence can be better images by the ability to choose different sizes of an ensemble and different size sets within an ensemble to use as the sub-ensemble.

Iterative Improvement Techniques

An iterative means to calculate in improved $G^{(2)}$ image could involve progressively incorporating more or fewer pixels of the measured frames to be summed over for a bucket value. One such method would be to choose a single pixel location to provide the bucket values over all frames. A $G^{(2)}$ image would then be computed using those bucket values. A new set of bucket values would be selected based on some criteria, such as choosing pixel locations where the $G^{(2)}$ value is greater than 0. A new $G^{(2)}$ image is computed and the process iterated until no new pixels are being added to or removed from the set of pixels being used to provide bucket values. Criteria other than the positivity of the $G^{(2)}$ may be used to emphasize or converge to differing features in the $G^{(2)}$ image of the area of interest.

Iterative techniques may generally refer to methods wherein a sequence of operations is repeated to achieve a desired result. These types of methods sometimes have stopping criteria that are based on an estimated error parameter falling below some specified value. When this criterion is met the iteration is said to have "converged" to a solution. However, due to sometimes slow or erratic convergence a counter of the number of times the sequence of operations has been performed is often tracked. This number is sometimes called the iteration number. A further halting criterion beyond that of the iterative technique achieving the specified convergence is a maximum iteration number. This maximum iteration number criterion is desirable when computational operations must be completed within a specified time and to prevent so called "infinite loops" where the iterative technique is unable, due to round off or other error, to achieve the convergence criterion.

Area of Interest as an Imperfect Mirror

When an area of interest is illuminated by a source of photons such as for example, the Sun, laser, LED, etc, the illuminated area acts as an imperfect mirror of the illuminating source. A perfect mirror would acts to reflect the photons from the illuminating source where the angle of incidence would equal the angle of reflection. Furthermore, the perfect mirror would not absorb any of the incident photons. However, a region of interest may contain many differing scattering and absorbing elements. All of these elements are illuminated by the source and when the reflected and scattered photons from the region of interest are measured some information about the spatial distribution of photons of the light source is retained. It is this retained information of the spatial distribution of photons that enables a series of images measured with a single sensor of a region of interest to act much as a typical two sensor ghost imaging system wherein one of the sensors for a ghost imager measures only undisturbed spatial distributions of photons from the light source.

Figure 55:
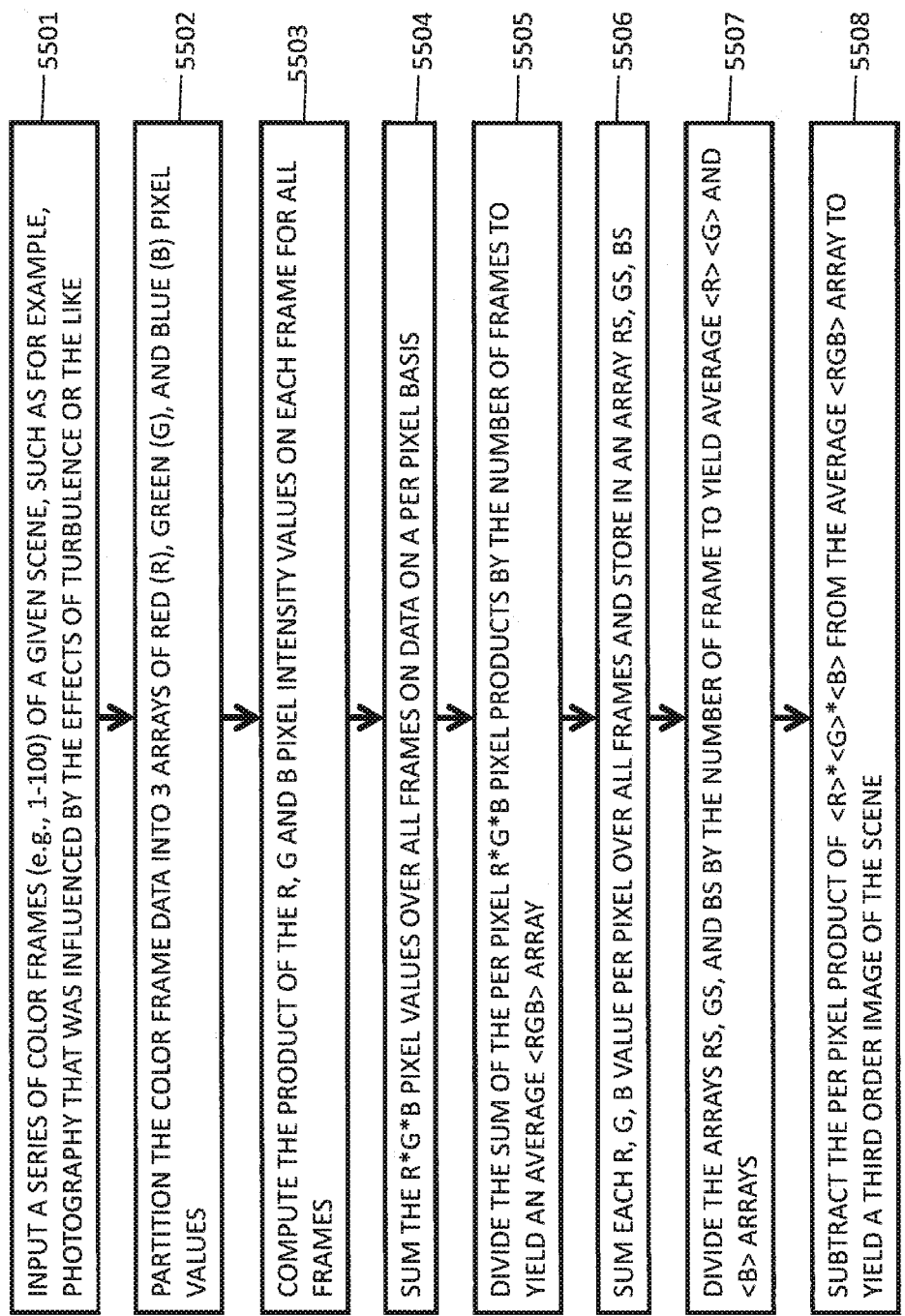
FIG. 55 is an exemplary 3rd order enhanced imaging method embodiment.

FIG. 55 shows an exemplary 3rd order enhanced imaging method embodiment. In step 5501, a series of color frames (e.g., 1-100) of a given scene, such as for example, photography that was influenced by the effect of turbulence or the like, is input. Next, in step 5502, the color frame data may be partitioned into arrays of red (R), green (G) and blue (B) pixel values according to the color scheme. The product of the R, G and B pixel intensity values, R*G*B, is computed on each frame for all frames in step 5503. In step 5504, the R*G*B pixel values are summed over all frames on data on a per pixel based. In step 5505, the sum of the per pixel R*G*B pixel products is divided by the number of frames to yield and average <RGB> array.

Next, in step 5506, each R, G, B value per pixel is summed over all frames and stored in an array, RS, GS, BS. The array RS, GS and BS are divided by the number of frames to yield average <R><G> and <B> arrays in step 5507. Finally, in step

5508, the per pixel product of <R>*<G>*<B> is subtracted from the average <RGB> array to yield a third order image of the scene.

Figure 56:
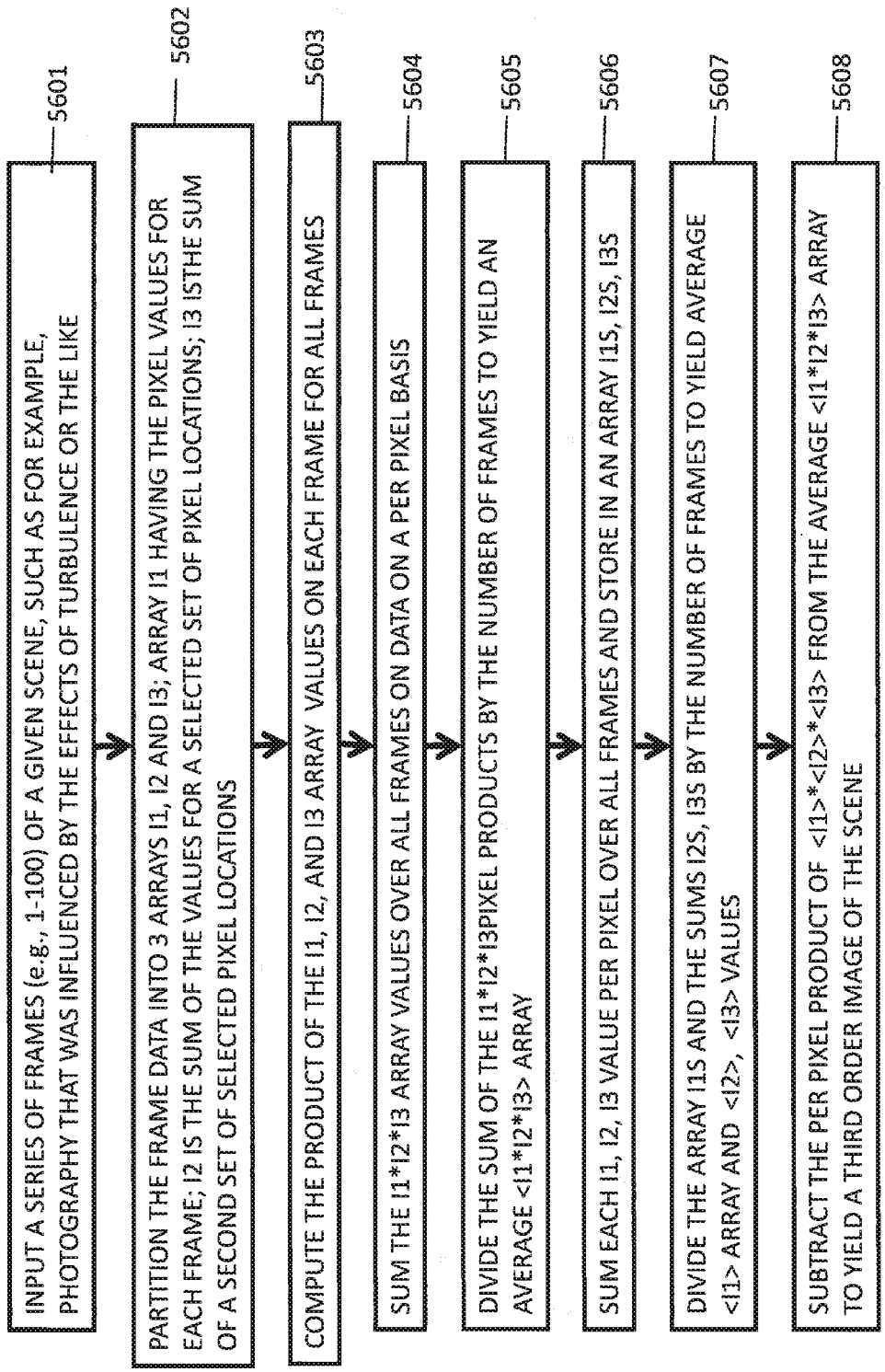
FIG. 56 is another exemplary 3rd order enhanced imaging method embodiment.

FIG. 56 shows another exemplary 3rd order enhanced imaging method embodiment. This is an exemplary embodiment for cases wherein monochrome or single wavelength band images are used. The second (I2) and third (I3) measurement values are taken, in this example, to be sums of selected pixel locations. In step 5601, a series of frames (e.g., 1-100) of a given scene, such as for example, photography that was influenced by the effect of turbulence or the like, is input. In step 5602, the frame data is partitioned into 3 arrays, I1, I2 and I3. I1 is an array having pixel values for each frame. I2 is the sum of the values for a selected set of pixel locations. I3 is the sum of a second set of selected pixel locations.

In step 5603, the product of the I1, I2 and I3 array values are computed on each frame for all frames. Next, in step 5604, the I1*I2*I3 array values are summed over all frames on data on a per pixel basis. In step 5605, the sum of the I1*I2*I3 pixel products is divided by the number of frames to yield an average <I1*I2*I3> array. In step 5606, each I1, I2 I3 value per pixel is summed over all frames and stored in an array, I1S, I2S, I3S.

In step 5607, the array I1S and the sums I2S, I3S are divided by the number of frames to yield average <I1> array and <I2>, <I3> values. Last, in step 5608, the per pixel product of <I1>*<I2>*<I3> is subtracted from the average <I1*I2*I3> array to yield a third order image of the scene.

Figure 57:
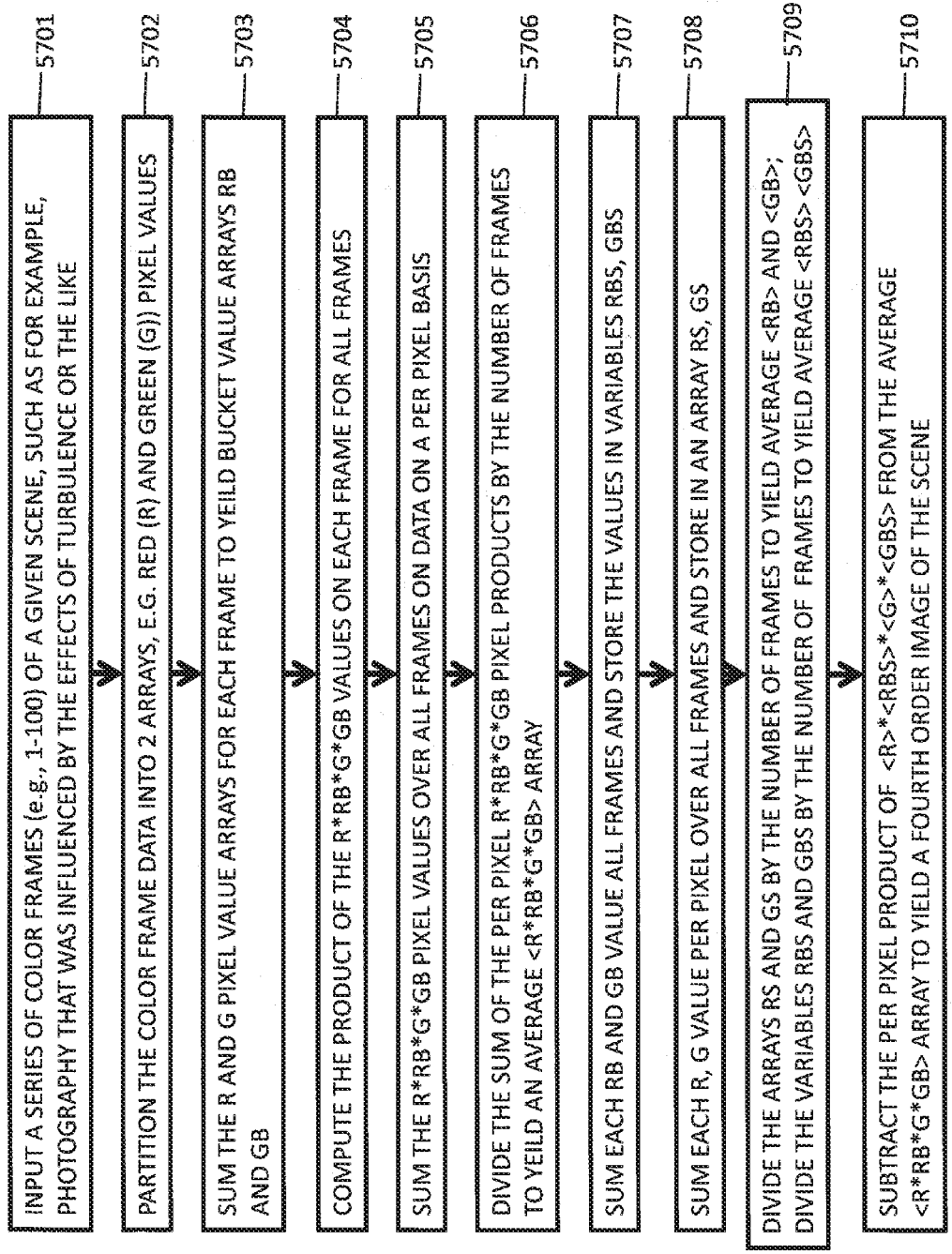
FIG. 57 is an exemplary $4^{th}$ order enhanced imaging method embodiment.

FIG. 57 shows an exemplary $4^{th}$ order enhanced imaging method embodiment. Fourth order enhanced imaging can allow for higher contrast improved images to be generated using fewer measured frames of data than $2^{nd}$ or $3^{rd}$ order enhanced imaging. In step 5701, a series of color frames (e.g., 1-100) of a given scene, such as for example, photography that was influenced by the effect of turbulence or the like, is input.

In step 5702, the color frame data is partitioned into 2 arrays, e.g., red (R) and green (G) pixel values. In step 5703, the R and G pixel value arrays are summed for each frame to yield bucket value arrays, RB and GB. In step 5704, the product of the R*RB*G*GB values are computed on each frame for all frames.

Continuing to step 5705, the R*RB*G*GB pixel values are summed over all frames on data on a per pixel basis. In step 5706, the sum of the per pixel R*RB*G*GB pixel products are divided by the number of frames to yield an average <R*RB*G*GB> array. In step 5707, each RB and GB values is summed for all frames and stored as variables RBS, GBS. In step 5708, each R, G value per pixel is summed over all frames and stored in an array, RS, GS.

Next, in step 5709, the arrays RS and GS are divided by the number of frames to yield average <RB> AND <GB>; and the variables RBS AND GBS are divided by the number of frames to yield average <RBS><GBS>.

Lastly, in step 5710, the per pixel product of <R>*<RBS*<G>*<GBS> is subtracted from the average array <R*RB*G*GB> to yield a fourth order image of the scene.

Figure 60:
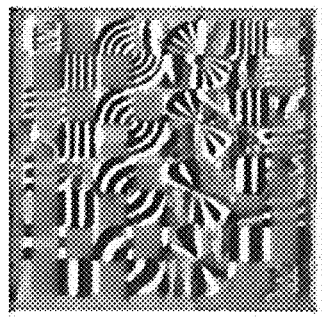
FIGS. 58-67 are various images for comparison sake in accordance with embodiments of the present invention.
Figure 63:
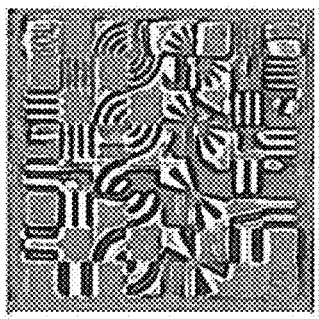
Figure 59:
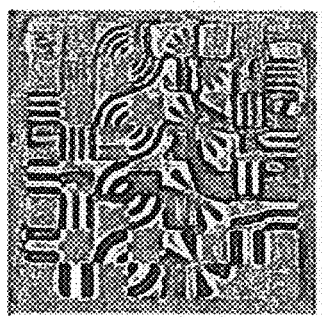
Figure 62:
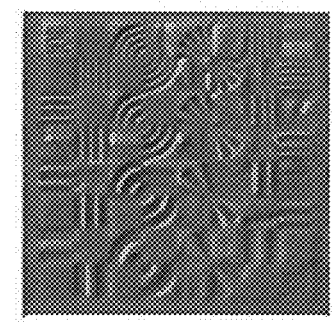
Figure 58:
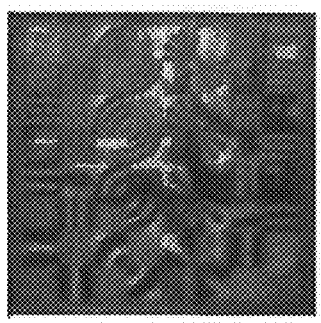
Figure 61:
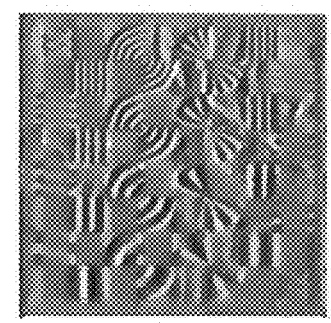

FIGS. 58-63 show various images for comparison sake in accordance with embodiments of the present invention. FIG. 58 shows an averaged image of a target area with data acquired in turbulent conditions viewed from 2.33 km away. FIG. 59 shows an image of the same target area produced using third order imaging of the method illustrated in FIG. 55, where $(\Delta I_1 * \Delta I_2 * \Delta I_3)/[\sigma(I_1)*\sigma(I_2)*\sigma(I_3)]$. FIG. 60 shows an image of the same target area produce using third order imaging of the method illustrated in FIG. 56 where <I*bucket(I(70,35))*bucket(I(30,312))>-<I><bucket(I(70,35))><bucket(I(30,312))>. FIGS. 61 and 62 are images produced using the bucket data used to produce the image in FIG. 60, in which FIG. 61 was produced where <I*bucket(I(70,35))*bucket(I(30,312))>-<I><bucket(I(70,35))><bucket(I(30,312))> and FIG. 62 was produced where <I*bucket(I(70,35))>-<I><bucket(I(70,35))>. FIG. 63 shows a shifted $G^{(2)}$ image produced where $\Delta I(+1,:)*\Delta I*\Delta I(:,-1)$.

Figure 64:
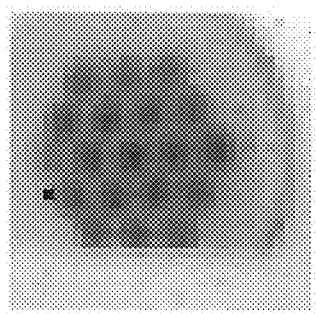
Figure 65:
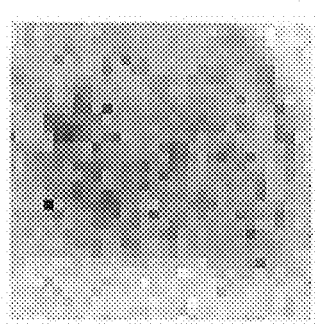
Figure 66:
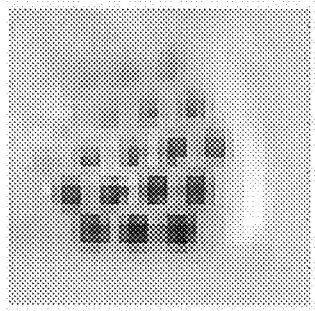
Figure 67:
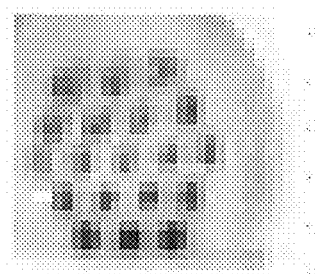

FIGS. 64-67 show various images for comparison sake in accordance with embodiments of the present invention. FIG. 64 shows an averaged image of sink drain with images measured through flowing water. FIG. 65 shows a sample single image of sink drain measured through flowing water. FIG. 66 shows a sample $G^{(2)}$ image of sink drain with images measured through flowing water. FIG. 67 shows a sample $G^{(2)}$ image normalized by products of standard deviations computed using pixel shifts of sink drain with images measured through flowing water.

Figure 68:
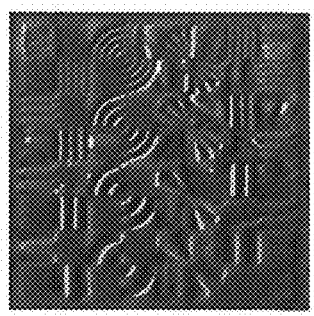
FIG. 68 is a sample all positive $G^{(3)}$ (R+++ conditional product term) image of a distant target.

FIG. 68 shows another exemplary $3^{rd}$ order enhanced imaging method embodiment result. The image displays the R+++ conditional product term. This is an exemplary embodiment for cases wherein monochrome or single wavelength band images are used. The second ($I_2$) and third ($I_3$) measurement values are taken, in this example, to be sums of selected pixel locations.

Figure 69:
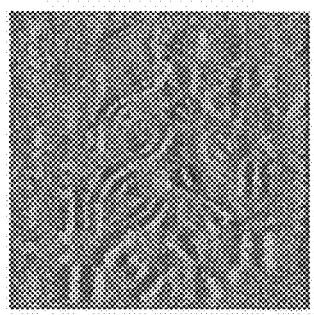
FIG. 69 is a sample $G^{(2)}$ image generated by shifting the pixels of the image shown in FIG. 70 by ten pixels and using as a bucket the pixel values located at (130,15).

FIG. 69 shows an exemplary $2^{nd}$ order image using 2 frames of data. The data in each frame was shifted by 10 pixels relative to each other and a $2^{nd}$ order enhanced imaging method was used to generate the displayed image. The displayed image indicates a degree of background suppression and emphasis of some features of the target.

Figure 70:
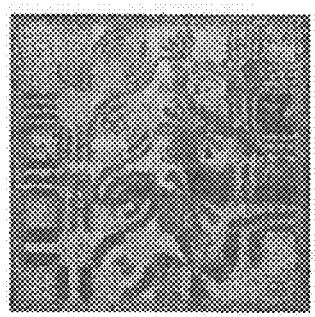
FIG. 70 is an image of the target area that was shifted by ten pixels.

FIG. 70 shows an image of the target that was shifted by ten pixels to demonstrate that apparent motion of a target helps enable emphasis of edges.

Figure 71:
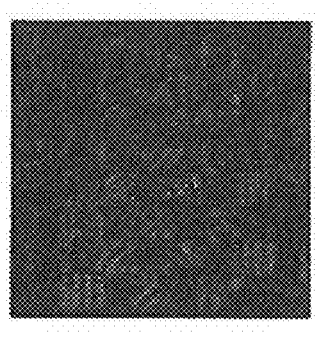
FIG. 71 is a sample all positive $2^{nd}$ order image generated using the same input as FIG. 69.

FIG. 71 shows an exemplary all positive $2^{nd}$ order image using 2 frames of data. The background and nearly constant intensity features in this figure are nearly fully suppressed and colored black. The bright lines are the edges of the target that have moved relative to each other in the two input frames of data. Note that the edges are emphasized to a greater degree than in FIG. 69.

First Entangled Photons

Entangled photons may be used to determine range or distance to a remote target. In one embodiment, a pair of entangled photons with nearly the same transverse momentum from an entangled photon source can be collinearly-propagated towards a remote target. The entangled photons may be directed towards specific areas on the remote target using a pointing and aiming device. The entangle photons that reflect off of a remote target can be measured by photon detectors. When the entangled photon source operates in a pulsed manner then an elapsed time from a particular pulse to the first entangled photon pair measurement that returns from target may be determined. The time that it takes from the pulsed source to the target and back to the photon detectors indicates the distance of the target from the entangled photon source and detector system. Since entangled photons may be recognized by consideration that the entangled photons are formed at virtually the same time and therefore if they take the same path they must arrive at the detectors at nearly the same time or in coincidence. An advantage of this type of coincidence measurement is that background noise from single photon measurements can be ignored and only detection measurements that happen in pairs within some small time interval will be used to provide a more accurate determination of distance to a remote target. Consider, for instance, the case where a single pulse of entangle photons is propagated and when the pulse contains more than one pair of entangled photons then several coincidences may be measured after reflecting off of the remote target. The first pair of entangled photons to be detected would be indicative of reflection of the entangled photons from a nearer target distance than later entangled photon measurements generated by the same pulse. The locus of target points indicated by the detection events would describe the shape and distance of the target from the setup comprising the entangled photon source and detectors. Photons that were received after the first entangled photons are indicative of photons that have traveled further than the nearest points of the target and may have been scattered by the environment or within the body of the target over a longer path before being measured. Scatterers in the environment may include the atmosphere, dust, fog, air pollution, etc. It should be appreciated that this process would apply to propagation in water, liquids, oceans, solids such as glass, and other media such as biological tissues.

In the non-collinearly propagating entangled photon case when the photons are directed towards a remote target then each photon of the pair likely will be reflected off of different areas of the remote target.

Two detectors can measure the photons in a small time interval, i.e. coincidence time window. One detector can act as a bucket detector and the other detector can determine the reference location of the measured photon. Thus the entangled photons can be used for ghost imaging, higher-order imaging, but also determine the distance of each measured pixel from the entangled photon source to the detectors setup. Of course, the timing must consider the path from the source to the target and back to the detectors.

The first entangled photon pair back may be calculated from the time of the pulse. One or more optical delays may be included to allow a longer path and thereby allow longer time delays to measure a coincidence event. Typical optical delays that may be used are for example, lenses, quartz rods, fiber-free space optical delay line, slow light media, or quantum memories.

Motion of Target in a $G^{(2)}$ Image

Ghost imaging, sometimes called higher order or $G^{(2)}$ imaging, may be used to identify the motion of objects within a region of interest. If the time period for forming a ghost imaging is too short then the motion cannot be detected in a single ghost imaging frame. A ghost imaging movie can be made by stringing together such a series of frames covering a time period over which an object is moving. This way, the object motion does not smear the ghost image but rather resolves each of the individual frames in the series. However, there is another way to indicate motion of an object within a region of interest via ghost imaging. If the object moves at least one pixel, a series of measurement frames are collected, then a ghost image using those frames may resolve the object. But signatures of the object motion will appear on the ghost image. In the case of the all-positive form for a ghost image using conditional products, $(R_{pp}+R_{nn}-(R_{np}+R_{pn}))$, then edges of the moving object can be distinguished by above background positive magnitudes. The ghost image made from positive and negative quadrants, $(R_{pp}+R_{nn}+(R_{np}+R_{pn}))$, will still visually appear as an improved image. The separate terms, $R_{pp}$, $R_{nn}$, $R_{np}$, $R_{pn}$, may have both edge and improved image qualities. It is to be noted that $G^{(2)}$ may take on both positive and negative values depending on location within the image. That is, some points will be positive or zero valued and other points will have negative values. The ghost images produced can still acquire the turbulence free ghost imaging properties even though the signs may change. That is the images will still be enhanced and improved over conventional images. A constant can be added to the ghost image to guarantee its positivity to satisfy certain rendering requirements. Thus, ghost imaging of moving objects has the benefit in that it can produce edge maps of the scene and indicate objects that are moving such as to separate them from stationary objects in the same region of interest. Such edge maps and identification of moving objects can be very useful for many human endeavors requiring such benefits that may include machine vision for robotics, intelligence-surveillance-reconnaissance, moving object pointing and tracking, medical imaging of moving organs, law enforcement, military situational awareness, documentation of flow lines of moving media, earthquake motion, or missile motion. For example, transmission of a single ghost image identifying moving objects in a scene is more efficient than transmitting a movie with many frames. As a further example the edge image generated by ghost imaging can be mapped to a 1 bit per pixel image where only those edges greater than some threshold are set to a value of 1 and all other pixels are set to zero to greatly increase transmission efficiency. Ghost imaging of the Earth from satellite or aircraft can indicate changes in terrain features and crop evolution. Ghost images of outer space from the Earth may indicate the outlines of moving satellites more clearly and distinguish them from background. Ghost imaging can also be applied to indicate the motion of underwater objects more clearly, or objects in moving media more clearly.

It must be appreciated that all-positive enhanced images for higher order, i.e. $G^{(3)}$, $G^{(4)}$, . . . , $G^{(N)}$, images can be calculated by combining the products of the higher order quadrant terms may be grouped such that an individual conditional product term ($R_m$) has a positive or a negative value. The all positive $G^{(N)}$ can then be determined by adding together those $R_m$ terms with positive values and subtracting the negative valued $R_m$ terms. In the following $R_m$ is shorted to R for ease is reading. For example an all positive $G^{(3)}$ would have $R^{+++}$, $R^{---}$, $R^{++-}$, $R^{+-+}$, $R^{-++}$, $R^{--+}$, $R^{-+-}$, $R^{+--}$, conditional product terms. The conditional product terms that have positive values are $R^{+++}$, $R^{--+}$, $R^{-+-}$ and, $R^{+--}$. The conditional terms with negative values are $R^{---}$, $R^{++-}$, $R^{+-+}$, and $R^{-++}$. So an all-positive $G^{(3)}$ would have the form $(R^{+++}+R^{--+}+R^{-+-}+R^{+--})-(R^{---}+R^{++-}+R^{+-+}+R^{-++})$. Similar groupings can be determined and used to calculate other all-positive $G^{(N)}$ enhanced images.

Figure 72:
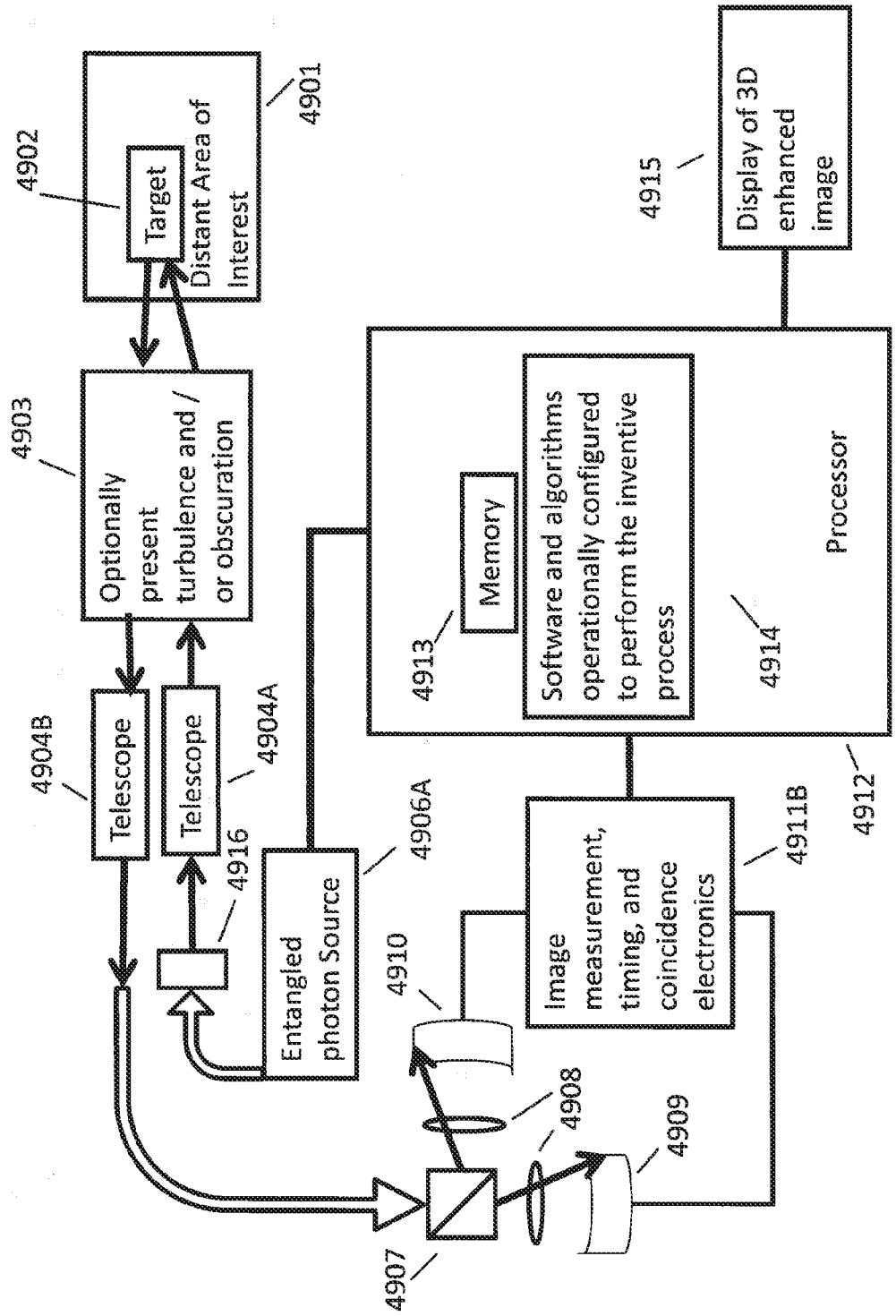
FIG. 72 is a block diagram for an alternate embodiment of a system for image and ranging improvement.

FIG. 72 presents a block diagram of an embodiment of a system for image and ranging improvement. Box 4901 indicates a distant target scene area. Box 4902 indicates the target which is an area of the distant target scene for the particular region of interest selected for improvement and enhancement. Box 4903 indicates optionally present turbulence or other obscuring or image degrading effects along photon path between light source and target, and light source and imaging system or photon measurement devices or components. Box 4904A is a first telescope (although other apparatus or direct viewing may be used without departing from the scope of the invention). Telescope 4904A may zoom in on or expand view of the selected region of interest, as well as zoom out. Used to transmit entangled photon pairs to the region of interest. Box 4904B is a second telescope (although other apparatus or direct viewing may be used without departing from the scope of the invention). Telescope 4904B may zoom in on or expand view of the selected region of interest. 4904B is configured to receive entangled photon pairs reflected or scattered from the region of interest. By providing separate first and second telescopes, it is possible to provide better results and control independently for light transmitted and received.

Box 4906 is an entangled photon source. The entangled photon source generates entangled photon pair that are entangled in time-energy, H-V polarization or between other conjugate pair properties of the photons. Box 4907 is a polarizing beamsplitter, dichroic-mirror or other optical element that operates to direct one portion of an entangled photon pair towards spatially resolving detector 1 and directs the remaining portion of an entangled photon pair toward spatially resolving detector 2. Element 4908 is a lens used to focus the photons onto detector 1 and detector 2. Box 4909 indicates spatially resolving detector 1. Spatially resolving detector 1 measures the time and spatial (x, y) location of one part of an entangled pair that has interacted with the remote scene, target or subject. Box 4910 indicates spatially resolving detector 2. Spatially resolving detector 2 measures time and spatial (x, y) location of the second part of an entangled pair that has interacted with the remote scene, target or subject. Box 4911C indicates coincidence and timing electronics that operates to register when a pixel on detector 1 and a pixel on detector 2 occur inside within a user defined coincidence window $\Delta T_c$. A coincidence window is a time difference within which two photon measurements are defined to be co-incident. The timing electronics further operate to record the time that has elapsed since a user chosen laser pulse and the first coincidence pair detection for ranging calculations. Box 4912 indicates a processor, memory, and algorithms to generate enhanced average second-order images of the region of interest. Box 4913 indicates memory associated with processor 4912 to store input images, algorithms, intermediate computations, and enhanced second order images of the region of interest. Box 4914 indicates software operationally configured to perform the image improvement and enhancement processes. Box 4915 is a display operationally connected to processor 4912 to display the generated enhanced second-order or higher order image of the region of interest. Box 4916 indicates optionally-present pointing and aiming (e.g., beam steering) components that may be used to direct the entangled photon pairs to a specific point within the region of interest.

Filtering may be used in various embodiments for enhanced image processing. The filtering processes can be performed electronically, digitally, computationally, or a combination thereof, for example, and may be performed at different stages of processing. In some embodiments, quantum filtering techniques may be employed, including Quantum computations on classic computers as discussed, for instance, in U.S. Pat. No. 7,353,148.

As an example, consider that detector 1 and detector 2 where each detector can measure photons. The measurements from the two detectors may be used to determine $G^{(2)}$ correlations of the measured photons. $G^{(2)}$ correlations appear when the photons are measured within a specified time interval of each other. The $G^{(2)}$ correlations can be used to generate enhanced images, as discussed above. As shown in FIGS. 73-77, filtering can further improve the enhanced images.

Figure 73:
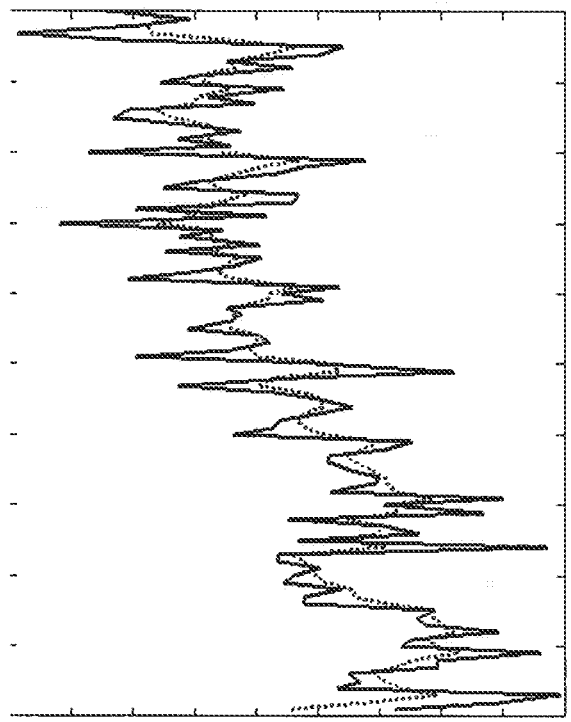
FIG. 73 is a comparison of filtered "bucket" values vs. time (dotted line) and unfiltered "bucket" values vs. time (solid line).

FIG. 73 shows a comparison of filtered "bucket" values vs. time (dotted line) and unfiltered "bucket" values vs. time (solid line). The "bucket" values represent intensity values, and generally will be proportional to photon counts. As will be appreciated, the dotted line has fewer extremes and is generally smoother than the solid line, thus illustrating the benefit of filtering. The filtering may be performed, for example, according to the methodology of FIG. 78 discussed below.

Figure 74:
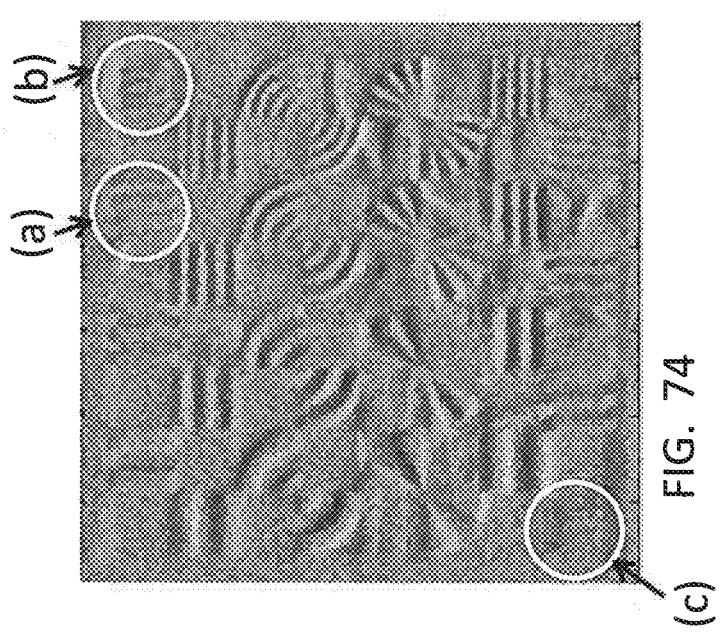
FIG. 74 is an example of results generated using seven frames with a filtering technique on the input measurements.

FIG. 74 shows an example of results generated using seven frames with a filtering technique on the input measurements. It is noted the visibility of the three vertical lines in (a), the letters "IOL" in (b) and in (c).

Figure 75:
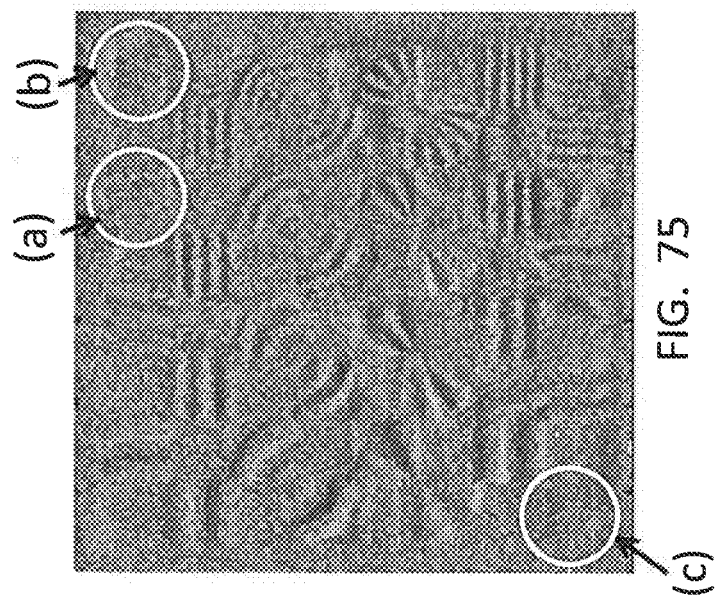
FIG. 75 is an example of results generated using the same seven frames of unfiltered input measurements.

FIG. 75 shows an example of results generated using the same seven frames of unfiltered input measurements. In comparison to FIGS. 74 (a), (b), and (c), it is noted that the three vertical lines and the "IOL" letters are unrecognizable.

Figure 76:
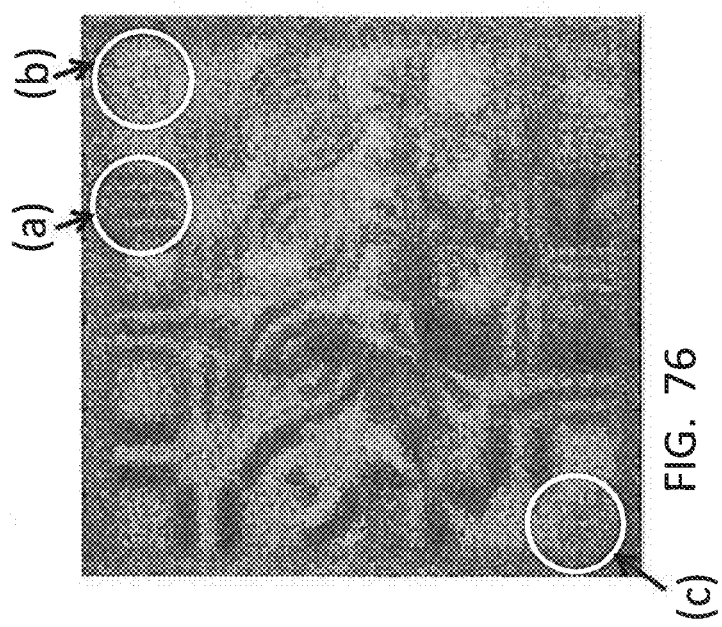
FIG. 76 is an example of the average image generated using a filtering technique on the input measurements.

FIG. 76 shows an example of the average image generated using a filtering technique on the input measurements.

Figure 77:
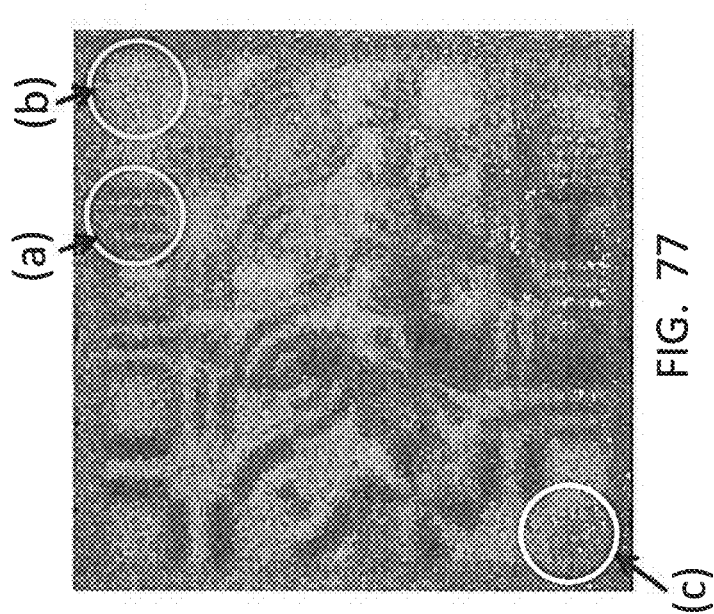
FIG. 77 is an example of the average image generated using unfiltered input measurements.

FIG. 77 shows an example of the average image generated using a unfiltered input measurements.

Figure 78:
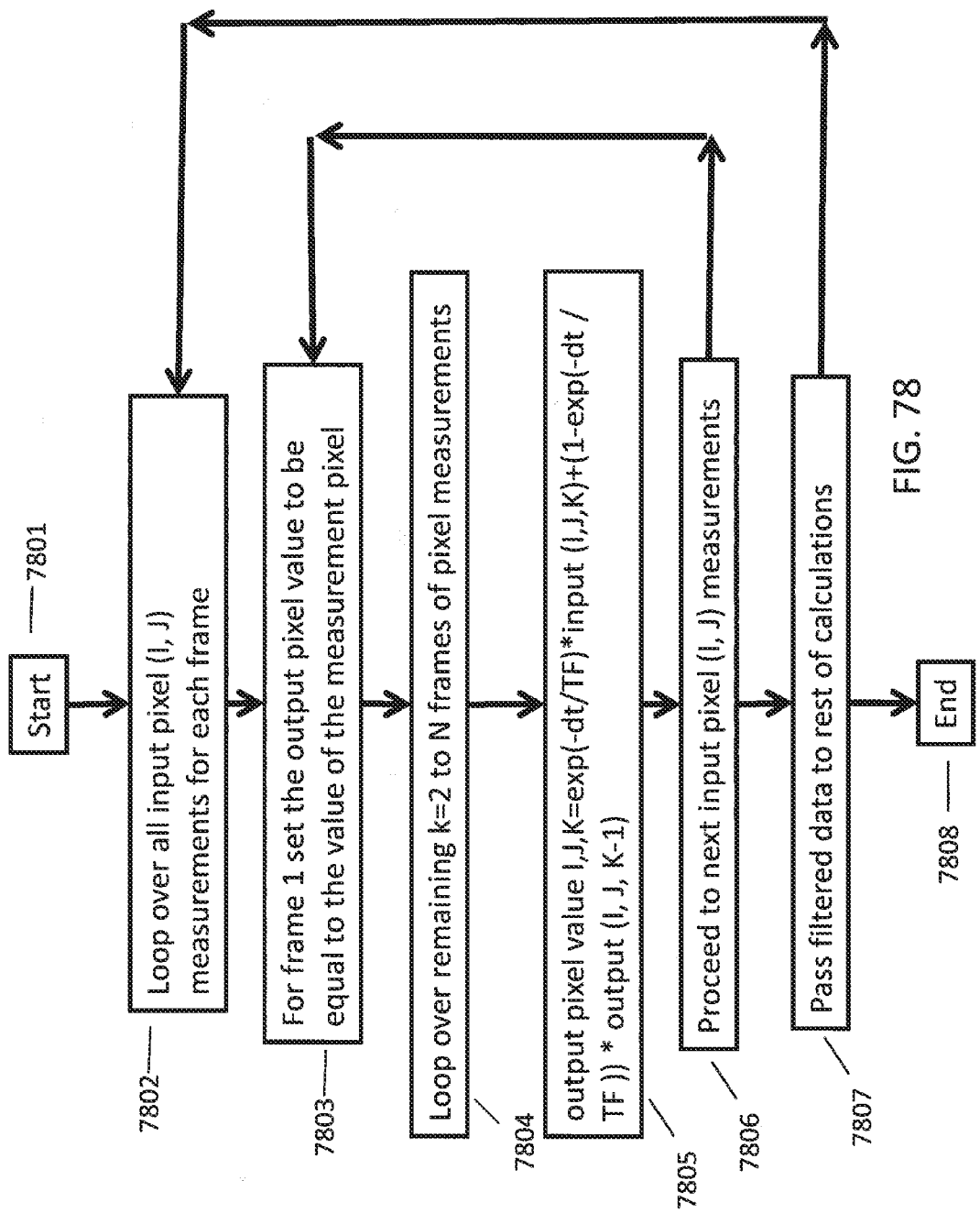
FIG. 78 is an exemplary embodiment of a filtering process used on measured input values.

FIG. 78 shows an exemplary embodiment of an exponential filtering process used on measured input values. At Box 7801 multiple frames of measured pixel values are available from an input component. At Box 7802 a loop over all input measurement locations I=1 to IMAX and J=1 to JMAX is started. In Box 7803 the first frame filtered pixel value is set to be equal to the first frame pixel value of the measured pixel input. At Box 7804 start a loop over the remaining K=2 to KMAX frames of measured pixel values. In Box 7805 the Kth frame filtered pixel value (I, J, K) is set to be equal to exp(−dt/TF)*measured pixel value (I,J,K)+(1−exp(−dt/TF))*Filtered pixel value (I, J, K−1). At Box 7806, the method proceeds to next input pixel (I, J) measurements. And at Box 7807, the filtered data is passed to the rest of calculations. At Box 7808, the filter process is completed and the filtered measurement values are available to be used in place of or along with the unfiltered measurement values to generate and improved image of the region of interest. It should be appreciated that other forms of filtering such as Chebyshev, Kalman, Fourier, etc., may be used in lieu of the exponential filter described here for illustrative purposes.

There may be situations, such as involving sunlight or incoherent light, in which the two detector measurements could be virtually uncorrelated. More particularly, the time-frequency properties of the detectors may be such that they do not resolve the $G^{(2)}$ correlations which would normally yield an enhanced image. These detectors measurements in these situations may not produce a readily appreciable image. But the inventors have found that, with filtering, these measurements can still nonetheless produce an enhanced image processing. Thus, in some embodiments filtering (i) the individual detector measurement events before determining the $G^{(2)}$ correlations, and/or (ii) during the determination of the joint coincidences, may yield enhanced images since the resolvable filtered components of the $G^{(2)}$ would be processed.

Entanglement Swapping

Entanglement swapping is a quantum process by which particles that are not entangled become entangled with each other. For example, consider that particles 1 (P1) and 2 (P2) are entangled with each other and that particles 3 (P3) and 4 (P4) are entangled with each other. To entangle P1 and P4, particles P2 and P3 are interfered on a beam splitter and then are measured. The interference and measurement swaps the entanglements P1-P2 and P3-P4 to P1-P4. Particles P2 and P3 are also affected by the measurement device and may be absorbed. The process of entanglement swapping has previously been verified. See, e.g., Bouwmeister et al. [Physical Review Letters 80, 3891-3894 May 1998] which described a process of entanglement swapping with experimental verification using entangled photons. Swapping may be considered as the teleportation of an unknown photon/particle state onto anther photon/particle.

The process of entanglement swapping has many potential applications in the development of quantum technology. Thus far, relatively few applications have found uses for entanglement swapping. Potential applications for entanglement swapping in quantum technology include quantum computing, quantum communications and, in the current invention, quantum imaging. There are potentially many benefits to using entanglement swapping for quantum imaging that have not yet been described or exploited. The reason for this is that entanglement swapping has required high precision in its implementation and great expense for equipment that achieves the high precision. The lack of robust applications for entanglement swapping has been another drawback to its implementation in technology. This technology is being miniaturized in solid state devices and some components are being tested on chips. These quantum chips, can generated entangled particles and perform interference operations and measurements of quantum states.

It would be beneficial to have an entanglement swapping application that is robust and can be implemented with both available and evolving technologies. One way to make entanglement swapping useful would be to apply it information transfer, sharing, or communication without the need for a classical communications channel. For example, the current Internet, radio, and telephone are generally considered to be classical communications channels. Another way to make entanglement swapping useful would be to be able to transfer, share or communicate by quantum means without the sender or receiver needing access to information or resources held by the other. For example, the sender having access to photons P2, P3 and the receiver having access to photons P1, P4 is sufficient to transfer information from sender to receiver. Repetition of this process allows the transfer of images without sending classical information and by only sharing entanglement. This type of communication of information, such as data and/or images, would be difficult to detect by an external observer since there would be no particle or radiation going between the sender and the receiver which an observer would be able to sense and follow. Military and domestic applications requiring stealth and/or security would benefit from this capability.

Benefits of entanglement swapping for quantum imaging may include performing an entanglement swap to optimize photon detection efficiency while simultaneously optimizing transmission properties from an illumination source to a target. Another benefit is that an entanglement swap may be used to measure absorption maps of a target without the need to measure reflected photons. Furthermore, entanglement swapping may be used to help compute the product of the absorption values at two locations on a target. Using the environment to enable entanglement swapping provides a direct and remote measurement on the environment. For example, absorption of photons by a remote target can be sensed by the enabling of quantum swapping of entangled particles which can be measured remotely without need for the return of photons from the target. It should be noted that besides images of absorption fields of targets any property can be imaged by enabling quantum swapping when the quantum particle is sensitive to the effects of object. Furthermore, with time sequencing this provides range information from, for example, the source of entangled quantum particles to target features. It should be further realized that the source or sources of the entangled quantum particles need not be located with the equipment used to direct particles towards a target (sender) or located with the equipment that measured those entangled particles that never directly interacted with the target (receiver). For example, the source or sources of the entangled particles may be on a satellite that would send the entangled particle pairs to the "sender" equipment and "receiver" equipment. Alternately, both the sender and receiver may have a single entangled quantum particle source and each shares one particle of their entangled particle pairs with the other. The identification of which particles are entangled with each other relative to initial entangled pair creation times may be achieved using an auxiliary time stamp, e.g. a laser pulse encoded with time information for each entangled photon pair created, that propagates with each particle of each entangled particle pair. Also, the use of an entanglement source such as the one described in FIG. 81 does not have an issue (or question) as to the identification of which particles are entangled as there is only a single source that sequentially generates entangled particles. Although not obvious, we consider it possible to use thermal light photon number fluctuations and their correlations and quantum illumination for variations of teleportation and swapping in our current inventions with swapping.

Further benefits of entanglement swapping applied to quantum imaging using measurements of reflected photons may include application to quantum imaging of remote targets and microscopy with the images being generated for the user at a distant location with entangled photons that did not interact directly with the target. The reflected photons may be further used to compute the product of reflectance or the product of reflected intensities of at least two locations on the target. Current imaging systems, such as cameras, are dependent on producing imaging using photons that have directly interacted with the target. The sharing of images taken by a camera normally requires communication by electromagnetic radiation that takes specific paths to communicate a facsimile of the image between sender and receiver. Even quantum teleportation requires a classical communication channel using electromagnetic radiation that takes specific paths to communicate. It would be beneficial to use entanglement swapping to communicate images or quantum images that does not require a classical communications channel to complete the transfer of images between a sender and a distant user at the receiver in order to avoid having the classical communications channel blocked which would also block image communication. Communication information transfer using entanglement swapping would be an entirely quantum process. The speed of quantum information has been recently been reported as being greater than or equal to $1.37*10^4$ times the speed of light See, J. Yin et al. [Physical Review Letters 110, 26047 June 2013]. The benefits of utilizing swapping in the process of quantum communications is that communications would be at the speed of the quantum information even if it is faster than the speed of light which can be beneficial for many applications.

Figure 79:
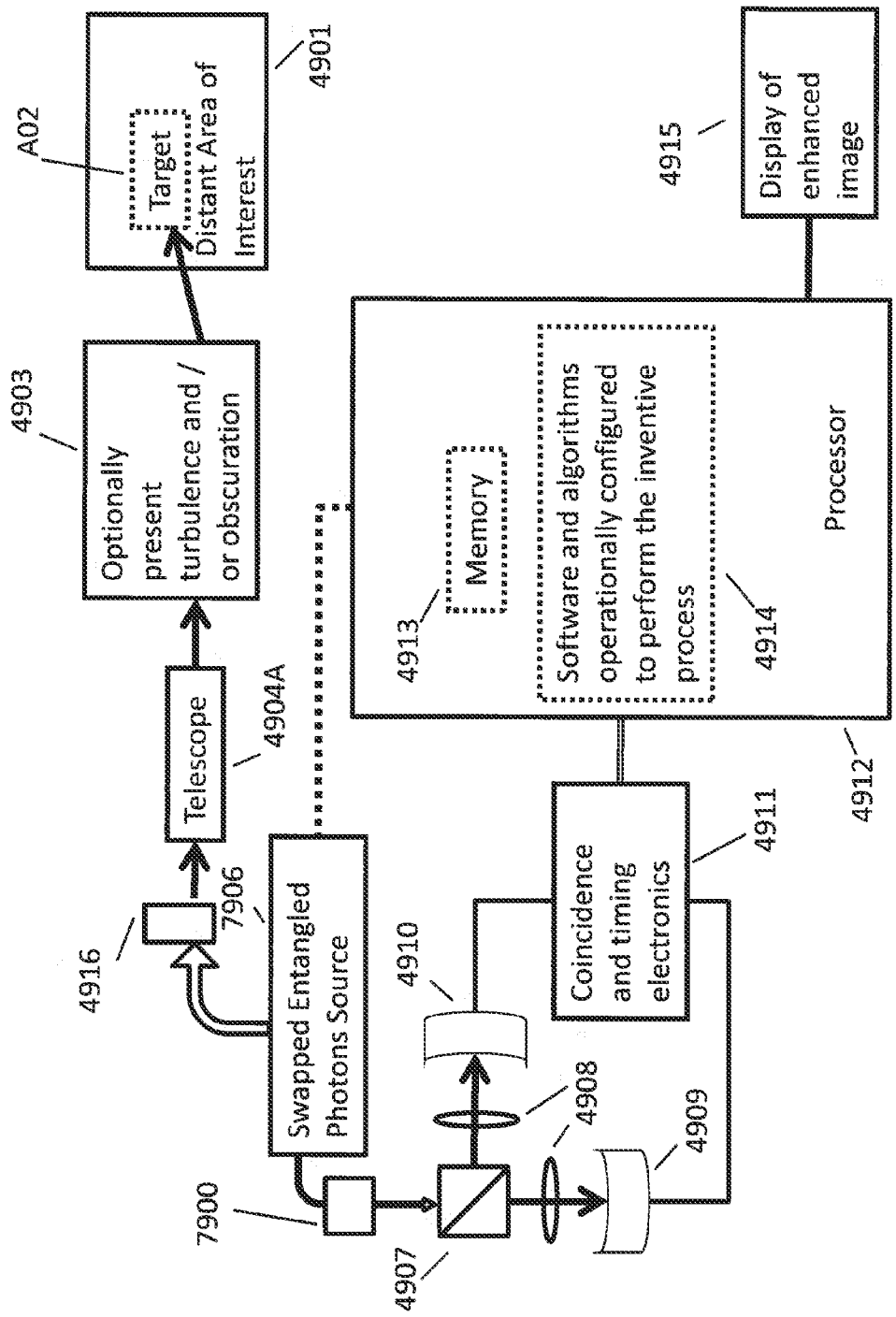
FIG. 79 is a block diagram for an embodiment of a system for image and ranging improvement which is configured to transmit entangled photon pairs to the region of interest.

FIG. 79 presents a block diagram of an embodiment of a system for image and ranging improvement. Box 4901 indicates a distant target scene area. Box 4902 indicates the target which is an area of the distant target scene for the particular region of interest selected for improvement and enhancement. Box 4903 indicates optionally present turbulence or other obscuring or image degrading effects along photon path between light source and target, and light source and imaging system or photon measurement devices or components. Box 4904A is a first telescope (although other apparatus or direct viewing may be used without departing from the scope of the invention). Telescope 4904A may zoom in on or expand view of the selected region of interest, as well as zoom out.

The system is specifically configured to transmit entangled photon pairs to the region of interest. Box 7906 is an entangled photon source, such as of the types further illustrated by FIGS. 80 and 81. The entangled photon source generates entangled photon pairs that are entangled in time-energy, H-V polarization or between other conjugate pair properties of the photons. Element 7900 is an optical delay line that introduces a time delay for particles reaching the measuring system. Box 4907 is a polarizing beamsplitter, dichroic-mirror or other optical element that operates to direct one portion of an entangled photon pair towards spatially resolving detector 1 and directs the remaining portion of an entangled photon pair toward spatially resolving detector 2. Boxes 4908 are lenses used to focus photons onto detector 1 and detector 2. Box 4909 indicates spatially resolving detector 1. Spatially resolving detector 1 measures the time and spatial (x, y) location of one part of an entangled pair that has interacted with the remote scene, target or subject. Box 4910 indicates spatially resolving detector 2. Spatially resolving detector 2 measures time and spatial (x, y) location of the second part of an entangled pair that has interacted with the remote scene, target or subject. Box 4911 indicates coincidence and timing electronics that operates to register when a pixel on detector 1 and a pixel on detector 2 occur inside within a user defined coincidence window $\Delta T_c$. A coincidence window is a time difference within which two photon measurements are defined to be coincident. The timing electronics further operate to record the time that has elapsed since a user chosen laser pulse and the first coincidence pair detection for ranging calculations. Box 4912 indicates a processor, memory, and algorithms to generate enhanced average second-order images of the region of interest. Box 4913 indicates memory associated with processor 4912 to store input images, algorithms, intermediate computations, and enhanced second order images of the region of interest. Box 4914 indicates software operationally configured to perform the image improvement and enhancement processes. Box 4915 is a display operationally connected to processor 4912 to display the generated enhanced second-order or higher order image of the region of interest. Box 4916 indicates optionally-present pointing and aiming (e.g., beam steering) components that may be used to direct the entangled photon pairs to a specific point within the region of interest.

Figure 80:
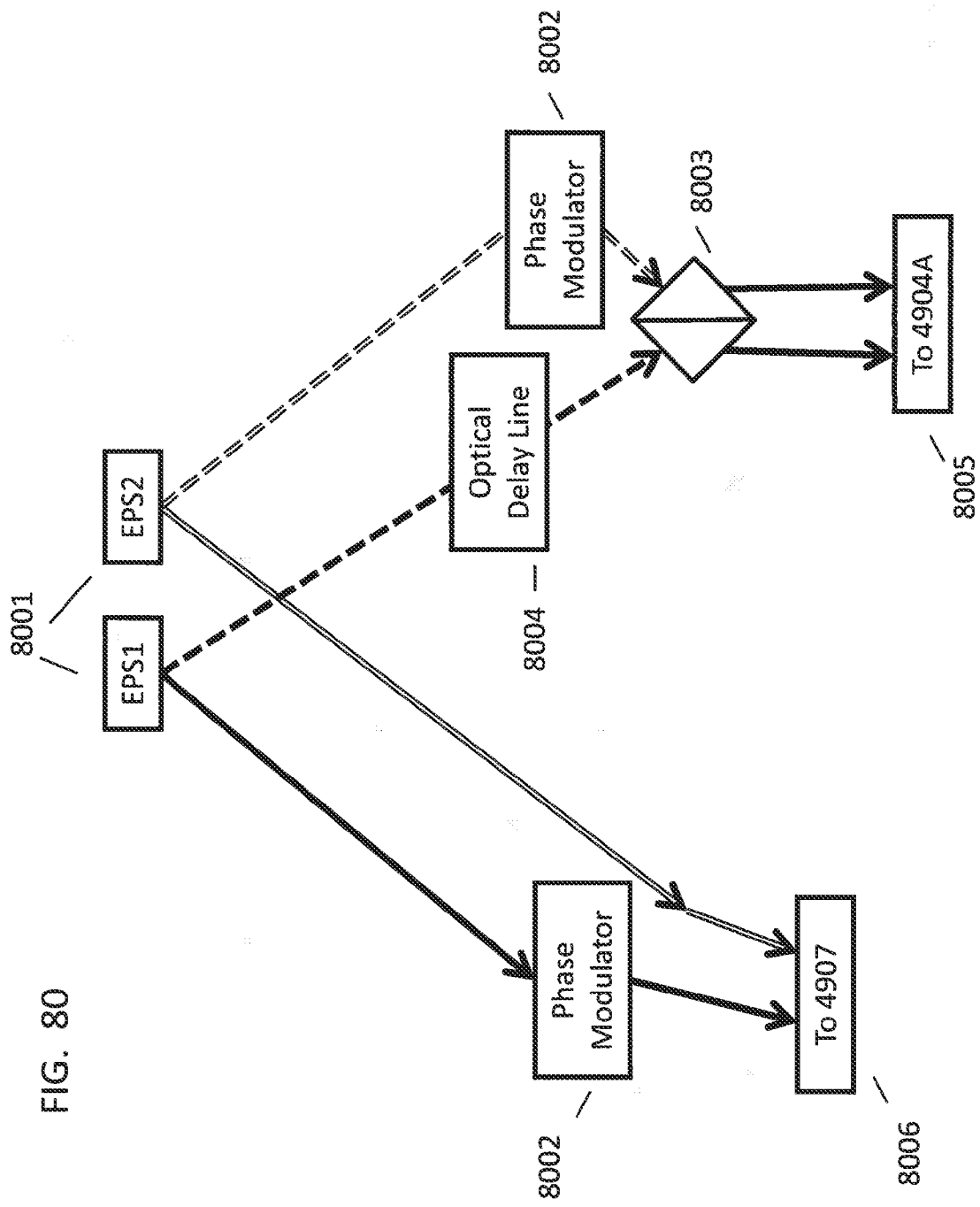
FIG. 80 is a schematic block diagram of an embodiment for the generation of related entangled photon pairs.

FIG. 80 shows an exemplary embodiment of an entangle photon source which may be used for Box 7906 FIG. 79. In particular, FIG. 80 presents an expanded view of one embodiment for the generation of entanglement swapped photon pairs. Element 8001 includes two entangled photon sources EPS1 and EPS2. Boxes 8002 are optionally present phase modulators operative to modify the phase relationship between the photon pairs generated by EPS1 and EPS2 respectively. Box 8003, for example, a beamsplitter, operates to interfere at least one photon of at least one entangled photon pair from EPS1 with at least one photon of at least one entangled photon pair from EPS2. Box 8004 is an optical delay line that operates to ensure photon overlap on beamsplitter 8003 for optimizing interference. Box 8005 indicates that the photon pairs that have interfered on element 8003 are directed towards telescope 4904A and then to target A02. Box 8006 indicates that the remaining photons from EPS1 and EPS2 are directed towards element 4907 and measurement devices 4909 and 4910.

Figure 81:
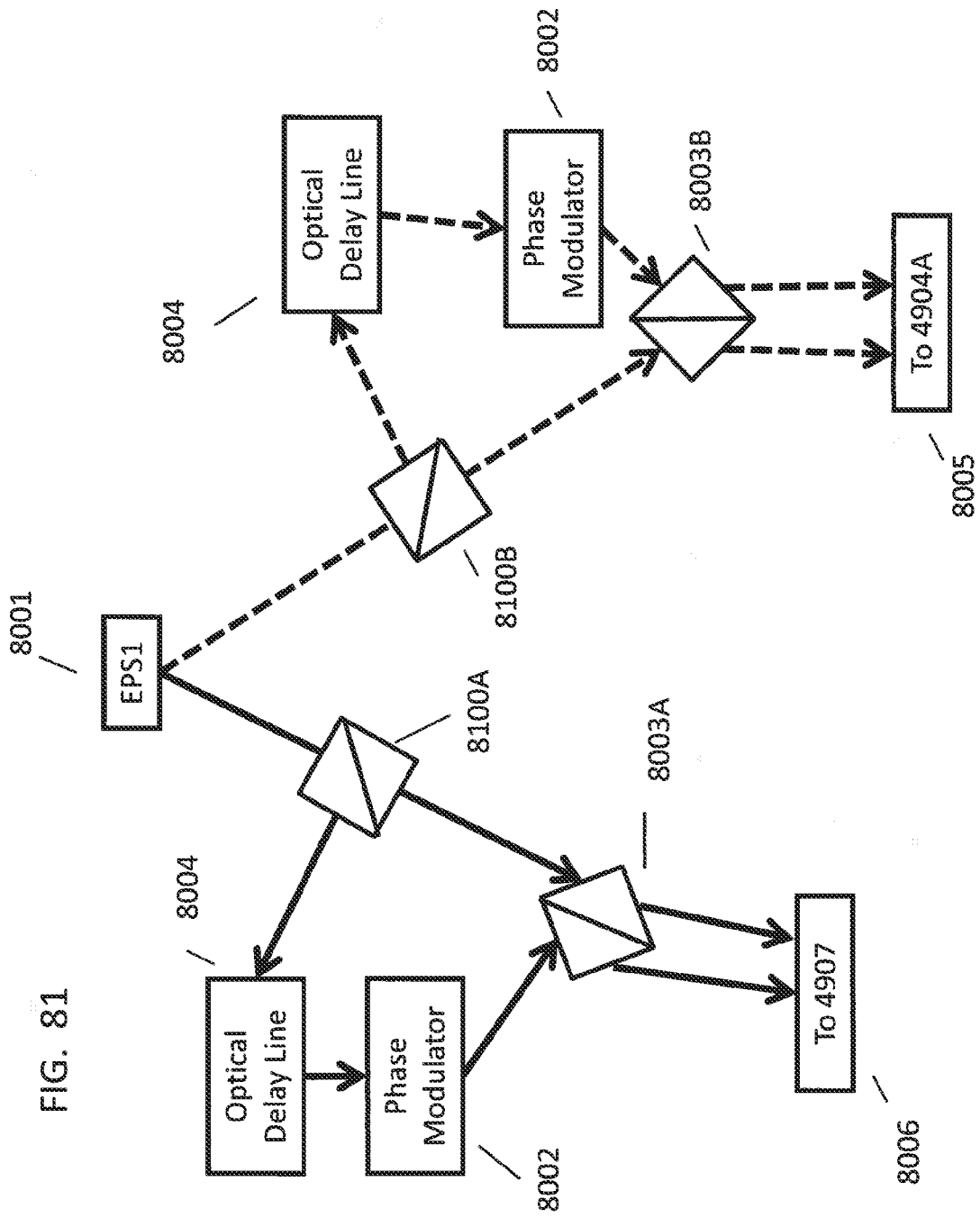
FIG. 81 is a schematic block diagram of an alternate embodiment for the generation of related entangled photon pairs.

FIG. 81 shows an alternate exemplary embodiment for the generation of entanglement swapped photon pairs which may be used for Box 7906 FIG. 79. Element 8001 (EPS1) is a source of entangled photon pairs. It may be configured to "pulse" photons in time. Boxes 8002 are optionally present phase modulators operative to modify the phase relationship between photon pairs generated at different times by EPS1. Boxes 8100A and 8100B, for example, a beamsplitter, operate to direct at least one photon of the entangled photon pair towards Boxes 8003A and 8003B, respectively. Element 8003 (8003A or 8003B), for example, a beamsplitter, operates to interfere at least one photon of at least one entangled photon pair from a first time from EPS1 with at least one photon of at least one entangled photon pair from a second time. Box 8004 is an optical delay line that operates to ensure photon overlap on element 8003 for optimizing interference. Box 8005 indicates that the photons that have interfered on element 8003 are directed towards telescope 4904A and then to target A02. Box 8006 indicates that first time-second time entangled photons from EPS1 are directed towards element 4907 and measurement devices 4909 and 4910. It is noted that the optical path lengths from Boxes 8100A/B to 8003A/B should be approximately an integer multiple of the time between entangled photon pulses generated by 8001 (EPS1), i.e. the time between entangled photon pair pulses is $\Delta t_p$ then the path length is approximately 1, 2, 3, . . . , n times delta $t_p$. Optical path lengths may be measured in terms of a distance L or time where the time is the length L divided by the speed of light in the media $c_m$.

Figure 82:
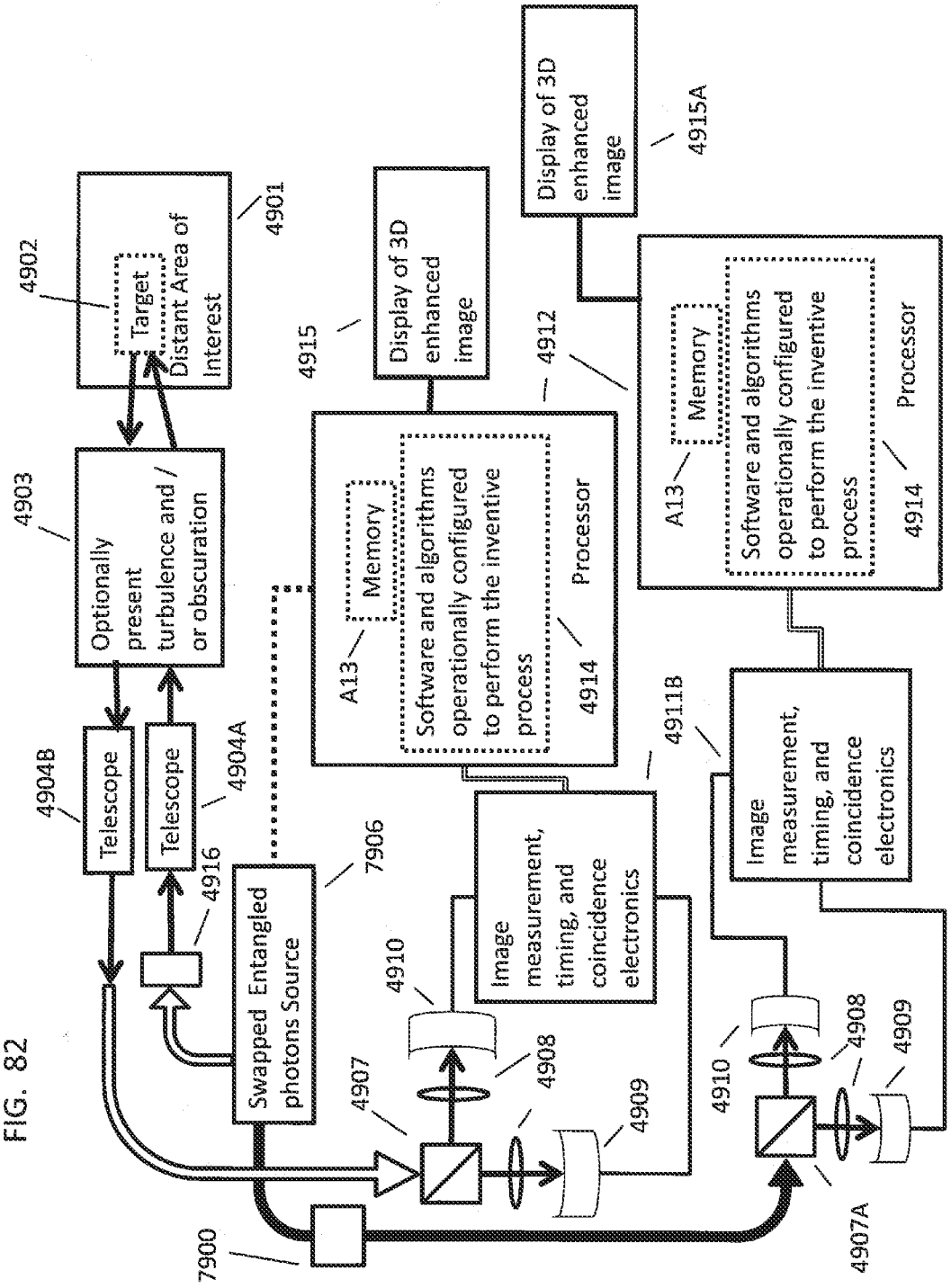
FIG. 82 is a schematic block diagram for an alternate embodiment of a system for image and ranging improvement.

FIG. 82 presents a block diagram of an alternate embodiment of a system for image and ranging improvement. Box 4901 indicates a distant target scene area. Box 4902 indicates the target which is an area of the distant target scene for the particular region of interest selected for improvement and enhancement. Box 4903 indicates optionally present turbulence or other obscuring or image degrading effects along photon path between light source and target, and light source and imaging system or photon measurement devices or components. Box 4904A is a first telescope (although other apparatus or direct viewing may be used without departing from the scope of the invention). Telescope 4904A may zoom in on or expand view of the selected region of interest, as well as zoom out. Used to transmit entangled photon pairs to the region of interest. Box 4904B is a second telescope (although other apparatus or direct viewing may be used without departing from the scope of the invention). Telescope 4904B may zoom in on or expand view of the selected region of interest. The telescope 4904B is configured to receive entangled photon pairs reflected or scattered from the region of interest. By providing separate first and second telescopes, it is possible to provide better results and control independently for light transmitted and received.

Box 7906 is an entangled photon source, such as of the types illustrated by FIGS. 80 and 81. The entangled photon source generates entangled photon pairs that are entangled in time-energy, H-V polarization or between other conjugate pair properties of the photons. Box 4907 is a polarizing beamsplitter, dichroic-mirror or other optical element that operates to direct one portion of an entangled photon pair towards spatially resolving detector 1 and directs the remaining portion of an entangled photon pair toward spatially resolving detector 2. Element 4908 is a lens used to focus the photons onto detector 1 and detector 2. Box 4909 indicates spatially resolving detector 1. Spatially resolving detector 1 measures the time and spatial (x, y) location of one part of an entangled pair that has interacted with the remote scene, target or subject. Box 4910 indicates spatially resolving detector 2. Spatially resolving detector 2 measures time and spatial (x, y) location of the second part of an entangled pair that has interacted with the remote scene, target or subject. Box 4911B indicates coincidence and timing electronics that operates to register when a pixel on detector 1 and a pixel on detector 2 occur inside within a user defined coincidence window $\Delta T_c$. A coincidence window is a time difference within which two photon measurements are defined to be co-incident. The timing electronics further operate to record the time that has elapsed since a user chosen laser pulse and the first coincidence pair detection for ranging calculations. Box 4912 indicates a processor, memory, and algorithms to generate enhanced average second-order images of the region of interest. Box 4913 indicates memory associated with processor 4912 to store input images, algorithms, intermediate computations, and enhanced second order images of the region of interest. Box 4914 indicates software operationally configured to perform the image improvement and enhancement processes. Box 4915 is a display operationally connected to processor 4912 to display the generated enhanced second-order or higher order image of the region of interest. Box 4916 indicates optionally-present pointing and aiming (e.g., beam steering) components that may be used to direct the entangled photon pairs to a specific point within the region of interest.

A second set of entangled photon pairs generated by 7906 are directed towards element 4907A. Element 7900 is an optical delay line that introduces a time delay for particles reaching the measuring system. Element 4907A is similar to 4907 and directs portions of the entering entangled photon pairs towards measurement devices 4909 and 4910. Coincidence measurements of the entangled photons directed to element 4907A are used to generate a reflection image of the target 4902 with information that is provided by the shared entanglement properties of the entangled photons that were directed from 7906 to telescope 4904A. It is to be appreciated that this invention will operate to generate an improved image of the target where the target may be partially absorbing and/or partially reflecting.

Potential Applications $G^{(2)}$ imaging in the infrared may be useful for applications in: art, medical imaging of blood vessels, identify and face recognition, imaging of blood vessels, medical imaging of blood vessel flow over the face and other parts of the body, and remote feature extraction.

A further application is terahertz ghost imaging. The methods and techniques of this invention apply to all electromagnetic wavelengths. Gamma rays, ultraviolet, visible, infrared, microwave, and radio waves and terahertz radiation can be utilized to produce improved images of a region of interest.

The potential extent of possible use of this invention is described in the following. However, this description should not be construed as limited to the statements. Potential applications include high resolution imaging, remote sensing, microscopic sensing, phase-contrast imaging or microscopy, astronomical imaging, physics, chemistry, biology, medical applications, quality control, surveillance, surface tampering detection, imaging partially occluded scenes, spectroscopy, raman spectroscopy, satellite imaging, detection of exoplanets, identification of hidden or concealed objects, remote biometrics, design of new sensors and image processing methods, design of new types of stealth technology, design of new types of communications devices. Furthermore, the methods and techniques can be used to determine characteristics of imaging sensors and discover favorable or unfavorable artifacts and properties including but not limited to spatial and temporal noise.

Speed Traffic Enforcement—Current local governments use traffic enforcement cameras to enforce traffic regulation violations. A traffic enforcement camera (also road safety camera, road rule camera, photo radar, speed camera, Gatso™) is an automated ticketing machine. It may include a camera which may be mounted besides, on, or over a highway or installed in an enforcement vehicle to detect traffic regulation violations, including speeding, vehicles going through a red traffic light, unauthorized use of a bus lane, for recording vehicles inside a congestion charge area and others. The latest automatic number plate recognition (ANPR) systems can be used for the detection of average speeds and use optical character recognition on images to read the license plates on vehicles. There are a number of possible factors that affect the ANPR software performance. One of these important factors is poor image resolution, usually because the plate is too far away but sometimes resulting from the use of a low-quality camera. In the case of camera recording a video (a sequence of images), this invention can process the recorded images to improve image quality of the license plate on vehicle. The enhanced license plate images are used to improve the performance of ANPR software. The invention is especially useful when the images are acquired from a far away distance and/or from a low-quality camera.

The invention may be utilized in conjunction with large crowd event security and management. Events involving a large crowd, especially the types of events including circuses, sporting events, theatrical events, concerts, rallies, parades, etc., the security task is to prevent, where possible, crimes including theft, vandalism or assault through the deployment of trained and licensed security personnel. Camera monitoring is an important component in this type of event security and management. The invention can be used to improve image details of a human face, nomenclature on a jersey, or a moving object/vehicle, etc., from a distance, or from the periphery of the event location. Also at football games, a preferred embodiment could be used to enhance the readability of numbers and/or names on football uniforms.

As used herein, the terminology "subject" means: an area, a scene, an object or objects, a landscape, overhead view of land or an object or objects, or a combination thereof.

As used herein, the terminology "frame" means: a picture, an image or one of the successive pictures on a strip of film or video.

As used herein, the terminology "process" means an algorithm, software, subroutine, computer program, or methodology.

As used herein, the terminology "algorithm" means: sequence of steps using computer software, process, software, subroutine, computer program, or methodology.

As used herein, the terminology "image sensor" means: a camera, bucket detector, CMOS, SPAD, quantum well, LIDAR, LADAR, charge coupled device (CCD), video device, spatial sensor, light field (plenoptic) camera, gyro-stabilized camera, spatial phase sensitive camera, or range sensor. The image sensor may comprise a device having a shutter controlled aperture that, when opened, admits light enabling an object to be focused, usually by means of a lens, onto a surface, thereby producing a photographic image OR a device in which the picture is formed before it is changed into electric impulses.

The terminology "camera" as used in the following claims includes devices which measure intensity of photons to produce images. Cameras which can take a series of images may be termed video cameras. Many individual cameras have circuitry to allow the capture and storage of video sequences and hence are called video cameras. Cameras are often embedded or attached to computers or smart/cell phones or other types of phones. Cameras may be sensitive to one or more wavelengths of light. Color cameras are sensitive to more than one wavelength band of light and can distinguish between those wavelength bands. For example, color cameras may sense red, green, and blue at separate pixels. Color cameras may use a Bayer pattern for collection of more than one wavelength band and use methods for Bayer interpolation to provide intensity for each wavelength band at each pixel. Digital cameras are readily interfaced to digital computers.

Analog cameras need analog-to-digital (A/D) circuitry to transfer images from the camera to a digital computer processor. For example, a digital camera is a device used for measuring images of a region of interest. Some digital cameras such as charged coupled devices (CCDs) have an advantage of being able to achieve low image noise especially when cooled. High quality CCDs may have an electronic cooling capability to lower image noise. CCD cameras may have readout or processing noise. CMOS cameras also called complementary metal oxide cameras. CMOS cameras may have an advantage of lower cost and may have lower readout noise but may have higher image noise. CMOS cameras can also be cooled to achieve improved properties. Analog cameras have been used in television industry and may have advantages where digital cameras should not be used. For example, analog cameras may be less susceptible to digital computer viruses. Analog cameras may already be used as sensors in a wide variety of applications. Analog cameras may be made using photo-diodes. Photo-diodes measure single or multiple photons and in general the total intensity of light falling on the diode. Photo-diodes have a small or large active area which allows them to be used as point or area detectors such as photon bucket detectors. Plenoptic cameras utilize an alternate means to record information of a scene or region of interest than conventional cameras. Plenoptic cameras record light coming into the camera through more than one lens. The measurements are saved in a manner that can be combined to achieve refocusing of the image after the measurements are made. As plenoptic cameras improve, they will be able to store measured light with higher resolution and speed.

The terminology "SPAD" as used in the following claims means Single Photon Avalanche Diode. SPAD arrays can be used to form an image of an area of interest in terms of single photon counts for a specified period of time at each SPAD location. Currently SPADs can operate in the nano-seconds and pico-seconds but it is expected that their speeds may improve even further. Since SPADs can be individually addressed with electronic logic they may be suitable for a wide variety of multi-photon interference applications such as for producing enhanced images in cases with and without obscurants and/or turbulence. SPADs are becoming more common because the technology is advancing to lower the cost of SPAD arrays. SPADs may also be coupled with illumination timing circuits such as laser triggers to be able to measure time-of-flight for an emitted laser pulse to travel to a target and return to a particular SPAD pixel. Thus each pixel of a SPAD array in this case can be used to represent a distance or depth map between the SPAD sensor and a corresponding location on a target in the region of interest. Such a distance or depth map would indicate not only the intensity of light reflected and returned but also the distance to the target at each corresponding point.

The terminology "LIDAR" as used in the following claims means Light Detection and Ranging. LIDAR devices use lasers to measure distances to an object. Often LIDARs are pulsed but they may alternatively be modulated in periodic or aperiodic ways in order to determine distance such as by use of phase modulation. LIDARs may be scanned to produce an image and range map also giving depth and 3D information of the target in the region of interest.

The terminology "LADAR" as used in the following claims means Laser Radar which produces an image or a map of objects at a distance from the laser source. LADARs may use scanning or "flash" methods. Flash methods are distinguished from scanning methods in that a larger region of target is illuminated at nearly the same time. Whereas a single laser beam scan illuminates different parts of the target at sequential times. However, arrays of lasers may also be used to illuminate different parts of a target at approximately the same time. Each laser when used in combination with a synchronized sensor produces a distance to the target in addition to a strength of intensity return.

The terminology "display device" as used in the following claims include a display capable of rendering a display. These ways may include rendering on a screen, cathode ray tube (CRT), glasses, liquid crystal diodes (LCDs), light emitting diode (LED) arrays, plasma screens, projectors projecting onto a surface, or even to the eyes. Modern televisions (TVs), sometimes called smart TVs, not only render images for viewing but also render the images into other formats which may be interfaced to other imaging, multi-media, computing, or recording devices such as digital video recorders (DVRs), through free-space (e.g. WiFi or Bluetooth), electrical wiring, and optical fiber.

The terminology "processor" or "image processor" as used in the following claims includes a computer, multiprocessor, CPU, GPU, FPGA, minicomputer, microprocessor or any machine similar to a computer or processor which is capable of processing algorithms.

The terminology "operations" as used in the following claims includes steps, a series of operations, actions, processes, subprocesses, acts, functions, and/or subroutines.

As used herein the terminology "succession" means the act or process of following in order or sequence, but is not limited to sequential order. As used herein the terminology "succession" refers to a later taken image being compared with an earlier taken image.

As used herein the terminology "array" refers to a systematic arrangement of data in rows and columns. An example of an array is a matrix which is a rectangular array of numbers, symbols, or expressions. Examples of arrays include a matrix which is a rectangular array of numbers, symbols, or expressions and a vector which is a linear array of numbers, symbols or expressions.

As used herein, the terminology "phase" refers to a property of waves that measures the advance of one wave relative to another wave or that wave at an earlier place in space-time. Quantum particles such as photons having some wave properties may exhibit phase properties. Phase differences may be manifest as interference or diffraction fringes. Since images are the result of interaction of quantum particles with reflective or scattering objects they can exhibit interference fringes as signatures of instantaneous or average phase variations. Often objects that exhibit some fringes can be referred to as phase objects. "Phase information" refers to images that provide indications such as interference or diffraction fringes induced by the target and its environment. Phase information can be useful to distinguish features of the target that are generally not as recognizable without the phase information. Phase is discussed in R. E. Meyers, K. S. Deacon, and Y. H. Shih, "Turbulence-free ghost imaging," Appl. Phys. Lett. 98, 111115 (2011), R. E. Meyers, K. S. Deacon, and Y. H. Shih, "Positive-negative turbulence-free ghost imaging," Appl. Phys. Lett. 100, 131114 (2012). As used herein the terminology, "SPAD" refers to an array of Single Photon Counting Detectors that is used for imaging.

As used herein the terminology, "synchronous" means data or frames that are acquired at the time or are time coincident.

As used herein the terminology, "asynchronous" means data or frames that are not acquired at the same time or are not time coincident.

As used herein the terminology, "light" is meant to describe electro-magnetic energy of any portion of the electro-magnetic spectrum to include, but not limited to, cosmic rays, x-rays, ultra-violet, visible, infra red, terahertz, microwave, and radio waves. Light may be measured in terms of its photons or fields.

As used herein for those embodiments that indicate two or more sensors, the sensors need not be co-located and may be distant from the other sensor(s), each sensor would have optionally present optical elements such as lenses or telescopes, each sensor system could optionally consist of a processor and memory, and further include means to exchange measurement values with other remotely located sensor system locations.

Super-resolution generally refers to methods and techniques that enhance the resolution of an imaging system. This resolution increase can mean exceeding the diffraction limit $\Delta L=1.22 * f * \lambda / D$ where $\Delta L$ is the spatial resolution, f is the focal length of the lens, $\lambda$ the wavelength of the light and D the diameter of the lens aperture, or super-resolution may involve extracting sub-pixel features from an image or set of images using digital image processing techniques.

For the current invention, one way to enhance the resolution is to distribute the measured intensity value at pixels onto a finer scale array of pixel. For example, a 2×2 array of pixels could be expanded to a 4×4 pixel array. Each pixel of the coarse 2×2 array may be partitioned into another 2×2 pixel where each pixel of the fine scale array would be apportioned ¼ of the value of the parent coarse pixel. This type of distribution is sometimes referred to as "injection". Another method to distribute values to a finer grid from a coarse grid would involve interpolation techniques such as bilinear interpolation where values interior to four surrounding points are a bounded linear combination of the values at the four surrounding points.

The invention can be used with measurements of quantum particles. There are many quantum particles including but not limited to photons, electrons, neutrons, protons, atoms, ions, mesons, and positrons. Photons, mesons, neutral atoms or molecules are bosons. Fermions include quantum particles such as electrons, ionized atoms and ionized molecules sometimes referred to as ions.

The invention can be used to generate improved images through a variety of gaseous, solid, or liquid media or mixtures of these that are at least partially transparent to quantum particles. These media may include but are not limited to, for instance, glasses, diamond, silicon, water and air. As an example, images captured with an underwater camera can be used as input for the inventive process for enhancement as well as images taken through say an air-water interface such as an imaging system on a boat looking down into the water or a submerged imaging looking into the air above the water.

Although various preferred embodiments of the present invention have been described herein in detail to provide for complete and clear disclosure, it will be appreciated by those skilled in the art that variations may be made thereto without departing from the spirit of the invention.

It should be emphasized that the above-described embodiments are merely possible examples of implementations. Many variations and modifications may be made to the above-described embodiments. All such modifications and variations are intended to be included herein within the scope of the disclosure and protected by the following claims. The invention has been described in detail with particular reference to certain preferred embodiments thereof, but it will be understood that variations and modifications can be effected within the spirit and scope of the invention. All references mentioned herein are hereby incorporation by reference herein.

What is claimed is:

1. A processor implemented method for image improvement comprising:
   receiving a plurality of frames of a given region of interest, the frames comprised of a plurality of pixels;
   determining, based on a quantum property of the frames, a normalized pixel intensity value for each pixel of each of the plurality of frames; and
   generating an improved image of the given region of interest based on the plurality of frames and the corresponding normalized pixel intensity values for the frames, the order of the image being two or more and comprising the product of two or more first-order intensity or normalized pixel intensity values which relates to the quantum property of the frames.

2. The method of claim 1, wherein determining the normalized pixel intensity value of a frame comprises:
   determining pixel values within a frame;
   summing pixel intensity values for determined pixel values within a frame; and
   dividing each summed pixel value by the number of determined pixel values to form a normalized pixel intensity value for each pixel in the frame.

3. The method of claim 2, wherein generating the improved image of the region of interest comprises:
   calculating (i) the average of the product of determined pixel values and the corresponding normalized pixel intensity values for the plurality of frames, and (ii) the product of the average of the determined pixels values for each frame and the average of normalized pixel intensity values for the plurality of frames.

4. The method of claim 3, further comprising: taking the difference of (i) and (ii).

5. The method of claim 3, wherein calculating (i) the average of the product of determined pixel values and the corresponding normalized pixel intensity values for the plurality of frames comprises:
   multiplying pixel values for determined pixels within each frame by the corresponding normalized pixel intensity values for that frame to produce a product for each frame;
   summing the products of all the frames; and
   determining the average of first product arrays by dividing the sum of product by the number of frames.

6. The method of claim 3, wherein calculating (ii) the product of the average of the determined pixels values for each frame and the average of normalized pixel intensity values for the plurality of frames comprises:
   determining the average value of each pixel for each frame for the plurality of frames;
   determining the average normalized pixel intensity value for each pixel for the plurality of frames; and
   multiplying the average pixel values and the average of the normalized pixel intensity value for each pixel.

7. The method of claim 2, wherein determining pixels values within a frame comprises:
   selecting all pixels within each frame;
     selecting pixel based upon at least one predetermined criterion;
   selecting pixels which are shifted a pre-determined distance away from select pixels; and/or
   determining an average value of adjacent pixels for select pixels.

8. The method of claim 1, further comprising:
   selecting at least one measurable property for determining a normalized pixel intensity value for each pixel of each of the plurality of frames; and using at least one different measurable property of the plurality of frames for generating the improved image.

9. The method of claim 8, wherein a measurable property comprises: wavelength or wavelength band, color, polarity, polarization, orbital angular momentum, spin, a quantum particle; or any combination thereof.

10. The method of claim 1, wherein the frames comprise regions of interest that are radiation emitting.

11. The method of claim 1, wherein the frames of a region of interest comprise sparse image data, and wherein the improved image is generated using the sparse image data.

12. The method of claim 1, further comprising:
determining a frame intensity deviation value for each frame by subtracting the average frame intensity for the plurality of first frames from the frame intensity for each frame; and
classifying the frame intensity deviation values for each frame based on whether the frame intensity deviation values is positive or negative.

13. The method of claim 12, further comprising: selecting processing for generating an improved image based on said classification.

14. The method of claim 13, further comprising:
calculating one or more conditional product values of the classified frame intensity deviation values for each frame; and
selecting one or more of the conditional product values to generate the improved image.

15. The method of claim 14, wherein at least two calculated conditional product values are treated differently based upon their classification.

16. The method of claim 14, wherein all calculated conditional product values are used to generate the improved image without any change thereto.

17. The method of claim 1, further comprising interpolating the pixel values for each frame to a finer resolution.

18. The method of claim 1, further comprising filtering the frame data, the normalized pixel intensity value, and/or any data used in one or more calculations thereof.

19. The method of claim 1, further comprising: providing an iterated improved image of the region of interest which comprises:
specifying one or more pixel locations to be normalized to form the normalized pixel intensity value for each pixel;
selecting new pixel locations based on a pre-determined pixel selection criteria from the values of the improved image of the region of interest;
reviewing the new determined pixels to determine if the new determined pixel locations are substantially the same as the pixel locations previously determined pixel locations; and
repeating the aforementioned steps until a specified iteration criteria is met.

20. The method of claim 1, further comprising using fewer than the total number of frames to determine an improved image of the region of interest.

21. A system for image improvement comprising
at least one processor;
at least one input for receiving or inputting frames of data; and
at least one memory operatively associated with the at least one processor adapted to store frames of data taken of a region of interest, each frame of data comprising an array of pixels, each pixel having a pixel value,
wherein the at least one processor is configured to process a plurality of frames of a given region of interest according to the method of claim 1.

22. A processor implemented method for image improvement comprising:
receiving a plurality of frames of a given region of interest, the frames comprised of a plurality of pixels, each pixel including a value of at least one measurable property of quantum particles;
specifying the order of the improved image to be generated, the order being greater than or equal to two;
selecting at least one measurable quantum property for pixel values of the frames corresponding to the specified order;
determining, based on the at least one measurable quantum property, normalized pixel intensity values for each pixel of each of the plurality of frames up to the specified order, to generate the improved image; and
generating an improved image of the given region of interest based on the plurality of frames and the corresponding normalized pixel intensity values for the frames.

23. The method of claim 22, wherein the at least measurable quantum property comprises: wavelength or wavelength band, color, polarity, polarization, orbital angular momentum, spin, quantum phase, a quantum particle; or any combination thereof.

* * * * *